United States Patent
Tavakoli et al.

(10) Patent No.: US 12,492,816 B2
(45) Date of Patent: Dec. 9, 2025

(54) HIGH TURNDOWN COMBUSTION SYSTEM AND METHOD

(71) Applicant: Camus Hydronics Limited, Mississauga (CA)

(72) Inventors: Payam Tavakoli, Toronto (CA); Bishavdeep Singh Brar, Brampton (CA)

(73) Assignee: Camus Hydronics Limited, Mississauga (CA)

( * ) Notice: Subject to any disclaimer, the term of this patent is extended or adjusted under 35 U.S.C. 154(b) by 312 days.

(21) Appl. No.: 18/203,420

(22) Filed: May 30, 2023

(65) Prior Publication Data

US 2024/0401803 A1    Dec. 5, 2024

(51) Int. Cl.

| | | |
|---|---|---|
| *F23N 1/02* | (2006.01) | |
| *F23C 7/00* | (2006.01) | |
| *F23D 14/02* | (2006.01) | |
| *F23L 3/00* | (2006.01) | |
| *F23L 5/02* | (2006.01) | |
| *F23N 5/24* | (2006.01) | |

(52) U.S. Cl.
CPC .............. *F23N 1/025* (2013.01); *F23C 7/008* (2013.01); *F23D 14/02* (2013.01); *F23L 3/00* (2013.01); *F23L 5/02* (2013.01); *F23N 5/242* (2013.01); *F23D 2203/007* (2013.01); *F23N 2235/16* (2020.01); *F23N 2237/10* (2020.01)

(58) Field of Classification Search
CPC .......... F23N 1/025; F23N 5/242; F23C 7/008; F23D 14/02; F23L 3/00; F23L 5/02
USPC .......................................................... 431/12
See application file for complete search history.

(56) References Cited

U.S. PATENT DOCUMENTS

| | | | |
|---|---|---|---|
| 3,869,243 | A | 3/1975 | Creuz |
| 4,204,832 | A | 5/1980 | Miller |
| 4,586,893 | A | 5/1986 | Somerville et al. |
| 7,188,481 | B2 | 3/2007 | DeYoe et al. |

(Continued)

FOREIGN PATENT DOCUMENTS

DE    10348324    5/2005

OTHER PUBLICATIONS

U.S. Patent Office Action Regarding U.S. Appl. No. 18/203,398 Dated Jul. 25, 2025 (19 pages).

(Continued)

*Primary Examiner* — Vivek K Shirsat
(74) *Attorney, Agent, or Firm* — Amundsen Davis, LLC

(57) ABSTRACT

Combustion systems configured to achieve, and methods of operating combustion systems to attain, enhanced high turndown operation, are disclosed herein. In one example embodiment, a combustion system includes an air flow tube, an air inlet damper, a gas train, a mixing chamber, a burner, and a blower. A flow of air via the tube into the mixing chamber is governed at least in part by a status of the air inlet damper. Further, the air inlet damper includes a damper plate having an outer perimeter with a first edge portion that is complementary to an inner surface of the tube and one or more additional edge portions that define a first inwardly-extending cutout. In another example embodiment, the combustion system includes a control device configured to cause a control signal for receipt by the damper motor to vary nonlinearly in response to variation of a modulation signal.

20 Claims, 19 Drawing Sheets

(56) References Cited

U.S. PATENT DOCUMENTS

| | | | |
|---|---|---|---|
| 8,303,297 B2* | 11/2012 | Tompkins | F23N 1/022 |
| | | | 431/89 |
| 9,310,093 B2 | 4/2016 | Davledzarov | |
| 9,528,712 B2 | 12/2016 | Caruso | |
| 10,168,074 B2 | 1/2019 | Cho et al. | |
| 10,655,875 B2 | 5/2020 | Karamanos et al. | |
| 10,955,159 B2* | 3/2021 | Karamanos | F24F 11/79 |
| 10,989,439 B2 | 4/2021 | Sekar et al. | |
| 11,421,875 B2 | 8/2022 | Young | |
| 2010/0112500 A1 | 5/2010 | Maiello et al. | |
| 2013/0115563 A1* | 5/2013 | Blaauwwiekel | F23N 3/085 |
| | | | 431/12 |
| 2015/0354809 A1 | 12/2015 | Doura et al. | |
| 2017/0174043 A1 | 6/2017 | Klein et al. | |
| 2017/0328559 A1 | 11/2017 | Doura et al. | |
| 2018/0119970 A1 | 5/2018 | Vogel | |
| 2020/0025369 A1 | 1/2020 | O'Donnell | |
| 2021/0325042 A1 | 10/2021 | Monfared et al. | |
| 2022/0349622 A1 | 11/2022 | Gagne et al. | |

OTHER PUBLICATIONS

Response to Non-Final Office Action Concerning U.S. Appl. No. 18/203,398, filed Oct. 27, 2025 -Amendment and Remarks (14 pages).

* cited by examiner

HIGH TURNDOWN COMBUSTION SYSTEM AND METHOD

FIELD

The present disclosure relates to combustion systems and methods and, more particularly, to combustion systems and methods configured to achieve high-turndown operation.

BACKGROUND

High turndown combustion systems are employed for a variety of purposes and in a variety of systems, including hydronic and steam boilers. Turndown is the ratio of a combustion system's maximum input to its minimum input. For example, a combustion system with a 1,000,000 BTU/Hr (British Thermal Unit per hour) input that can operate at 100,000 BTU/Hr has a turndown ratio of 10:1.

High turndown combustion systems used in hydronic and steam boilers require components tuned or operated to maintain a desired combustion quality. A typical combustion system of a boiler includes burner(s), a blower, ignitor(s), gas valve(s), gas pipe(s) (where the gas pipe(s) and gas valve(s) can be considered to form one or more gas train(s)), a control system, and sometimes a damper. The turndown capability of a boiler combustion system is limited by the ability of these components to maintain an adequate air-gas ratio throughout the modulation range.

More particularly, the turndown capability of a boiler combustion system is limited by the ability of the blower, gas train and burner to synchronously maintain a desired air-gas ratio so that the combustion quality is acceptable. Combustion quality—including characteristics such as cleanliness or toxicity—is commonly viewed as being a function of (or related to) the percentages or concentrations of various products of the combustion process, such as carbon dioxide ($CO_2$), carbon monoxide (CO), oxygen ($O_2$), and nitrogen oxides ($NO_x$, including nitric oxide NO and nitrogen dioxide $NO_2$). Lower emissions of these gases typically is correlated with higher combustion quality. A deciding parameter affecting or governing combustion emissions is the air-gas ratio. Too much excess air or an insufficient amount of gas results in a lean combustion, which lowers the flame temperature and the efficiency. However, using too much gas or not enough air, although improving efficiency, can result in a poor combustion quality with high emissions and possible soot development. Therefore, it is important that a satisfactory air-gas ratio be maintained throughout the boiler's input range so that quality combustion can be achieved and so that efficiency is not overly negatively impacted by going excessively lean.

The concentrations of such gases emitted from a combustion system are directly affected by the ratio of air to fuel in the air and gas mixture that is ignited in the burner. Indeed, in high turndown combustion systems, as the modulation signal ramps up and the blower draws more gas and air, the combustion byproducts can increase or decrease nonlinearly, which can cause segments of the combustion-byproducts range/curve to become undesirable. Consequently, as a boiler combustion system is modulating from minimum input to maximum, it is necessary to adjust the amount of air and gas throughout this range carefully and automatically to achieve clean combustion throughout the whole range. Yet, in conventional high turndown combustion systems, such careful adjustment resulting in high quality combustion and corresponding acceptable emissions is difficult to perform in a consistent manner.

Also, in at least some other conventional embodiments of combustion systems used in industry to achieve higher turndowns, the combustion systems achieve higher turndowns by utilizing multiple heat exchangers and/or multiple burners in a single jacket. Such embodiments can be disadvantageous insofar as such embodiments entail a multiplication of all (or at least several) of the combustion system components (e.g., burners, blowers, ignitors, gas trains and, at least in some cases, control boards or other control systems), which not only affects the upfront cost to the consumer but also significantly affects the long-term maintenance costs.

For at least one or more of these reasons, or one or more other reasons, it would be advantageous if new or improved high turndown combustion systems, and/or new or improved methods of achieving high turndown combustion, could be developed or implemented, so as to address any one or more of the concerns discussed above or to address one or more other concerns or provide one or more benefits.

SUMMARY

In at least one example embodiment, the present disclosure relates to a combustion system configured to achieve enhanced turndown operation. The combustion system includes an air flow tube, an air inlet damper positioned along the air flow tube, a gas train, and a first gas valve positioned along the gas train. Also, the combustion system also includes a mixing chamber coupled to the air flow tube and to the gas train, a burner, and a blower coupled between the mixing chamber and the burner. Further, a first flow of air via the air flow tube into the mixing chamber is governed at least in part by a first status of the air inlet damper and also at least in part by a speed of the blower, and second flow of a gas via the gas train into the mixing chamber is governed at least in part by a second status of the first gas valve and also at least in part by the speed of the blower. Additionally, at least a first amount of the air and at least a second amount of the gas are mixed within the mixing chamber to form an air/gas mixture. Also, a third flow of the air/gas mixture from the mixing chamber to the burner is governed at least in part by the speed of the blower. Further, the air inlet damper includes a first damper plate having an outer perimeter with a first edge portion that is complementary to an inner surface of the air flow tube and one or more additional edge portions that define a first inwardly-extending cutout through which at least some of the air can pass even when the first status of the air inlet damper is a closed status in which the first damper plate is rotated so that the first edge portion is substantially adjacent to or in contact with the inner surface.

Additionally, in at least one example embodiment, the present disclosure relates to a method of operating a combustion system to attain enhanced turndown operation. The combustion system includes a blower, a mixing chamber, a burner, an air flow tube, a gas train, and an air inlet damper. The blower is coupled between the mixing chamber and the burner, and the mixing chamber is coupled between the blower and each of the air flow tube and the gas train. Also, a first damper plate of the air inlet damper is positioned along the air flow tube, and the first damper plate has an outer perimeter with a first edge portion that is complementary to an inner surface of the air flow tube and one or more additional edge portions that define a first inwardly-extending cutout. The method includes, at a first time, providing one or more first control signals at least indirectly from at least one control device so as to cause a blower to operate at a high speed, and to actuate the air inlet damper so that the first damper plate of the air inlet damper is rotated to an open position. Also, the method includes, at a second time, providing one or more second control signals at least indirectly from the at least one control device so as to cause the blower to operate at a low speed, and to actuate the air inlet damper so that the first damper plate of the air inlet damper is rotated to a closed position. Additionally, at the second time, at least some air continues to pass through the air flow tube past the first damper plate by way of the first inwardly-extending cutout so as to reach the mixing chamber.

Further, in at least one example embodiment, the present disclosure relates to a combustion system configured to achieve enhanced turndown operation. The combustion system includes an air flow tube, a gas train, a mixing chamber coupled to the air flow tube and to the gas train, a burner, and a blower coupled between the mixing chamber and the burner. Also, the combustion system includes means for governing air flow through the air flow tube and into the mixing chamber, and means for controlling the means for governing. The means for controlling provides at least one signal at least indirectly for receipt by the means for governing, and the at least one signal causes the means for governing to be adjusted between a closed status and an open status. Additionally, the means for governing is configured to operate in a nonlinear manner, when being adjusted away from the closed status toward the open status, so that a flow path past the means for governing is adjusted nonlinearly.

Also, in at least one example embodiment, the present disclosure relates to a combustion system configured to achieve enhanced turndown operation. The combustion system includes an air flow tube, and an air inlet damper positioned along the air flow tube and including a damper motor and a first damper plate. The combustion system further includes a gas train having a first gas valve positioned along the gas train, and a mixing chamber coupled to the air flow tube and to the gas train. The combustion system additionally includes a burner, a blower coupled between the mixing chamber and the burner, and at least one control device coupled at least indirectly to the damper motor of the air inlet damper. A first flow of air via the air flow tube into the mixing chamber is governed at least in part by a first status of the air inlet damper and also at least in part by a speed of the blower. Also, a second flow of a gas via the gas train into the mixing chamber is governed at least in part by a second status of the first gas valve and also at least in part by the speed of the blower. Further, at least a first amount of the air and at least a second amount of the gas are mixed within the mixing chamber to form an air/gas mixture, and a third flow of the air/gas mixture from the mixing chamber to the burner is governed at least in part by the speed of the blower. Additionally, a position of the first damper plate is controlled at least in part by the damper motor, the at least one control device is configured to provide at least one control signal for receipt by the damper motor that governs an actuation of the damper motor, and the at least one control signal includes or is based at least partly upon a modulation signal. A flow path past the air inlet damper varies nonlinearly in response to a variation of the modulation signal because either: (a) the at least one control device is configured to cause the at least one control signal to vary nonlinearly in response to the variation of the modulation signal; or (b) the first damper plate has an outer perimeter with a first edge portion that is complementary to an inner surface of the air flow tube and also a first inwardly-extending cutout.

Further, in at least one example embodiment, the present disclosure relates to a method of operating a combustion system to attain enhanced turndown operation. The combustion system includes a blower, a mixing chamber, a burner, an air flow tube, a gas train, an air inlet damper, and at least one control device. Also, the blower is coupled between the mixing chamber and the burner, the mixing chamber is coupled between the blower and each of the air flow tube and the gas train, a first damper plate of the air inlet damper is positioned along the air flow tube, and the at least one control device is coupled at least indirectly to a damper motor of the air inlet damper. The method includes receiving a modulation signal at the at least one control device, and monitoring the modulation signal. The method additionally includes making a first determination, at a first time by the at least one control device, that the modulation signal has a first status in comparison with a first threshold and, upon the first determination being made, causing a first control signal to be output from the at least one control device for receipt by the damper motor of the air inlet damper, where the air inlet damper takes on a first position in response to the first control signal. The method further includes making a second determination, at a second time by the at least one control device, that the modulation signal has experienced a variation from having the first status to having a second status in comparison with the first threshold and, upon the second determination being made, causing a second control signal to be output from the at least one control device for receipt by the damper motor of the air inlet damper, where the air inlet damper changes from having the first position to having a second position in response to the second control signal. When the air inlet damper changes from having the first position to having the second position, an air flow path past the air inlet damper varies in a nonlinear manner relative to the variation in the modulation signal from the first status to the second status.

Additionally, in at least one example embodiment, the present disclosure relates to a combustion system configured to achieve enhanced turndown operation. The combustion system includes an air flow tube, and an air inlet damper positioned along the air flow tube and including a damper motor and a first damper plate. The combustion system also includes a gas train, a mixing chamber coupled to the air flow tube and to the gas train, a burner, and a blower coupled between the mixing chamber and the burner. The combustion system additionally includes a blower control device configured to generate a modulation signal, and an additional control device coupled to the blower control device, where the modulation signal is provided to the additional control device. Also, the additional control device is configured to output at least one additional signal in response to receiving the modulation signal, the at least one additional signal varying nonlinearly in response to a variation of the modulation signal so that a flow path past the air inlet damper varies nonlinearly in response to the variation of the modulation signal.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
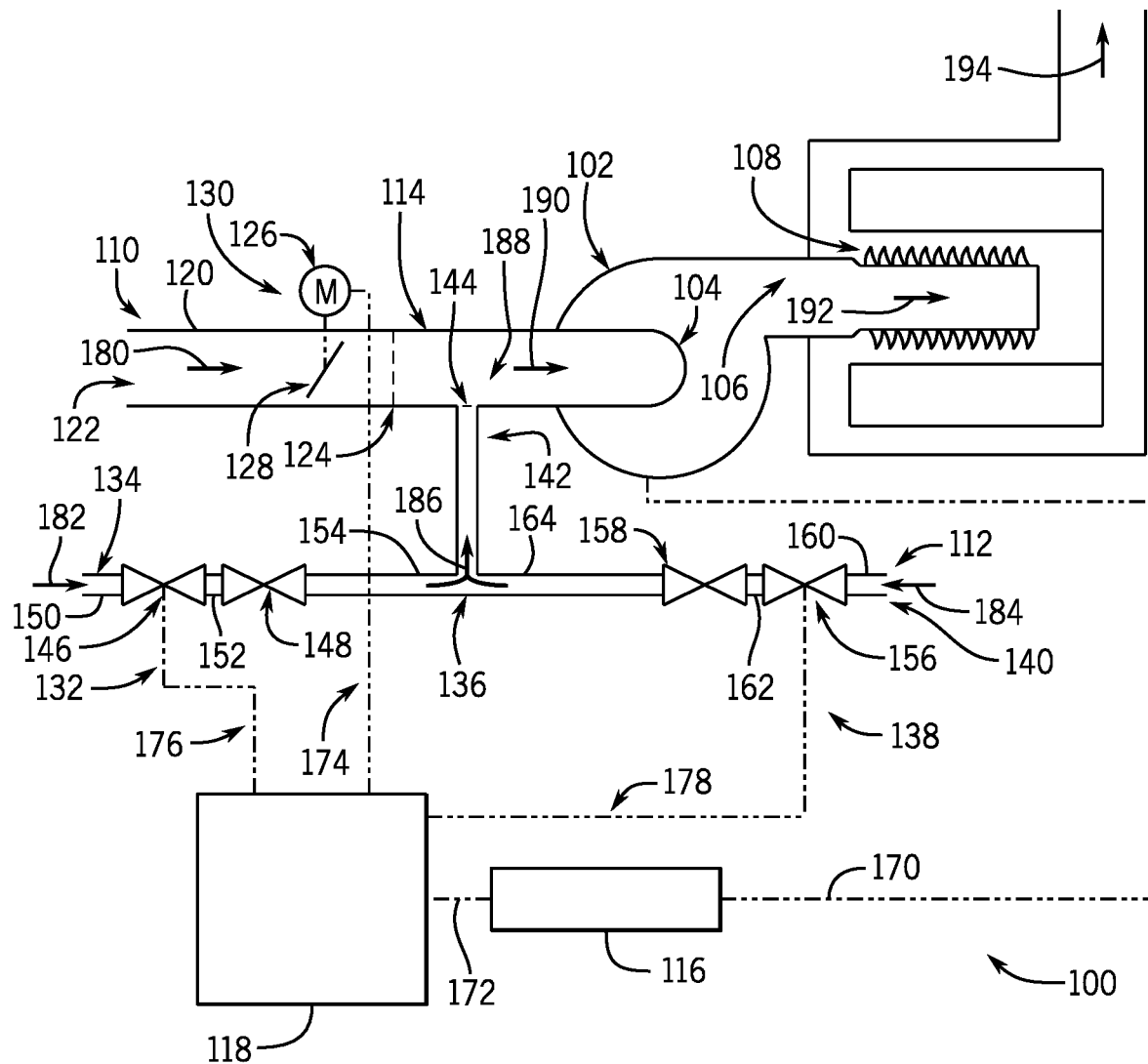
FIG. 1 is a schematic diagram of an improved high turndown combustion system in accordance with an example embodiment encompassed herein.

The present inventors have recognized that it is difficult to achieve high turndown operation in conventional combustion systems, in a manner that maintains combustion quality or cleanliness throughout the entire modulation range of the combustion system, due to the existence of a mismatch between the manner of control employed by such conventional combustion systems and the manner in which the generation of combustion byproducts occurs during operation of the combustion systems. More particularly, in high turndown combustion systems, the byproducts of combustion often do not linearly increase or decrease as a combustion system is modulated in its level of operation, and ramps up and ramps down in operation, but rather the byproducts of combustion often increase or decrease in nonlinear manners relative to the level of operation ramping up and ramping down. However, even though it is often difficult (if not impossible) to control such nonlinear processes by using linear control mechanisms, nevertheless conventional high turndown combustion systems typically employ linear control systems to govern air flow through the combustion systems, and thereby to govern the overall air-fuel mixture in such combustion systems, during operation.

Given this mismatch between the nonlinear operational aspects of high turndown combustion systems and the linear control mechanisms that are employed in many conventional implementations of such combustion systems, the present inventors have further recognized that improved high turndown operation in a combustion system can be achieved if the combustion system includes one or more components or operational characteristics that are better suited to accommodate the nonlinear operational aspects of the combustion system.

In view of these considerations, the present disclosure relates to improved high turndown combustion systems that, in at least some embodiments, include both an inlet damper that (in addition to the blower) can dictate the amount of air that flows through the system to be mixed with gas, and also one or more electromechanical devices that control this damper, so as to achieve enhanced high turndown performance. More particularly, at least some embodiments encompassed herein can include both an improved air inlet damper having a shape and/or design features, in combination with appropriate electromechanical devices, configured so as to allow the air inlet damper position to operate nonlinearly over the modulation range of the combustion system. At least some of the improved high-turndown systems that employ such improved damper designs in conjunction with electromechanical components are capable of controlling the air being fed into the systems such that the desired combustion quality is maintained throughout the modulation range down to a minimum turndown of at least 35-to-1.

Additionally, the present disclosure relates to improved high turnaround combustion systems that, in at least some embodiments, achieve a clean high turndown by employing two gas valves (or more than two gas valves) respectively associated with two gas trains (that is, by which gas can enter the system via two different flow pathways), rather than merely one gas valve associated with merely a single gas train. Because gas valves typically are limited to their own turndowns, which are often less than 10:1, the use of two gas valves (e.g., arranged in parallel) expands the overall turndown of the boiler or other combustion system. Further, in at least some such embodiments employing two gas valves, one of the gas valves is smaller and the other of the gas valves is larger. Through the use of a design that encompasses appropriate electromechanical or electrotechnical devices as the boiler modulates from minimum input to maximum input, the control system switches from the smaller gas valve to the bigger gas valve and vice-versa and thereby can attain enhanced performance by comparison with conventional combustion systems.

Referring to FIG. 1, a schematic diagram is provided to show an improved high turnaround combustion system 100 in accordance with an example embodiment encompassed herein. As illustrated, the combustion system 100 includes a blower 102 having a blower input port 104 and a blower output port 106 and a burner 108 that is coupled to the blower output port 106. Additionally, the combustion system 100 includes an air input section 110, a gas input section 112, and a mixing tube or plenum 114 that links each of the air input section 110 and the gas input section 112 with the blower input port 104. Further, the combustion system 100 includes a boiler controller 116 and additional control circuitry 118. In the present embodiment, the high turnaround combustion system 100 can be, for example, a boiler system such as a fire tube boiler system in which high temperature combustion gases produced in the burner 108 flow through tubes, and in which water passes around the tubes and is thereby heated and boiled.

Further as shown, the air input section 110 includes an air flow tube 120 that extends between an air input port 122 and a first intermediate junction 124 at which the air flow tube is coupled with the mixing plenum 114. Additionally as shown, the air input section 110 includes an air inlet damper 126 having a damper face plate (or simply damper plate) 128 positioned along the length of the air flow tube 120 and a damper motor 130 that is coupled to the damper plate and capable of controlling the rotational positioning of the damper plate 128 within the air flow tube.

The boiler controller 116, which can also be referred to as a blower controller, can include for example a programmable logic controller (PLC), a microcontroller, or another type of control device. The additional control circuitry 118 can, depending upon the embodiment or implementation, include any one or more of a relay such as a staging relay, a limit alarm, another switching device, a programmable logic controller (PLC), a microcontroller, a microprocessor, or another type of control circuit, controller, processor, control unit, or control device. In at least some embodiments such as the present embodiment, it is desirable to have both the boiler controller 116 and the additional control circuitry 118 present as distinct control devices. Notwithstanding the above discussion, in some alternate embodiments, the boiler controller 116 and additional control circuitry 118 can be combined, or the additional control circuitry 118 can be embedded in or as part of the boiler controller 116, and/or the functionality implemented by the boiler controller and additional control circuitry can be implemented on and/or performed by a single controller or control device.

In some embodiments having both the boiler controller 116 and additional control circuitry 118 (for example as described elsewhere herein), the signal(s) provided from the boiler controller 116 to the additional control circuitry 118 can be electronic modulation signal(s) and the additional control circuitry 118 can in turn alter those electronic modulation signal(s) in a nonlinear manner so as to produce control (or modified electronic modulation) signal(s) that are sent to the damper motor (or actuator) 130 of the air inlet damper 126. That is, in such embodiments, the control signal(s) output by the additional control circuitry 118 for receipt by the air inlet damper 126 can experience changes, in response to the changes in the electronic modulation signal(s) received from the boiler controller 116, which are nonlinearly related to the changes in the electronic modulation signal(s) received from the boiler controller. Correspondingly, such changes in the control signal(s) output by the additional control circuitry 118 in response to the changes in the electronic modulation signal(s) from the boiler controller 116, which are nonlinearly related to those changes in the electronic modulation signal(s), in turn can cause corresponding changes in the position of the damper face plate 128 (or other portion(s) of the air inlet damper 126), and/or the flow path opening past that damper face plate or the flow path through the air inlet damper, that also are nonlinearly related to those changes in the electronic modulation signal(s).

In some embodiments having both the boiler controller 116 and additional control circuitry 118, the electronic modulation signal(s) output by the boiler controller 116 can be considered to be linear electronic modulation signal(s). Such electronic modulation signal(s) can be considered linear in any one or more of several respects depending upon the embodiment. For example, the electronic modulation signal(s) can be considered linear in that, if that electronic modulation signal(s) were sent in an unaltered manner (e.g., directly) to the damper motor 130 of the air inlet damper 126, then variation in the electronic modulation signal(s) would cause proportionally or linearly related changes in the rotational position of the damper face plate 128. Further for example in this regard, if the electronic modulation signal varies from its minimum level to half-way between its minimum level and its maximum level, this would cause the damper motor 130 to rotate the damper face plate 128 of the air inlet damper 126 to a 45 degree position between its fully-closed (e.g., zero degree) position and fully-opened (e.g., 90 degree) position. Additionally for example, the electronic modulation signal(s) can be considered linear in that, if that electronic modulation signal(s) were sent in an unaltered manner (e.g., directly) to the damper motor 130 of the air inlet damper 126, then variation in the electronic modulation signal(s) would cause proportionally or linearly related changes in the flow path opening past that damper face plate or the flow path through the air inlet damper (e.g., the cross-sectional area through which air can flow through the air inlet damper, taken perpendicular to the direction of flow, at or proximate to the damper face plate).

Alternatively (or additionally), the electronic modulation signal(s) output by the boiler controller 116 can in some embodiments be considered linear insofar as the signal(s) vary in a manner that is linearly related or proportional to input signal(s) received by the boiler controller. For example, in one example embodiment, the boiler controller 116 operates in response to a temperature signal received by the boiler controller 116 from a temperature sensor (not shown) that senses the temperature of the water heated by the boiler system. Alternatively, in another example embodiment, the boiler controller 116 operates in response to a modified temperature feedback signal that is generated by a controller, such as a proportional integral derivative (PID) controller, in response to (at least in part) a temperature signal from such a temperature sensor that senses the temperature of the water heated by the boiler system (and also possibly in relation to a temperature setpoint) Further, in other example embodiments, the boiler controller 116 can instead or additionally operate in response to one or more other types of input signal(s), such as (for example) signals indicative of oxygen, such as an oxygen ($O_2$) trim signal or a signal indicative of oxygen ($O_2$) in the combustion process (or a feedback signal from an $O_2$ sensor), or pressure signals, or signals from or related to operation of (or that may affect operation of) gas valves such as are present in the gas train 112 as described further below.

Regardless of the input signal(s) in response to which the boiler controller 116 operates, in some embodiments the boiler controller 116 can generate electronic modulation signal(s) that is or are linear insofar as the electronic modulation signal(s) experience changes that are proportionally or linearly related to changes in any one or more received input signals such as any of the aforementioned types of signals. For example, in some such embodiments in which the boiler controller 116 operates in response to either a temperature signal or a modified temperature feedback signal, respectively (as described above), the boiler controller 116 can generate an electronic modulation signal that is linear insofar as the electronic modulation signal experiences changes that are proportionally or linearly related to changes in the received temperature signal or modified temperature feedback signal, respectively. Correspondingly, such electronic modulation signal(s) can also be considered linear in that, if those electronic modulation signal(s) were sent in an unaltered manner (e.g., directly) to the damper motor 130 of the air inlet damper 126, then variation in the input signal(s) to the boiler controller 116 (upon which those electronic modulation signal(s) are based) would cause proportionally or linearly related changes in the rotational position of the damper face plate 128 and/or the flow path opening past that damper face plate or the flow path through the air inlet damper.

In some embodiments that employ both the boiler controller 116 and the additional control circuitry 118, and in which the electronic modulation signal(s) provided from the boiler controller 116 to the additional control circuitry 118 can be considered to be linear (e.g., in any of the manners described above), it is possible that the additional control circuitry 118 will in turn provide control signal(s) that also are linear. That is, in such embodiments, the control signal(s) output by the additional control circuitry 118 will vary, in response to changes in the electronic modulation signal(s) received from the boiler controller 116, in manner(s) that are proportionally or linearly related to the changes in the electronic modulation signal(s). Correspondingly, in some such embodiments, those control signal(s) when provided to the damper motor 130 of the air inlet damper 126, will cause proportionally or linearly related changes in the rotational position of the damper face plate 128 (or other air inlet damper component(s)) and/or the flow path opening past that damper face plate or the flow path through the air inlet damper.

Nevertheless, as already mentioned above, in other embodiments encompassed herein, the additional control circuitry 118 can, upon receiving electronic modulation signal(s) from the boiler controller 116, in turn output nonlinear control (or modified electronic modulation) signal(s) for receipt by the damper motor (actuator) 130 of the air inlet damper 126. Indeed, the present disclosure encompasses numerous embodiments in which control signal(s) output by the additional control circuitry 118 are nonlinear regardless of whether those electronic modulation signal(s) from the boiler controller themselves are considered linear (e.g., in any of the manners described above) or nonlinear. Such control signal(s) output by the additional control circuitry 118 in at least some embodiments can be considered nonlinear in that the control signal(s) experience changes that are nonlinearly related to the changes in the electronic modulation signal(s) arriving from the boiler controller 116. Also, in at least some embodiments, such control signal(s) output by the additional control circuitry 118 can be considered nonlinear in that those control signal(s), when provided to the damper motor 130 of the air inlet damper 126, will cause changes in the rotational position of the damper face plate 128 (or other air inlet damper component(s)), and/or the flow path opening past that damper face plate or the flow path through the air inlet damper, that also are nonlinearly related to those changes in the electronic modulation signal(s) arriving from the boiler controller 116. Several such embodiments are described in further detail below.

Further with reference to FIG. 1, the gas input section 112 includes a first gas train segment 132 linking a first gas inlet 134 with a second intermediate junction 136, a second gas train segment 138 linking a second gas inlet 140 with the second intermediate junction 136, and a gas flow tube 142 linking the second intermediate junction 136 to a third intermediate junction 144 at which the gas flow tube is coupled with the mixing plenum 114. The third intermediate junction 144 can also be considered a gas inlet of the mixing plenum 114.

Also as shown, the first gas train segment 132 includes a first on/off gas valve 146 and a first regulating gas valve 148 arranged in series between the first gas inlet 134 and the second intermediate junction 136. More particularly, the first on/off gas valve 146 is coupled to the first gas inlet 134 (which can be coupled to a gas source, not shown) by a first gas flow tube segment 150, and coupled to the first regulating gas valve 148 by a second gas flow tube segment 152, and governs gas flow from the first gas inlet to the first regulating gas valve. Also, the first regulating gas valve 148 is coupled to the second intermediate junction 136 by a third gas flow tube segment 154, and governs gas flow from the first on/off gas valve 146 to the second intermediate junction.

Further, the second gas train segment 138 includes a second on/off gas valve 156 and a second regulating gas valve 158 arranged in series between the second gas inlet 140 and the second intermediate junction 136. More particularly, the second on/off gas valve 156 is coupled to the second gas inlet 140 (which can be coupled to a gas source, not shown) by a fourth gas flow tube segment 160, and coupled to the second regulating gas valve 158 by a fifth gas flow tube segment 162, and governs gas flow from the second gas inlet to the second regulating gas valve. Also, the second regulating gas valve 158 is coupled to the second intermediate junction 136 by a sixth gas flow tube segment 164, and governs gas flow from the second on/off gas valve 156 to the second intermediate junction.

In the present example embodiment, the first gas train segment 132 is a bigger gas train segment (e.g., cross-sectionally) and the second gas train segment 138 is a smaller gas train segment (e.g., cross-sectionally), such that the first gas train segment is bigger than, and is configured to deliver gas at larger flow rates than, the second gas train segment. The first gas train segment 132 and second gas train segment 138 can be arranged in parallel with one another between a gas source (which is coupled at least indirectly to each of the first gas inlet 134 and second gas inlet 140) and the second intermediate junction 136. The gas valves 146, 148, 156, and 158 can take any of a variety of forms depending upon the particular embodiment or implementation. Nevertheless, in the present example embodiment, each of the first on/off gas valve 146 and the second on/off gas valve 156 is a solenoid-actuated valve that can be actuated in a binary manner to each of on and off (e.g., fully-open and fully-closed) states in response to control signals (as described further below). When actuated to be in the on state, the respective first and second on/off gas valves 146 and 156 respectively allow for gas to flow from the first and fourth gas flow tube segments 150 and 160, respectively, to the second and fifth gas flow tube segments 152 and 162, respectively.

By contrast, each of the first and second regulating gas valves 148 and 158 in the present embodiment is a respective negative regulation type (or zero governor type) gas valve (or pneumatic gas valve) that opens and closes to varying degrees (e.g., in an analog or non-binary manner) in dependence upon respective sensed pressure information or feedback. More particularly, each of the first and second regulating gas valves 148 and 158 includes (or is associated with or coupled to) a respective gas pressure sensor by (or from) which a respective actuator of the respective gas valve is provided with signal(s) (or information) regarding the pressure at a respective location of the respective gas pressure sensor. Each gas pressure sensor of the first and second regulating gas valves 148 and 158 can be, for example, a respective static pressure sensor, or a respective pressure-differential sensor, or a respective tracking (e.g., pressure tracking) sensor. As the signal(s) received from the respective gas pressure sensors vary over time due to changes in sensed pressures (e.g., in magnitude), the respective actuators of the respective first and second regulating gas valves 148 and 158 operate to modulate the respective gas valves (e.g., adjust or modify the degree to which the respective gas valves are opened/closed) in response to those signals and thereby control or influence the amounts of gas passing through the respective gas valves.

Given the above-described arrangement, it should be appreciated that, during times at which the first on/off gas valve 146 is open and conducts gas flow, the first regulating gas valve 148 will therefore open and close to varying degrees based upon the signals received from the pressure sensor associated with that regulating gas valve (which provide pressure feedback). If at those times the second on/off gas valve 156 is closed, the pressure at the third gas flow tube segment 154 will also correspond to pressure within the gas flow tube 142 and within the mixing plenum 114, which in turn is dependent upon the operational speed of the blower 102. Likewise, during times at which the second on/off gas valve 156 is open and conducts gas flow, the second regulating gas valve 158 will therefore open and close to varying degrees based upon the signals received from the pressure sensor associated with that regulating gas valve (which provide pressure feedback). If at those times the first on/off gas valve 146 is closed, the pressure at the sixth gas flow tube segment 164 will also correspond to pressure within the gas flow tube 142 and within the mixing plenum 114, which in turn is dependent upon the operational speed of the blower 102.

Notwithstanding the above description, it should be recognized that the present disclosure encompasses numerous other arrangements of gas trains, gas train segments, and gas valves in addition to or instead of the particular arrangement described above and/or shown in FIG. 1. Indeed, in alternate embodiments, a gas train segment (or gas train) can take any of a variety of other forms involving any of a variety of different types and numbers of gas valves, as well as any of a variety of different types and numbers of related components such as gas pipes or pressure sensors.

For example, in the above-described embodiment, the on/off gas valves 146 and 156 are implemented to provide a mechanism by which gas flow through the respective gas train segments 132 and 138 can be fully shut off, and the regulating valves 148 and 158 are implemented to allow for modulation of gas flow through the respective gas train segments. Nevertheless, in some other embodiments encompassed herein, each gas train segment (or overall gas train) can include any of: (a) merely a single gas valve, such as a single regulating gas valve; (b) a regulating gas valve in combination with a gate/ball gas valve (fixed but adjustable); or (c) a gate/ball gas valve in addition to both an on/off gas valve and a regulating gas valve (e.g., one regulating valve, one on/off valve, and one gate/ball valve coupled in series with one another along the gas train segment). Further for example, in some embodiments, a gas train segment can include a combination valve device that appears from the outside to be a single body valve (that may be physically longer than other valves) that includes both an on/off gas valve and also a regulating gas valve that are combined in one body having two gates and two governors (one for the on/off gas valve and the other for the regulating gas valve). Also, the present disclosure includes a variety of embodiments in which any one or more of the gas valves can be automatically actuated or manually actuated (e.g., opened or closed by hand) and, indeed, in some alternate embodiments, one or more of the gas valves are manual valves.

Also, notwithstanding the above discussion of the various gas flow tube segments 150, 152, 154, 160, 162, and 164 interconnected with the on/off gas valves 146 and 156 and regulating gas valves 148 and 158, in other embodiments one or more of these flow tube segments may not be present or may take other forms, and/or one or more of the gas valves may be connected with one another or with other components of the gas train(s) or gas train segment(s) in other manners. Relatedly, in some embodiments, a flow tube segment can be merely an orifice by which one component is fluidly coupled to another neighboring component (for example, in a combination gas valve device including both an on/off gas valve and a regulating gas valve as mentioned above).

Further, the arrangements of regulating gas valves and associated gas pressure sensors can take any of a variety of forms depending upon the embodiment. For example, the respective gas pressure sensors can be positioned in any of a variety of locations relative to the respective regulating gas valves with which those respective gas pressure sensors are associated, such as upstream (or downstream) of the respective regulating gas valves. Also for example, in some embodiments the respective gas pressure sensors can be electrically coupled to the respective actuators of the respective regulating gas valves so that signal(s) are communicated electrically from the respective pressure sensors to the respective actuators. Also, in some embodiments the respective pressure sensors can be integrated with the respective actuators of the respective regulating gas valves and/or can be coupled to locations at which the respective pressures are to be sensed by way of pressure tap conduits (e.g., plastic tubes). It will be appreciated that a variety of factors can influence the respective pressures sensed at the respective gas pressure sensors associated with the respective first and second regulating gas valves and thereby affect the operation of those respective regulating gas valves. For example, the pressure sensed by a pressure sensor associated with one of the regulating gas valves may change as the speed of the blower (e.g., the blower 102) changes.

Additionally for example, although in some embodiments encompassed herein a given respective regulating gas valve can operate in response to pressure signal(s) concerning the pressure at a respective location as sensed by a single corresponding pressure sensor, in other embodiments encompassed herein any given regulating gas valve can be associated with multiple different pressure sensors and operate in response to pressure signals concerning the pressures at multiple respective location as sensed by the respective different pressure sensors. That is, depending upon the embodiment, any given regulating gas valve can operate in response to signals from any one or more pressure sensors that are associated with that regulating gas valve. Further, it should also be appreciated that at least some embodiments encompassed herein employ one or more gas train segments (or gas train(s)), or one or more gas valve(s) and/or associated components (such as pressure sensors), which are of conventional design, for example, to allow for the modulation of gas flow or achieve other control or influence over gas flow within the gas train segments (or gas train(s)).

Although for purposes of the present discussion the air flow tube 120 and mixing plenum 114 are described as being separate and distinct structures that are connected with one another, in at least some other embodiments those two structures are integrally formed as a single structure, such that the first intermediate junction 124 merely refers to a location along the length of that integrated structure (such an integrated structure can itself as a whole be referred to as the mixing tube or mixing plenum). Likewise, although for purposes of the present discussion the gas input section 112 and mixing plenum 114 are described as separate and distinct structures that are connected with one another, in at least some other embodiments those two structures are integrally formed as a single structure, such that the third intermediate junction 144 merely refers to a location along that integrated structure. Indeed, in at least some embodiments, each of the air flow tube 120, the gas input section 112, and the mixing plenum 114 can be a single, integrally formed structure. Additionally, although the air inlet damper 126 in the present embodiment is shown to be within the air input section 110, the air inlet damper also can be positioned within the mixing plenum 114. Indeed, the air inlet damper 126 can be positioned within the air input section 110 or the mixing plenum 114 at any location upstream of the third intermediate junction 144 forming the gas inlet to the mixing plenum, upstream of where gas and air are combined within the mixing plenum, and upstream of the blower 102.

Further as shown in FIG. 1, in the present embodiment the boiler controller 116 is coupled, at least indirectly, by a first communication link 170 to the blower 102 (and/or the burner 108), and operates to provide first control signals for controlling the boiler to the blower (and/or the burner). The boiler controller 116 is also coupled, at least indirectly, by a second communication link 172 to the additional control circuitry 118, and operates to provide second control signals for controlling that additional control circuitry. Each of the first and second control signals provided respectively via the first and second communication links 170 and 172 can be or include, for example, a modulation signal (or a pulse width modulation (PWM) signal) taking the form of a current signal that varies within the range of 4 to 20 milliAmps (mA) or within the range of 0 to 20 mA, or a modulation signal (or a PWM signal) taking the form of a voltage signal that varies within the range of 0 to 10 Volts DC (VDC), within the range of 0 to 5 VDC, or within the range of 2-10 VDC.

Also, the additional control circuitry 118 is coupled, at least indirectly, by third, fourth, and fifth communication links 174, 176, and 178, respectively, with the damper motor 130, the first on/off gas valve 146 of the first gas train segment 132, and the second on/off gas valve 156 of the second gas train segment 138. The additional control circuitry 118 operates to provide first additional signals by way of the third communication link 174 to control and/or provide power to the damper motor 130. More particularly in the present embodiment, the additional control circuitry 118 provides both power and control signals to the damper motor 130—that is, the additional control circuitry provides power to the damper motor and, when the motor is energized, the additional control circuitry also provides control signals to the damper motor 130 to modulate it, and to thereby control the rotational position and movements of the damper plate 128 of the air inlet damper 126.

The manner in which power and control signals are provided to the damper motor 130, and corresponding effects upon the air inlet damper 126 (and the damper plate 128 or other damper plate or plate portion(s) associated therewith), can vary depending upon the embodiment or operational circumstance. For example, as described in further detail below, in some embodiments encompassed herein, the additional control circuitry 118 may intentionally cut the power to the damper motor 130 to fully open the air inlet damper 126 (fail open), which can be considered one manner of controlling the position of the damper. Further for example, in some embodiments, power or control signals can be provided that cause discrete events (e.g., rotational position adjustments or movements) to happen to the air inlet damper 126. This can be accomplished, in some embodiments, by using relays, limit alarms, switching devices, or any other device(s) that, alone or in combination with one or more other processors, controllers, or other components or devices, can receive or input and monitor an analog electronic signal (e.g., a modulation signal as can be provided from the boiler controller 116) and output discrete events. By implementing such component(s) or device(s), the air inlet damper 126 (or damper plate 128 or other damper plate or plate portion(s) thereof) can modulate linearly and then suddenly open or close completely at predetermined levels of the analog electronic signal coming from the boiler controller 116. Also for example, in other embodiments, a programmable logic controller (PLC) or other controller or control device can be programmed to input and monitor the incoming analog electronic signal from the boiler controller 116 and to alter it over segments within the total modulation signal range that are predetermined to increase or decrease volume of air where appropriate, without having to use feedback sensors such as any type of flue sensors.

To the extent that the first additional signals provided via the third communication link 174 serve as control signals, the control signals can again for example take the form of a modulation signal (e.g., such as any of those mentioned above in regard to the control signals provided via the first and second communication links 170 and 172, including for example a PWM signal). Additionally, the fourth and fifth communication links 176 and 178 respectively operate to communicate second and third additional signals, respectively, to the first on/off gas valve 146 and the second on/off gas valve 156, respectively, so as to control whether those respective gas valves are opened or closed at any given time.

Notwithstanding the description provided herein regarding the first, second, third, fourth, and fifth communication links 170, 172, 174, 176, and 178, the present disclosure in alternate embodiments can include any of a variety of types and arrangements of communication links, including both wired and wireless communication links. For example, in some alternate embodiments, the first regulating gas valve 148 and second regulating gas valve 158 can take the form of valves that are controlled in response to control signals. In some such embodiments, the fourth communication link 176 can be understood to include multiple distinct communication links that respectively couple the additional control circuitry 118 to each of the respective first on/off and regulating gas valves 146 and 148, and the fifth communication link 178 can be understood to include multiple distinct communication links that respectively couple the additional control circuitry 118 to each of the second on/off and regulating gas valves 156 and 158. Also, the particular signals that are communicated via the communication links 170, 172, 174, 176, and 178 can take any of a variety of forms, and involve the communication of any of a variety of types of control signals, power signals, or other types of signals including, further for example, monitoring signals provided back to the additional control circuitry 118 or to the boiler controller 116, depending upon the embodiment or implementation.

Also, in some other embodiments, only one controller, such as the boiler controller 116 (operating as the main boiler controller), is employed to provide all of the control signals and/or power signals, without involvement by the additional control circuitry 118. For example, in another embodiment, the damper motor 130 of the air inlet damper 126 receives the output signals from the boiler controller 116 rather than from the additional control circuitry 118.

It will be appreciated from FIG. 1 that fluid flow (e.g., the flow of gases) within the improved high turnaround combustion system 100 proceeds as follows. First, air (e.g., from the environment) enters the air input port 122 and proceeds via the air flow tube 120, past the air inlet damper 126, to the first intermediate junction 124 and into the mixing plenum 114 as indicated by a first arrow 180. Additionally, gas (e.g., natural gas or other gaseous fuel) enters the first gas train segment 132 at the first gas inlet 134 as indicated by a second arrow 182 and passes to the second intermediate junction 136, as regulated by the first on/off and regulating gas valves 146 and 148, or gas enters the second gas train segment 138 at the second gas inlet 140 as indicated by a third arrow 184 and passes to the second intermediate junction 136, as regulated by the second on/off and regulating gas valves 156 and 158. Further, as represented by a fourth arrow 186, upon the gas reaching the second intermediate junction 136 via either of the first and second gas train segments 132 and 138, that gas is directed via the gas flow tube 142 past the third intermediate junction 144 and into the mixing plenum 114.

Within the mixing plenum 114, generally within a region 188, the air arriving from the air flow tube 120 mixes with the gas arriving from the gas flow tube 142. Then, the air-gas mixture flows to the blower 102 as represented by a fifth arrow 190 (continued mixing of the air and gas can also occur within the blower), and subsequently the air-gas mixture flows from the blower 102 to the burner 108 as indicated by a sixth arrow 192. Finally, upon reaching the burner 108, ignition and combustion of the air/gas mixture takes place and exhaust gases flow out of the burner 108 as represented by a seventh arrow 194. In the present embodiment, the improved high turnaround combustion system 100 is a fire tube boiler system in which high temperature combustion gases produced in the burner 108 flow through tubes, and in which water passes around the tubes and is thereby heated and boiled. However, the present disclosure is also intended to encompass other types of combustion systems such as watertube boilers such as packaged watertube boilers, in which water to be heated flows through tubes that pass within the high temperature combustion gases, as well as any of a variety of other combustion systems.

Because the second gas train segment 138 and the second on/off and regulating gas valves 156 and 158 thereof have a smaller capacity, the second gas train segment 138 is particularly suited for the lower range of modulation of the improved high turnaround combustion system 100. Also, because the first gas train segment 132 and the first on/off and regulating gas valves 146 and 148 thereof have a larger capacity, the first gas train segment 132 is particularly suited for the higher range of modulation of the improved high turnaround combustion system 100. Given that the first and second gas train segments 132 and 138 are suited for different ranges of modulation, the combination of those gas train segments allows for expanded overall high turndown performance.

In the present embodiment, the first on/off gas valve 146 and second on/off gas valve 156 of the gas input section 112 are controlled so that, at any given time, only one of those gas valves is open and the other of those gas valves is closed (or, possibly, at some times, both of those gas valves are closed). Thus, in the present embodiment, gas may flow into the gas flow tube 142 at any given time from only one of the first and second gas train segments 132 and 138, depending upon whether it is the first on/off gas valve 146 that is open or the second on/off gas valve 156 that is open at that time. However, in alternate embodiments, the first and second on/off gas valves 146 and 156 can be actuated so that, although at certain times only one of those gas valves may be opened when the other one of those gas valves is closed (or, at some times, both of those gas valves may be closed), in other times both of those gas valves may simultaneously be opened. In such a circumstance in which both of the first and second on/off gas valves 146 and 156 is opened, gas will flow into the gas flow tube 142 (and thus to the mixing plenum 114) from both of the first and second gas train segments 132 and 138.

Nevertheless, in the present embodiment, only one of the first and second gas train segments 132 and 138 communicates gas to the gas flow tube 142 (and thus to the mixing plenum 114) at any given time. More particularly, during operation of the improved high turnaround combustion system 100, assuming that initial operation begins with the blower 102 operating at a low speed in accordance with a low modulation output signal from the boiler controller 116, correspondingly the additional control circuitry 118 will send first and second additional signals to the first and second on/off gas valves 146 and 156 causing the first on/off gas valve 146 to be closed and the second on/off gas valve 156 to be opened. In this circumstance, gas will flow to the mixing plenum 114 via the second gas train segment 138 but not via the first gas train segment 132. Further, the flow rate of the gas flow through the second gas train segment 138 will be determined by the speed of the blower (operating in accordance with the first control signal provided by the first communication link 170) as well as the degree to which the second regulating gas valve 158 is opened (as determined by the pressure sensed by the pressure sensor associated with that regulating gas valve)

As the boiler controller 116 causes the speed of the blower 102 to increase, the flow rate of the gas flow drawn into mixing plenum 114 via the second gas train segment 138 will correspondingly continue to increase. As the speed of the blower 102 reaches a medium speed, it will become appropriate for the gas flow into the mixing plenum 114 to be provided via the larger capacity, first gas train segment 132 rather than the smaller capacity, second gas train segment 138. Accordingly, at this point, the additional control circuitry 118 will modify the second and third additional signals that are sent to the first and second on/off gas valves 146 and 156 so as to cause the first on/off gas valve 146 to be opened and the second on/off gas valve 156 to be closed. In this circumstance, gas will flow to the mixing plenum 114 via the first gas train segment 132 but not via the second gas train segment 138, and the flow rate of the gas flow through the first gas train segment 132 will be determined by the degree to which the first regulating gas valve 148 is opened, which in turn will depend upon the speed of the blower 102 in accordance with the first control signal provided by the first communication link 170. Further, if the boiler controller 116 continues to increase the modulation output of the third additional signal so as to cause the speed of the blower 102 to ramp up beyond this medium speed, gas will continue to be drawn into the mixing plenum 114 via the first gas train segment 132, at increasing flow rates.

Inversely, as the boiler controller 116 decreases its modulation output signal, the blower ramps down in speed, which causes less air and gas to be drawn in the mixing plenum 114. Assuming that initial operation begins with the blower 102 operating at a high speed in accordance with a high modulation output signal from the boiler controller 116, correspondingly the additional control circuitry 118 will send second and third additional signals to the first and second on/off gas valves 146 and 156 causing the first on/off gas valve 146 to be opened and the second on/off gas valve 156 to be closed. In this circumstance, gas will flow to the mixing plenum 114 via the first gas train segment 132 but not via the second gas train segment 138. Further, the flow rate of the gas flow through the first gas train segment 132 will be determined by the degree to which the first regulating gas valve 148 is opened, which in turn will depend upon the speed of the blower 102 in accordance with the first control signal provided by the first communication link 170.

As the boiler controller 116 causes the speed of the blower 102 to decrease, the flow rate of the gas flow drawn into mixing plenum 114 via the first gas train segment 132 will correspondingly continue to decrease. As the speed of the blower 102 reaches a medium speed, it will become appropriate for the gas flow into the mixing plenum 114 to be provided via the smaller capacity, second gas train segment 138 rather than the larger capacity, first gas train segment 132. Accordingly, at this point, the additional control circuitry 118 will modify the second and third additional signals that are sent to the first and second on/off gas valves 146 and 156 so as to cause the first on/off gas valve 146 to be closed and the second on/off gas valve 156 to be opened. In this circumstance, gas will flow to the mixing plenum 114 via the second gas train segment 138 but not via the first gas train segment 132, and the flow rate of the gas flow through the second gas train segment 138 will be determined by the degree to which the second regulating gas valve 158 is opened, which in turn will depend upon the speed of the blower 102 in accordance with the first control signal provided by the first communication link 170. Further, if the boiler controller 116 continues to decrease the modulation output of the first control signal so as to cause the speed of the blower 102 to ramp down below this medium speed, gas will continue to be drawn into the mixing plenum 114 via the second gas train segment 138, at decreasing flow rates.

By virtue of this arrangement, enhanced overall turndown performance is achieved because, as the boiler modulates from minimum input to maximum input, the control system formed by the boiler controller 116 and the additional control circuitry 118 switches from causing gas to primarily (or entirely) flow into the mixing plenum 114 via the smaller, second on/off and regulating gas valves 156 and 158 to causing gas to primarily (or entirely) flow into the mixing plenum via the larger, first on/off and regulating gas valves 146 and 148. Likewise, as the boiler modulates from maximum input to minimum input, the control system formed by the boiler controller 116 and the additional control circuitry 118 switches from causing gas to primarily (or entirely) flow into the mixing plenum 114 via the larger, first on/off and regulating gas valves 146 and 148 to causing gas to primarily (or entirely) flow into the mixing plenum via the smaller, second on/off and regulating gas valves 156 and 158.

Notwithstanding the above description, even with the presence of both of the first gas train segment 132 with the larger gas valves 146 and 148 and the second gas train segment 138 with the smaller gas valves 156 and 158, turndown performance can still be limited if the damper plate 128 is of conventional design. The damper plate 128 of the air inlet damper 126 is positioned using the damper motor 130, which is controlled based upon the first additional signals received from the additional control circuitry 118, which is under the further control of the boiler controller 116. If the damper plate 128 is of conventional design, and if the first additional signals controlling the positioning of the damper plate are linear, then it may be difficult to achieve the careful adjustment of the system to achieve desired high quality combustion because of the lack of an ability to provide appropriate nonlinear correction.

Figure 2:
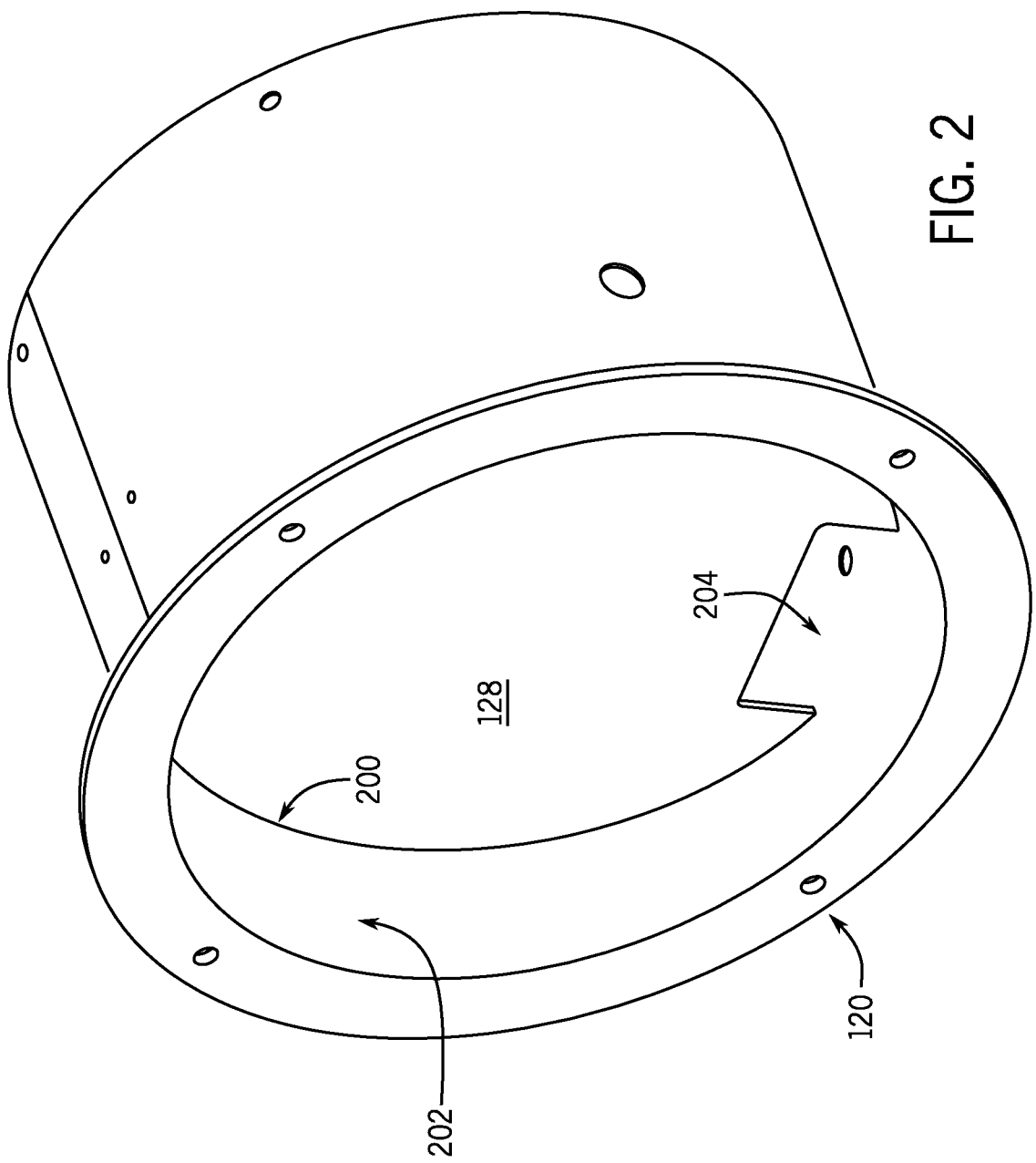
FIG. 2 shows a front perspective view of a damper face plate (or simply damper plate) mounted within an air flow tube of the combustion system of FIG. 1.
Figure 3:
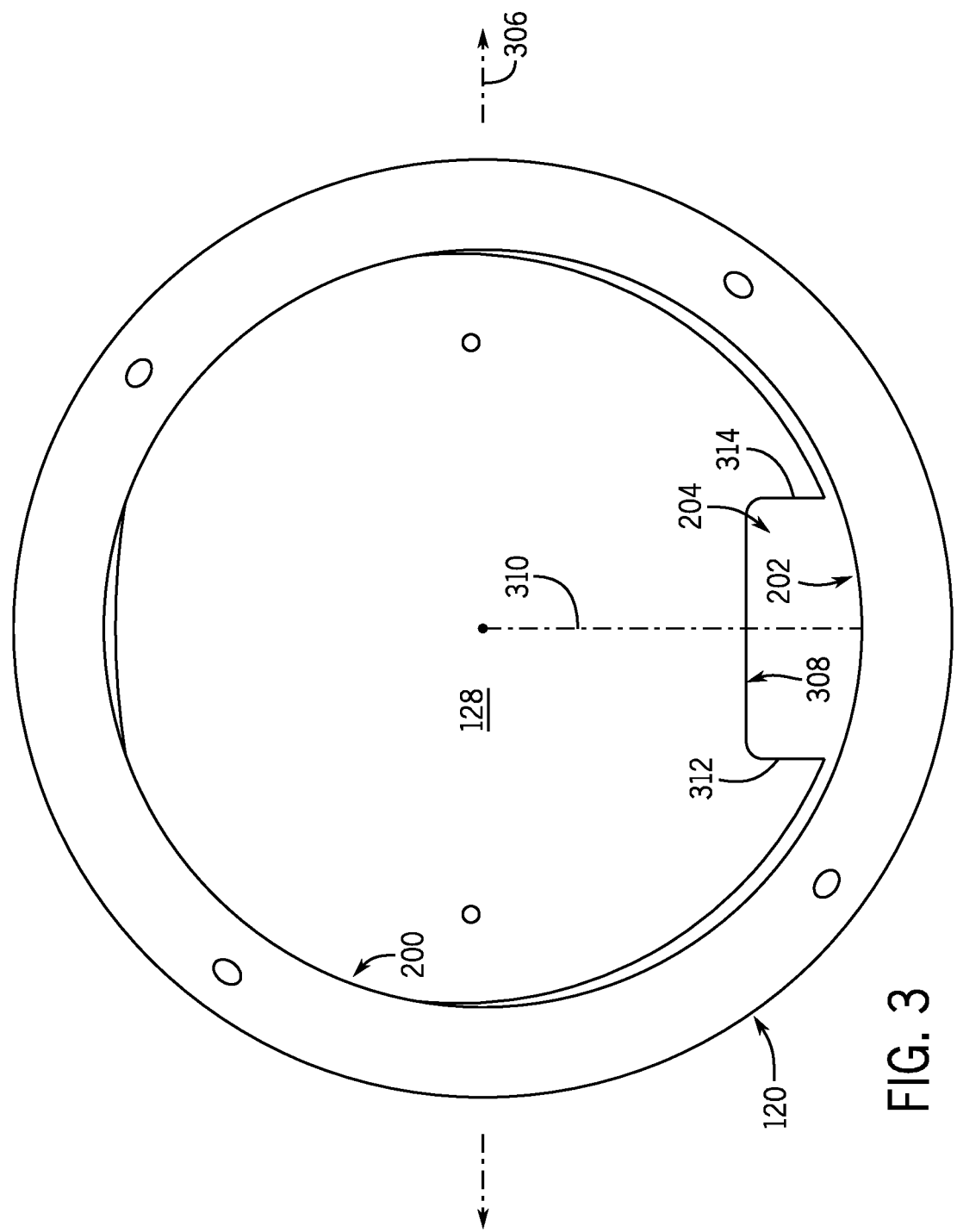
FIG. 3 shows a front elevation view of the damper plate within the air flow tube of FIG. 2.

In view of these considerations, the damper plate 128 of the improved high turnaround combustion system 100 in the present embodiment takes a form shown in FIGS. 2 and 3. More particularly in this regard, FIG. 2 shows a front perspective view of the damper plate 128 mounted within the air flow tube 120, and FIG. 3 shows a front elevation view of the damper plate within the air flow tube. As shown, the damper plate 128 is generally a circular flat plate having a first, outer circumferential edge (or simply outer circumference) 200 that is substantially identical in size to an inner cross-sectional area of the air flow tube 120 as defined by an inner cylindrical wall 202 of the air flow tube. With such a configuration, when the damper plate is rotated (by the damper motor 130 shown in FIG. 1) to be arranged normal to a central axis of the air flow tube as shown in each of FIG. 2 and FIG. 3, the damper plate largely blocks air flow through the air flow tube 120.

At the same time, in the present embodiment, the damper plate 128 also has a cutout 204 that in the present illustration is positioned along the bottom portion of the outer circumference 200, below a rotational axis 306 about which the damper plate rotates when actuated by the damper motor 130 (see FIG. 3). In the present example embodiment, the cutout 204 is substantially rectangular in shape, with a long edge 308 extending perpendicular to a radius 310 extending radially inwardly from the outer circumference 200 through the middle of the cutout, and with short edges 312 and 314 extending inwardly from outer circumference to the long edge 308 in a manner that is parallel to the radius 310. Further, in terms of size, the length of the long edge 308 is less than about one-eighth of the outer circumference 200 and the length of each of the short edges 312 and 314 is less than about one-third of the radius 310 of the damper plate 128.

By employing this design for the damper plate 128, both in terms of the shape and construction of the damper plate, the air inlet damper 126 can be operated so that the damper plate attains a fully closed (or substantially fully closed) position as shown in FIG. 2 and FIG. 3, attains a fully open (or substantially fully open) position in which the damper plate is rotated 90 degrees about the axis 306 relative to the position shown in FIGS. 2 and FIG. 3, or any position in between those fully closed and fully open positions. The fully closed position as shown in FIG. 2 and FIG. 3 can be a rotational position in which the outer circumference 200 is in (or is nearly in) contact or flush with the inner surface of the air flow tube 120, and the fully open position can be a rotational position in which the damper plate 128 is perpendicular to (or substantially perpendicular to) its fully closed position. In this manner, the air inlet damper can be fully closed or fully opened, or positioned to varying degrees in between those fully closed and fully opened positions, when required at any point of the combustion curve, which is the curve of combustion byproducts versus modulation range. In alternate embodiments, the damper plate 128 can be rotated within other ranges, such as from 0 to 180 degrees about the axis 306 (where for example each of the 0 and 180 degree positions can be fully closed positions) or other more limited ranges such as 210 degrees of rotation or 75 degrees of rotation.

It should be appreciated further that, in this embodiment due to the cutout 204, even when the damper plate 128 is rotated to be fully closed, a minimal amount of air flow past the damper plate can still occur. That is, even when the damper plate 128 attains the fully closed position shown in FIG. 2 and FIG. 3, a small amount of air can still pass by the damper plate by way of the cutout 204. The amount of air that can pass by the damper plate 128 when fully closed due to the cutout 204 can vary depending upon the embodiment and particularly the size of the cutout 204 relative to the cross section of the air flow tube 120. For example, in some embodiments, the flow pathway through the cutout 204 can be any of 1% to 20% of the cross-section of the air flow tube.

Figure 4:
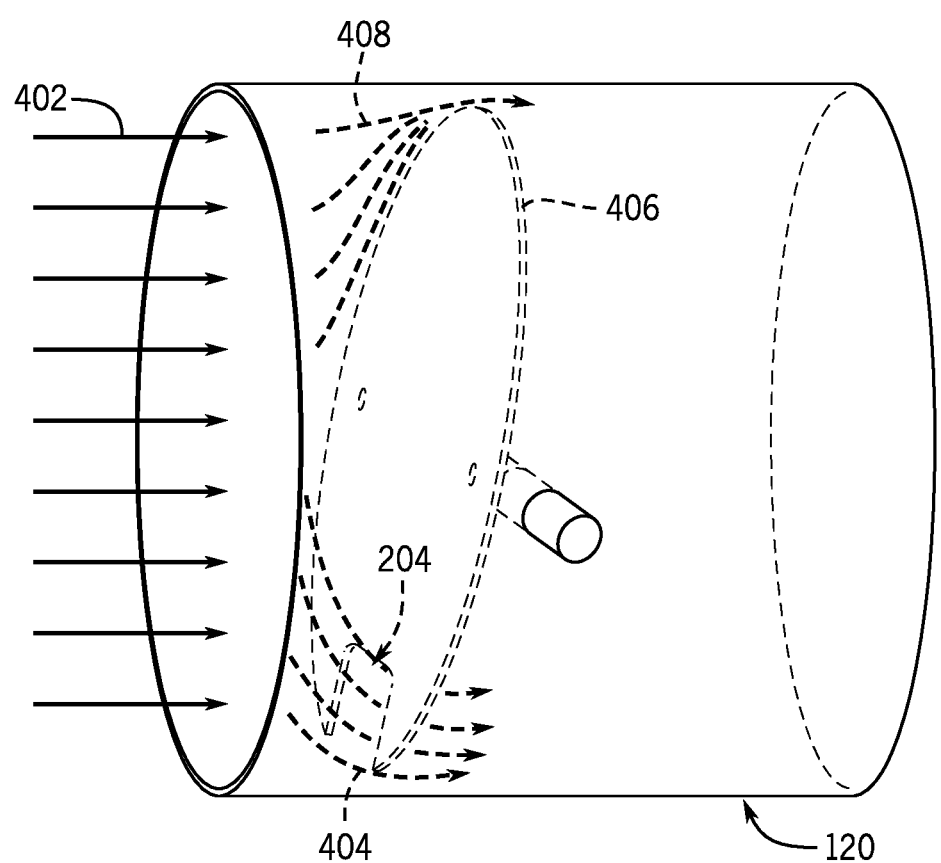
FIG. 4 is an additional side perspective view of the damper plate and air flow tube of FIGS. 2 and 3 that illustrates how, when the damper plate is in a particular rotational position, air flows past the damper plate.

In addition to allowing at least some air flow past the damper plate 128 when fully closed, this design of the air inlet damper 126 enables the air inlet damper to modulate in small or large increments at any point of the modulation range. That is, the air inlet damper 126 can be operated to modulate more finely at the lower end of modulation range of the combustion system 100 (e.g., when the blower 102 is ramped down) so that the damper plate 128 allows a proportionate amount of air to mix with the gas flow from the smaller, second on/off gas valve 156 and second regulating gas valve 158 of the second gas train segment 138. In this regard, FIG. 4 is additionally provided to illustrate how, when the damper plate 128 is rotated so as to be almost fully closed, but not fully closed, air flow passing into the air flow tube 120 as represented by arrows 402 flows past the damper plate principally in two locations, namely, through the cutout 204 as represented by first additional arrows 404 and additionally over an upper edge 406 of the damper plate as represented by second additional arrows 408.

Further, after the combustion system 100 transitions to the larger, first on/off gas valve 146 and first regulating gas valve 148 of the first gas train segment 132 corresponding to the higher end of the modulation range (e.g., when the blower 102 is ramped up), the damper plate 128 can be actuated so as to be in its fully open position, or it can be modulated more coarsely to allow a much larger volume of air to mix in with the higher amount of gas flow coming from those larger gas valves. To be fully open, the damper plate 128 is in a completely horizontal position which places it in parallel with the air flow going into the blower 102. This is so that at the maximum modulation signal, when damper is fully open, there is very little to no obstruction in the path of air flow to allow the blower to draw more air in as it ramps up.

Improved high turnaround operation by the combustion system 100 with the damper plate 128 having the cutout 204 particularly can be achieved when appropriate electromechanical components are employed in regard to actuating the air inlet damper 126 and thus controlling the position of the damper plate 128. As noted above, in the present embodiment, the damper motor 130 of the air inlet damper 126 is controlled by first additional signals provided by the additional control circuitry 118 (and/or indirectly by the boiler controller 116), as communicated to the damper motor via the third communication link 174. The additional control circuitry 118 and/or the boiler controller 116 can be programmed to open or close the air inlet damper 126 (particularly the damper plate 128) by a larger or smaller margin than a linear opening when the boiler controller 116 first control signal (modulation signal) provided to the blower 102 by the first communication link 170 is ramping up or down. Alternatively, the additional control circuitry 118 and/or boiler controller 116 can be used in combination with relays to achieve the same task.

Thus, by employing both the damper plate 128 having the cutout 204 in combination with such electromechanical devices, the air inlet damper 126 can be operated to its fully closed position when the combustion system 100 is operating at a minimum modulation signal (corresponding to minimum speed of the blower 102). In such circumstance, a very low rate of gas flow is matched with a very low rate of air flow to achieve clean combustion and ultimately high turn down when combustion levels are at a minimum. Although the cutout 204 allows for such desired operation when the air inlet damper 126 is operated to be fully closed at times of low combustion, the air inlet damper 126 even with the cutout 204 can still also be controlled to be opened, up to a fully opened position, to allow for desired operation at higher combustion levels.

Notwithstanding the above discussion regarding FIGS. 1, 2, 3, and 4, the present disclosure also encompasses additional embodiments having different forms of air inlet dampers and associated damper plates. For example, although the damper plate 128 includes the cutout 204, in another embodiment encompassed herein, the damper plate need not include any cutout (that is, the plate can be a full, solid disk without any portion removed corresponding to the cutout 204) but still can achieve improved high turndown operation. In such embodiment, when the combustion system 100 is operating at a minimum modulation signal (corresponding to minimum speed of the blower 102), the boiler controller 116 and additional control circuitry 118 can actuate the damper motor 130 to cause the damper plate 128 to be opened to a minimum angle to allow very little air in, so as to achieve the same or substantially the same performance achieved by combustion system 100 employing the damper plate 128 having the cutout 204. That is, in such embodiment, the "fully closed" position of the damper plate is not fully closed in the sense of the damper plate being rotated so as to be fully in contact or flush with the interior surface of the air flow tube, but rather the damper plate is closed to a maximum degree in which the damper plate is almost, but not quite, fully in contact or flush with the interior surface of the air flow tube, such that a small amount of air can still flow past the damper plate when in this position.

Further, in addition to the embodiment having the cutout 204 shown in FIGS. 2, 3, and 4 and the above-discussed alternate embodiment in which no cutout is present, the present disclosure also envisions and encompasses additional embodiments employing air inlet dampers and associated damper plates having different features that enable even further enhanced high turndown performance. Indeed, although the embodiment having the cutout 204 shown in FIGS. 2, 3, and 4 (as well as the above-discussed alternate embodiment in which no cutout is present) can achieve enhanced high turndown performance by comparison with many conventional combustion systems, even this embodiment can be limited in certain respects in terms of high turndown performance. This can be understood from a more detailed understanding of how the combustion system 100 operates when the damper plate 128 with the cutout 204 is employed.

More particularly, when the damper plate 128 with the cutout 204 is employed in the combustion system 100, that damper plate has a small air opening at a minimum modulation signal—that is, when the damper plate is fully closed, air still flows through the cutout. In this circumstance, the first control signals provided by the boiler controller 116 to the blower 102 and to the air inlet damper 126 increase over (by) small increments. Further, when the modulation signal starts to take off and increase beyond the minimum modulation signal, the blower 102 speed starts ramping up, which causes greater amounts of air and gas to be drawn into the mixing plenum 114. However, the damper motor 130 at this time may rotate the damper plate 128 inside the air flow tube 120 (or within the mixing plenum) only slightly (e.g., when the damper plate 128 is opened slightly in response to the modulation signal increasing, for example, into a mid-range). If this occurs (even though the damper plate 128 operates in a desirable manner to reduce air flow when the modulation signal is at a minimum), the opening formed between the damper plate 128 and inner cylindrical wall 202 can still be too small to provide desired operation. Indeed, in this circumstance, when the damper plate 128 has only been rotated slightly from a fully-closed position, overly-rich combustion (e.g., with undesirably high combustion byproducts such as $CO_2$ and CO) can occur due to the slight opening formed between the damper plate 128 and the inner cylindrical wall 200 and consequent low air flow past the damper plate. In contrast, significant air flow past the damper plate 128 that avoids overly-rich combustion begins to occur particularly when the damper plate 128 is rotated significantly so that the opening between the damper plate 128 and inner cylindrical wall 200 becomes larger.

The present inventors have recognized that a reason for this limitation on the quality of combustion at this mid-range type of operation is that one or more portions of the first gas train segment 132 and the second gas train segment 138 of the gas input section 112 (forming an overall gas train) may be fixed and not be changeable or adjustable in a practical manner during operation. For example, one or more portions of the gas input section 112 may have been set or adjusted by manual valves (or implemented with specific valves that are sized) particularly to match or be appropriate for the low air flow at the minimum modulation signal (when the blower 102 operation is at a low level, involving low or slow speed). In such case, changing the settings of the manual parts (e.g., manual valves) to improve the combustion process during the mid-range portion of the operational curve can result in decreases to the combustion quality at the low-range part of the operational curve (at the minimum modulation signal). Further for example, one or more portions of the gas input section 112 may have been set or adjusted by manual valves (or implemented with specific valves that are sized) particularly to match or be appropriate for medium air flow at a mid-level modulation signal. In such case, changing the settings of the manual parts (e.g., manual valves) to improve the combustion process during the low modulation portion of the operational curve can result in decreases to the combustion quality at the middle-range part of the operational curve.

Further, at the mid-level range of operation, there is an additional challenge as well that relates to gas valve tracking. Because the combustion system 100 tracks pressure to correct flow, performance may suffer (in terms combustion quality) when flow is low because the pressure changes may be too small to detect. One manner of addressing this challenge would be to open the air inlet damper 126, only in that (mid-range) segment of the combustion range/curve, excessively or nonlinearly. That is, on the one hand, it would be desirable for the air inlet damper 126 to be fully closed (with minimum airflow proceeding through the cutout 204) at the minimum modulation signal to restrict the air so that gas flow can be reduced as much as possible to achieve very high turn down. Additionally, on the other hand, it would be desirable for the air inlet damper 126 to substantially— indeed, excessively or exponentially—open as soon as the modulation rate increases. Further, after the modulation and speed of the blower 102 (and blower fan) have picked up sufficiently such that there is enough gas flow to be detected by the gas valve(s) tracking mechanism, the air inlet damper 126 can return to operation in which the damper plate 128 is actuated to open linearly over smaller/default increments.

Figure 5:
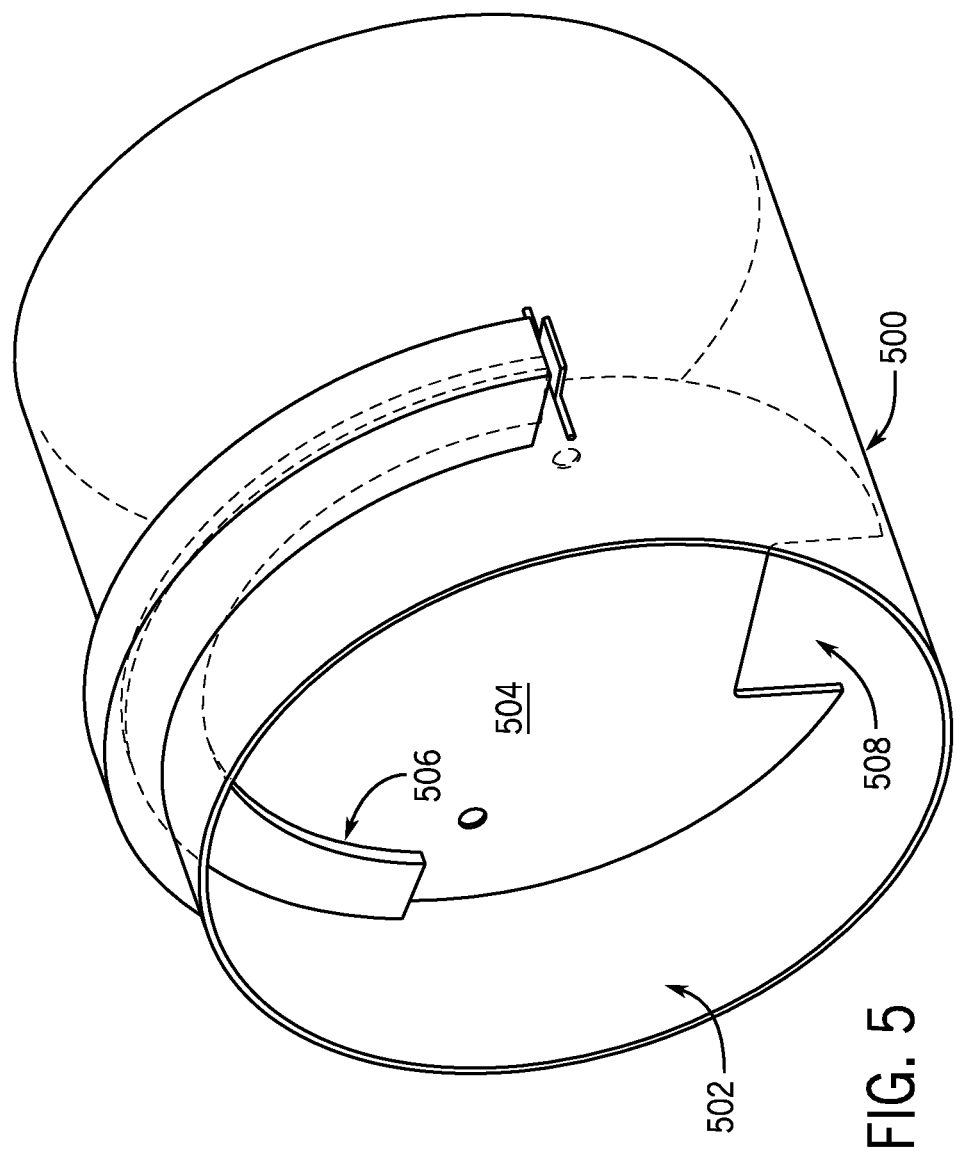
FIG. 5 shows a front perspective view of a two-piece damper plate arrangement mounted within an air flow tube in accordance with an additional embodiment encompassed herein.
Figure 6:
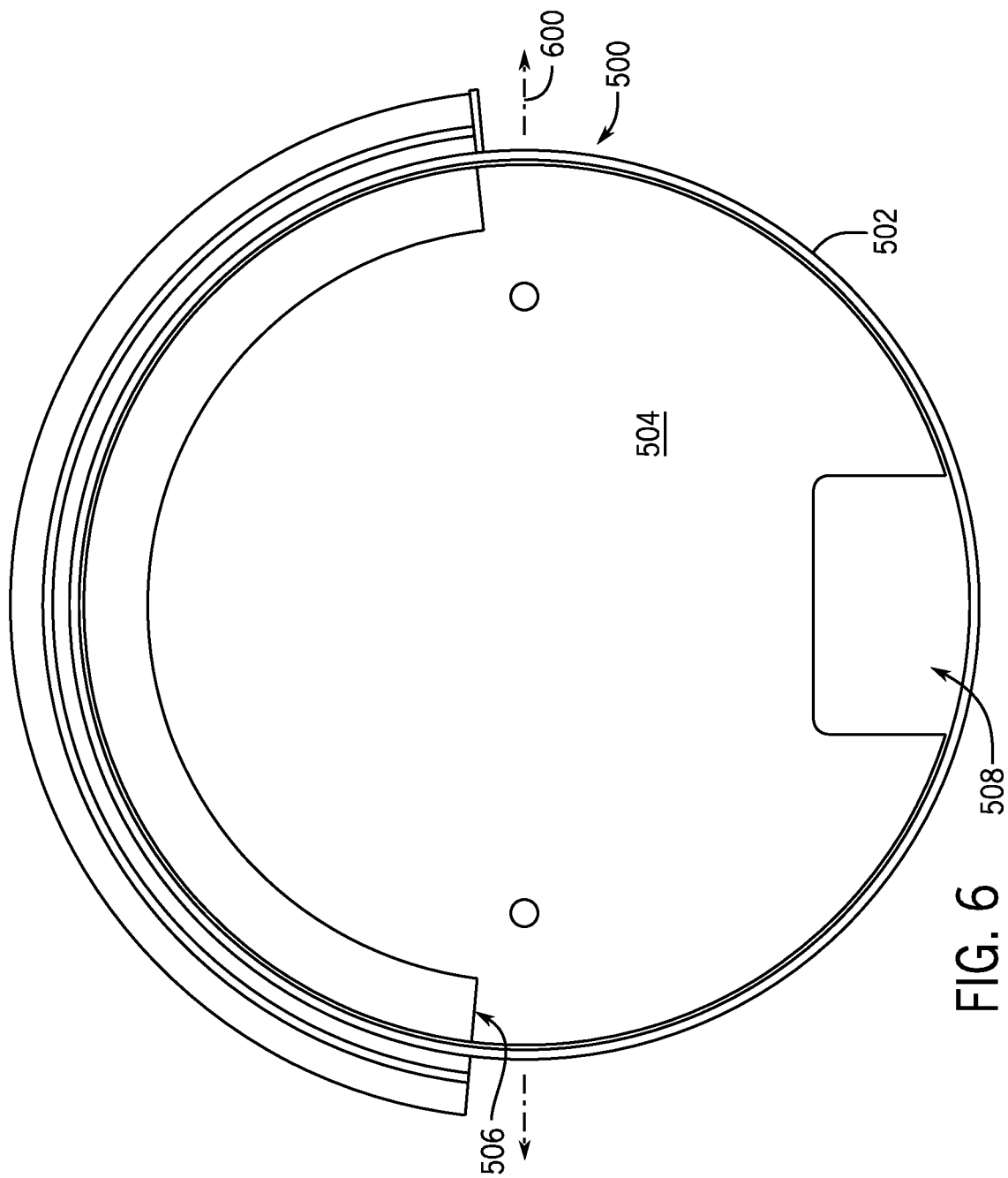
FIG. 6 shows a front elevation view of the two-piece damper plate arrangement within the air flow tube of FIG. 5.
Figure 7:
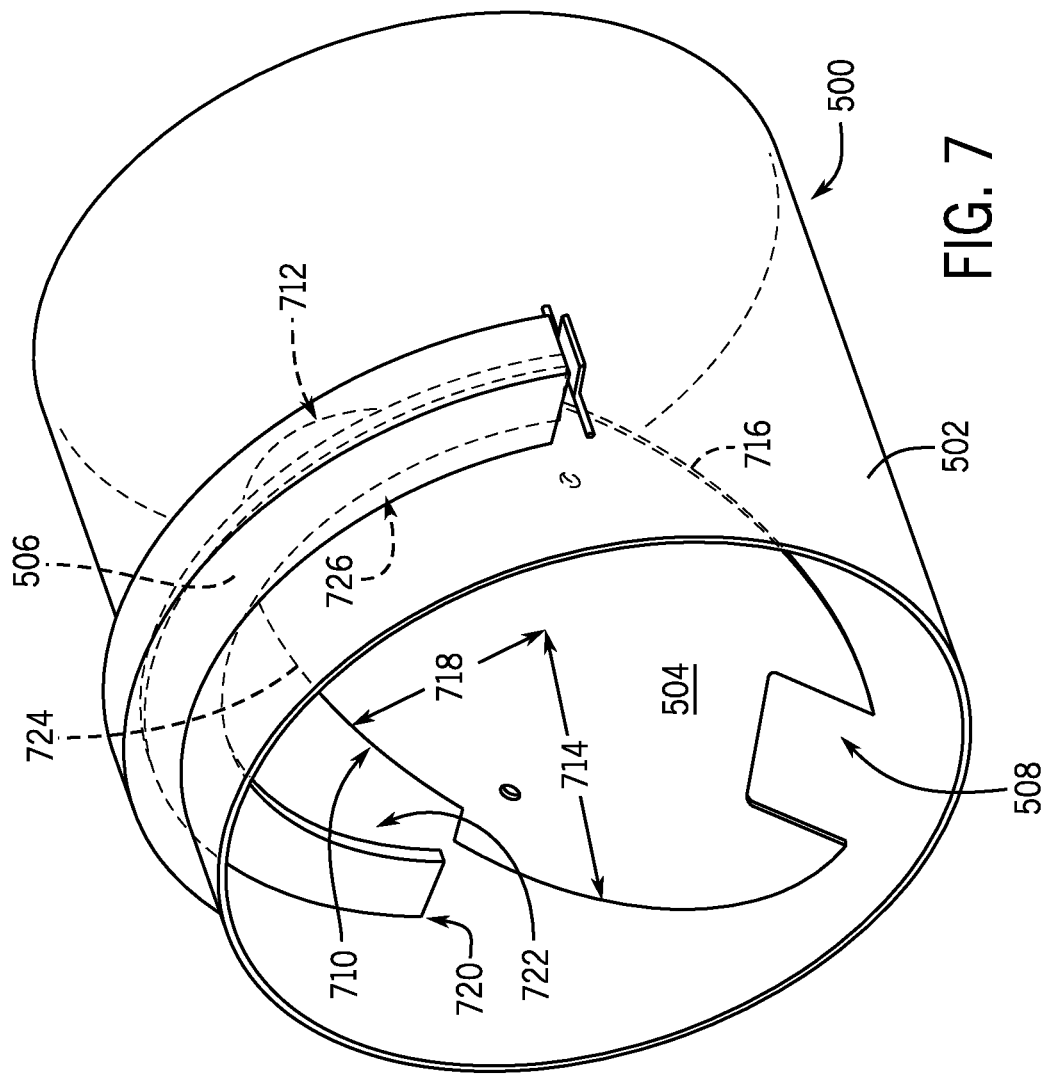
FIG. 7 shows the two-piece damper plate arrangement of FIGS. 5 and 6 to be arranged in a partly-open position.

The present inventors have recognized these considerations and, in view of these considerations, have developed additional embodiments of combustion systems that can achieve further enhanced high turndown-operation by implementing one or more additional improved designs of damper plates (and air/gas inlet tubes or mixing tubes). Referring to FIGS. 5, 6, and 7, in one additional embodiment encompassed herein, an improved high turnaround combustion system is identical to the combustion system 100 except insofar as the combustion system employs a two-piece damper plate arrangement 500 in place of the damper plate 128 (with the cutout 204) of FIGS. 2, 3, and 4. More particularly in this regard, FIG. 5 shows a front perspective view of the two-piece damper plate arrangement 500 mounted within an air flow tube 502 taking the place of the air flow tube 120, and FIG. 6 shows a front elevation view of the damper plate arrangement 500 within the air flow tube 502. As discussed in regard to the air flow tube 120 and mixing plenum 114, the air flow tube 502 can also be considered part of, or is integrally formed with, a mixing plenum (or tube). In contrast to FIGS. 5 and 6, which show the two-piece damper plate arrangement 500 to be arranged in a fully closed position, FIG. 7 additionally is provided to show the two-piece damper plate arrangement to be arranged in a partly-open position.

Further as shown in FIGS. 5 and 6, the two-piece damper plate arrangement 500 more particularly includes a primary damper plate (or simply primary plate) 504 and a secondary damper plate (or simply secondary plate) 506. The primary plate 504 is largely identical to the damper plate 128 and particularly again includes a cutout 508 that is identical to the cutout 204 of the damper plate 128. As with the damper plate 128, the primary plate 504 can be rotated about an axis 600 as shown in FIG. 6. However, as is particularly visible in FIG. 7, the primary plate 504 differs from the damper plate 128 insofar as the primary plate also includes an additional substantially-semicircular perimeter cutout 710 along an upper half 712 of the primary plate, opposite the cutout 508. Due to the presence of the additional substantially-semicircular perimeter cutout 710, although the primary plate 504 has a first radial extent 714 along most of a lower half 716 of the primary plate, the primary plate has a second radial extent 718 along the upper half 712 of the primary plate, where the second radial extent 718 is less than the first radial extent 714.

Further, the secondary plate 506 is a semicircular arc that extends radially inwardly from an upper portion 720 of an inner cylindrical surface 722 of the air flow tube 502. Although the additional substantially-semicircular perimeter cutout 710 substantially matches the secondary plate 506 in terms of shape and size, the second radial extent 718 of the primary plate 504 still extends outward far enough that an outer perimeter 724 of the primary plate along the upper half 712 extends radially outward past an inner edge 726 of the secondary plate. Consequently, when the primary plate 504 is controlled to attain a fully-closed position relative to the air flow tube 502, the primary plate extends radially outward beyond the inner edge 726 such that the primary plate slightly overlaps the secondary plate 506, as shown in FIGS. 5 and 6. That is, when the primary plate 504 is fully closed, it comes into contact with the secondary plate 506 such that the two parts seal and together form the shape of a complete damper plate. Also, to be fully open, the primary plate 504 is in a completely horizontal position which places it in parallel with the air flow going into the blower 102. This is so that at the maximum modulation signal, when the primary plate 504 is fully open, there is very little to no obstruction in the path of air flow to allow the blower to draw more air in as it ramps up.

Figure 8:
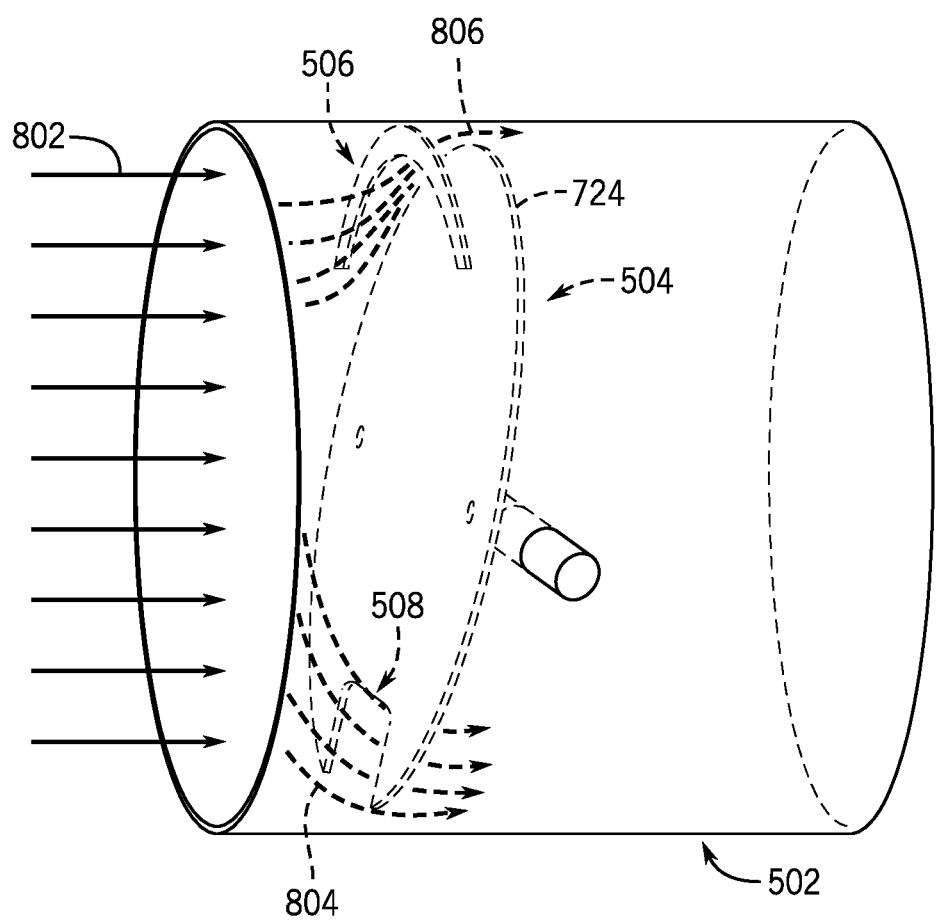
FIG. 8 is additionally provided to illustrate how, when a primary plate of the two-piece damper plate arrangement of FIGS. 5, 6, and 7 is rotated to a particular position, air flow passes past the damper plate arrangement.

Use of the two-piece damper plate arrangement 500 in place of the damper plate 128 can be advantageous for the following reasons. It will be appreciated that, if the two-piece damper plate arrangement 500 is employed in a combustion system that also has the boiler controller 116 and additional control circuitry 118 described above, then when the blower 102 is controlled to have a minimum speed (due to a minimum modulation signal) the only air flow should go through the cutout 508 in the damper plate for the reasons previously mentioned. However, once the modulation signal starts increasing, air flow is increased rapidly (and in a nonlinear manner relative to the changes in the modulation signal coming from the boiler controller 116) due to the now extra opening on top of the damper plate that exists due to the additional cutout 710, and the amount of increase is substantially great when compared to a conventional damper plate. In this regard, FIG. 8 is additionally provided to illustrate how, when the primary plate 504 is rotated so as to be almost fully closed, but not fully closed, air flow passing into the air flow tube 502 as represented by arrows 802 flows past the damper plate principally in two locations, namely, through the cutout 508 as represented by first additional arrows 804 and additionally over the outer perimeter 724 of the damper plate as represented by second additional arrows 806.

In the embodiment of FIGS. 5, 6, and 7, the secondary plate 506 is fixed in position relative to the air flow tube 502 and is a single piece that extends as an arc approximately half-way around the primary plate 504. Nevertheless, in alternate embodiments, the secondary plate 506 can take other forms. For example, in some alternate embodiments, the secondary plate 506 can be replaced by multiple plates (or subplates) that together occupy the same or substantially the same space within the air flow tube 502 as is occupied by the secondary plate 506 as shown in FIGS. 5, 6, and 7. Also for example, in some alternate embodiments, one or more plates such as or corresponding the secondary plate 506, including for example the aforementioned multiple plates that may take the place of the secondary plate 506, can be movably or rotatably attached to the air flow tube 502, such as by way of one or more hinges. In some such embodiments, such one or more movable plates can be made of a light material (e.g. plastic). It should further be understood that, in at least some alternate embodiments, one or more plates (or other obstructions) corresponding to the secondary plate 506 can have a different shape than the secondary plate 506. For example, in some embodiments, such one or more plates need not form an arc extending halfway or substantially halfway around the primary plate 504, but rather can form an arc that extends less of an extent around the primary plate (in which case the primary plate can also have a cutout that is lesser in circumferential extent than the cutout 508). Also for example, in some embodiments, such one or more plates can occupy a circular segment region rather than an arc region.

Figure 9:
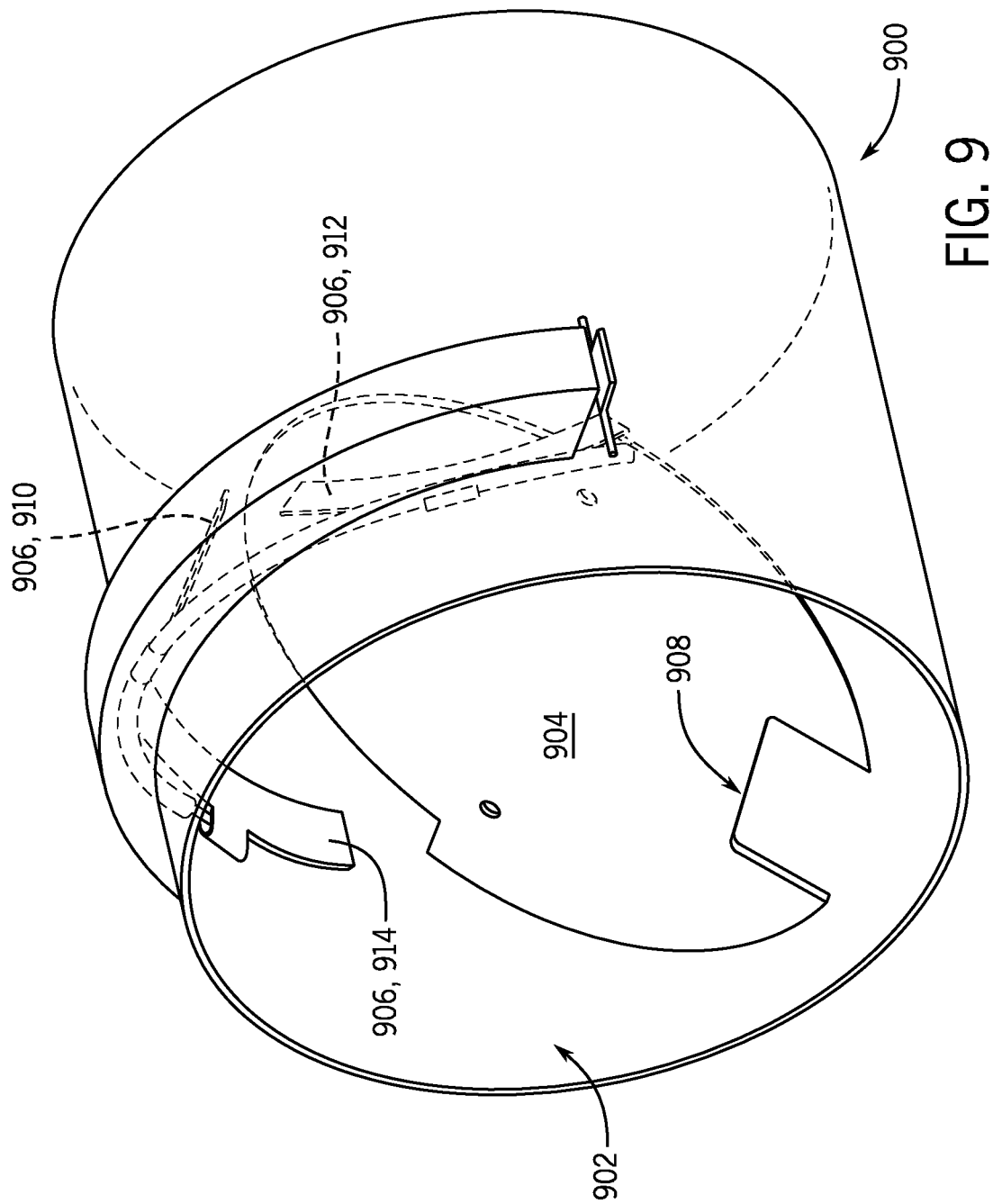
FIG. 9 shows a front perspective view of a four-piece damper plate arrangement mounted within an air flow tube in accordance with a further embodiment encompassed herein.
Figure 10:
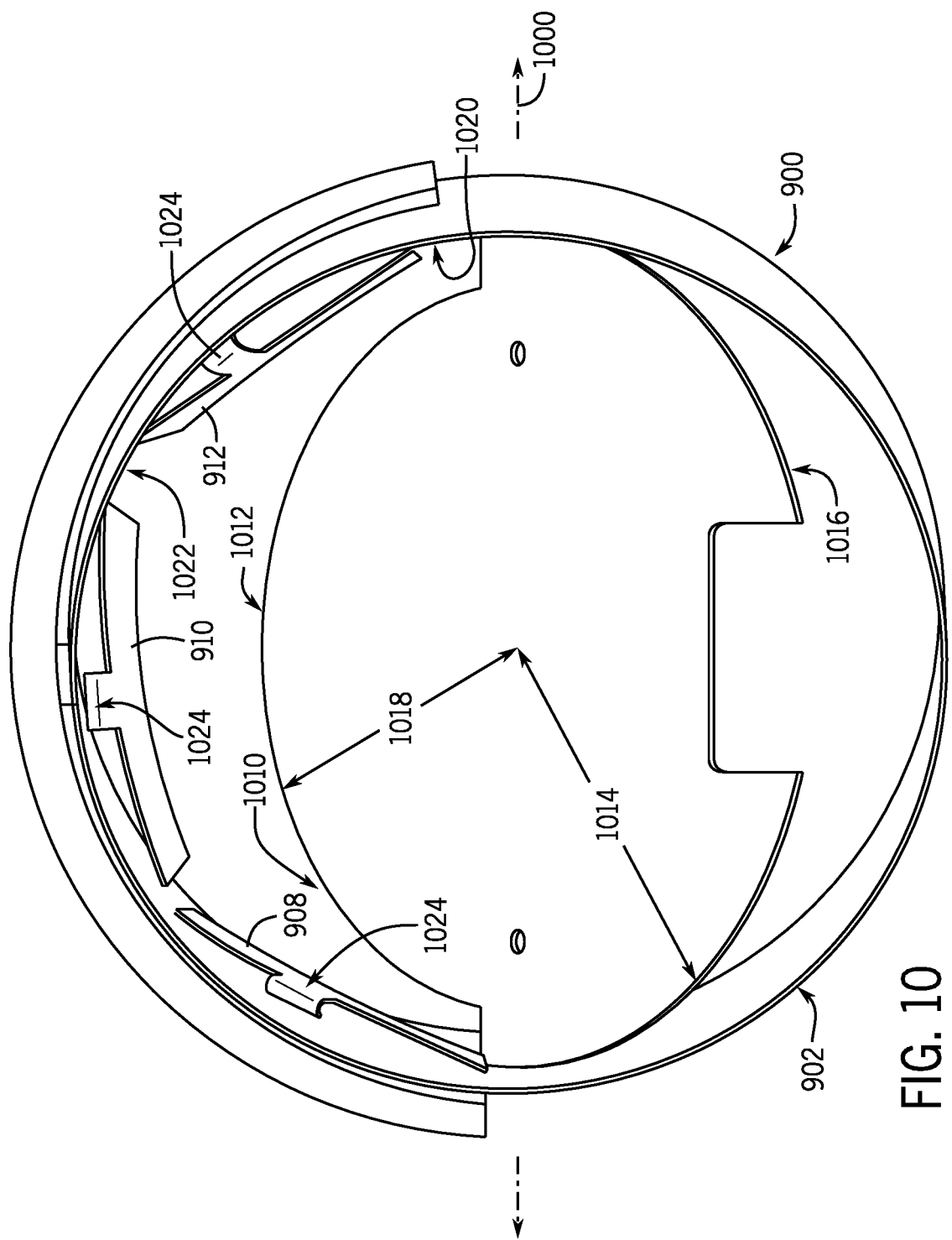
FIG. 10 shows a front elevation (or substantially front elevation) view of the damper plate arrangement within the air flow tube of FIG. 9.

Further in this regard, in an additional embodiment encompassed herein, an improved high turnaround combustion system is identical to the combustion system 100 except insofar as the combustion system employs a four-piece damper plate arrangement 900 as shown in FIGS. 9 and 10 in place of the two-piece damper plate arrangement 500 of FIGS. 5, 6, 7, and 8. More particularly in this regard, FIG. 9 shows a front perspective view of the four-piece damper plate arrangement 900 mounted within an air flow tube 902 taking the place of the air flow tube 502 (or air flow tube 120), and FIG. 10 shows a front elevation (or substantially front elevation) view of the damper plate arrangement 900 within the air flow tube 902. As discussed in regard to the air flow tube 120 and mixing plenum 114, the air flow tube 902 can also be considered part of, or is integrally formed with, a mixing plenum (or tube).

Further as shown in FIGS. 9 and 10, the four-piece damper plate arrangement 900 more particularly includes a primary plate 904 and multiple secondary plates (or plate portions or subplates) 906 that, in the present embodiment, include first, second, and third plates 910, 912, and 914, respectively. The primary plate 904 is identical (or at least substantially identical) to the primary plate 504 and particularly again includes a cutout 908 that is identical to the cutout 508 of the primary plate 504 (and the cutout 204 of the damper plate 128). As with the primary plate 504 and damper plate 128, the primary plate 904 can be rotated about an axis 1000 as shown in FIG. 10. FIGS. 9 and 10 show the four-piece damper plate arrangement 900 to be arranged in a partly-open position, in which the primary plate 904 is approximately midway between being in a first position corresponding to the fully closed position of the damper plate arrangement (in which central axis of the primary plate would be aligned with the central axis of the air flow tube 902) and being in a second position corresponding to the fully open position of the damper plate arrangement (in which the central axis of the primary plate would be perpendicular to the central axis of the air flow tube).

In this embodiment, the primary plate 904 also includes an additional substantially-semicircular perimeter cutout 1010 along an upper half 1012 of the primary plate 904, opposite the cutout 908. The cutout 1010 can be identical to the cutout 710 of the primary plate 504. Again, due to the presence of the additional substantially-semicircular perimeter cutout 1010, although the primary plate 904 has a first radial extent 1014 along most of a lower half 1016 of the primary plate, the primary plate has a second radial extent 1018 along the upper half 1012 of the primary plate, where the second radial extent 1018 is less than the first radial extent 1014.

As for the multiple secondary plates 906, it should be appreciated that the first, second, and third plates 910, 912, and 914, respectively, are arranged in succession with one another circumferentially along an upper portion 1020 of an inner cylindrical surface 1022 of the air flow tube 902. Further, each of the first, second, and third plates 910, 912, and 914 is rotatably mounted in regard to the upper portion 1020 of the inner cylindrical surface 1022 by a respective hinge 1024. In at least some implementations, any one or more of the first, second, and third plates 910, 912, and 914 can be made of a light material such as plastic so that increased airflow can push the one or more plate(s) open, although absent sufficient airflow the plates will still tend to drop down to or toward closed positions due to gravity. Given this arrangement, when the first, second, and third plates 910, 912, and 914 are in fully closed positions, those plates together can occupy the same space as is occupied by the secondary plate 506 of the two-piece damper plate arrangement 500. When the first, second, and third plates 910, 912, and 914 are in such fully closed positions, and assuming that the primary plate 904 is also in a fully closed position, then the first, second, and third plates substantially or entirely block air flow through the additional substantially-semicircular perimeter cutout 1010, albeit air flow through the cutout 908 can still occur.

Additionally, during operation of the combustion system employing the four-piece damper plate arrangement 900, when modulation signal starts to increase and blower 102 starts to draw more air, then both the primary plate 904 and the multiple secondary plates 906 tend to move so as to allow more air flow. More particularly, as illustrated in FIGS. 9 and 10, when the primary plate 904 of the damper plate arrangement 900 starts to open due to air flow (even if slightly), the now higher air flow can push the first, second and third plates 910, 912, and 914 (that is, the hinged parts of the damper plate arrangement) to open to create an even bigger air channel. When the four-piece damper plate arrangement 900 is fully open, the primary plate 904 is in a completely horizontal position which places it in parallel with the air flow going into the blower 102. Also, each of the first, second, and third plates 910, 912, and 914 is rotated as far rearward as possible. This is so that at the maximum modulation signal, when four-piece damper plate arrangement is fully open, there is very little to no obstruction in the path of air flow to allow the blower to draw more air in as it ramps up. However, if the air flow is reduced—and assuming that the hinged parts formed by the first, second, and third plates 910, 912, and 914 have the correct weight (or weights)—then the first, second, and third plates will drop back into an upright position and the primary plate 904 will close behind those first, second, and third plates and create a seal again.

Figure 11:
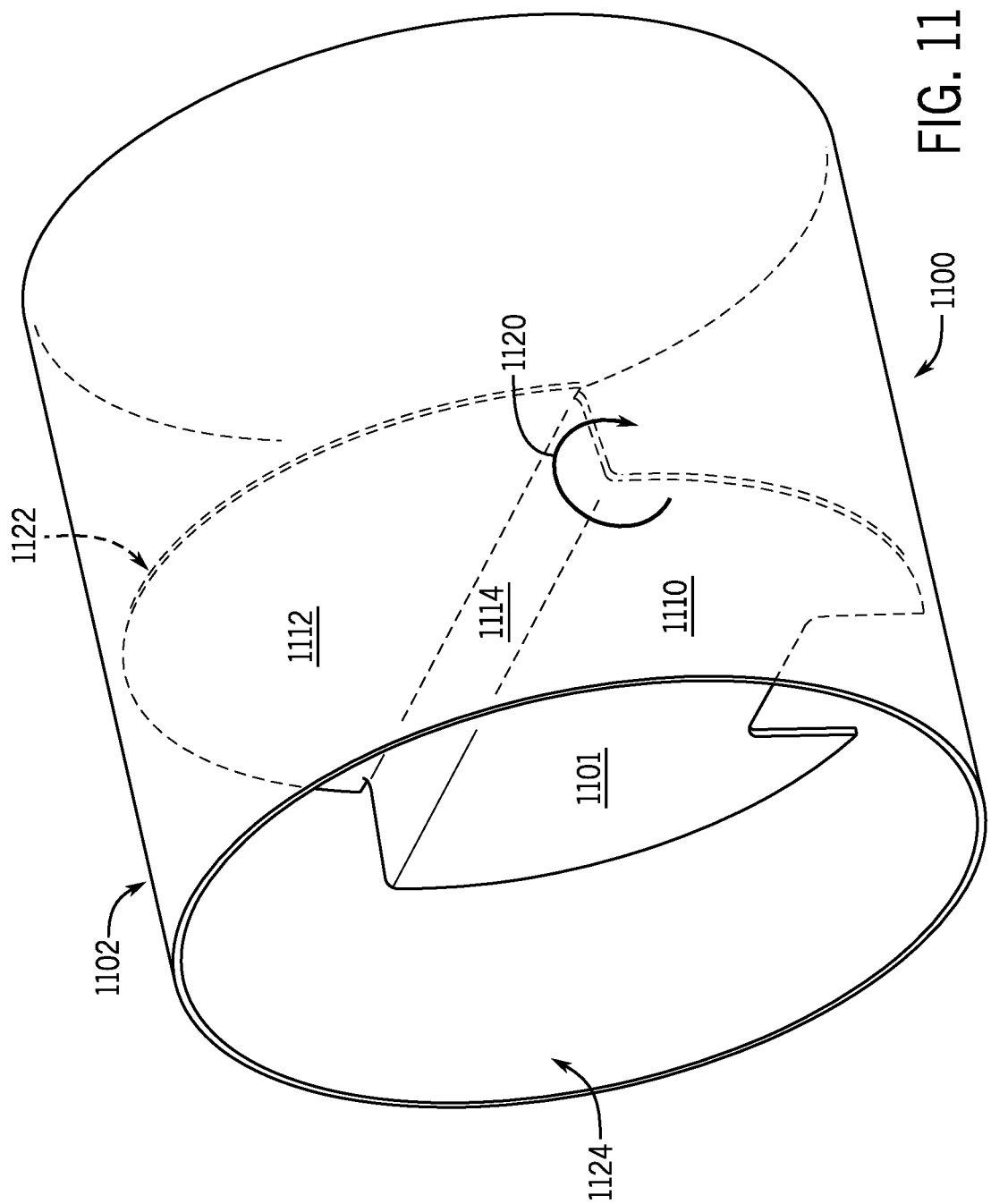
FIG. 11 shows a front perspective view of a Z-shaped damper plate mounted within an air flow tube, in accordance with an additional embodiment encompassed herein.
Figure 12:
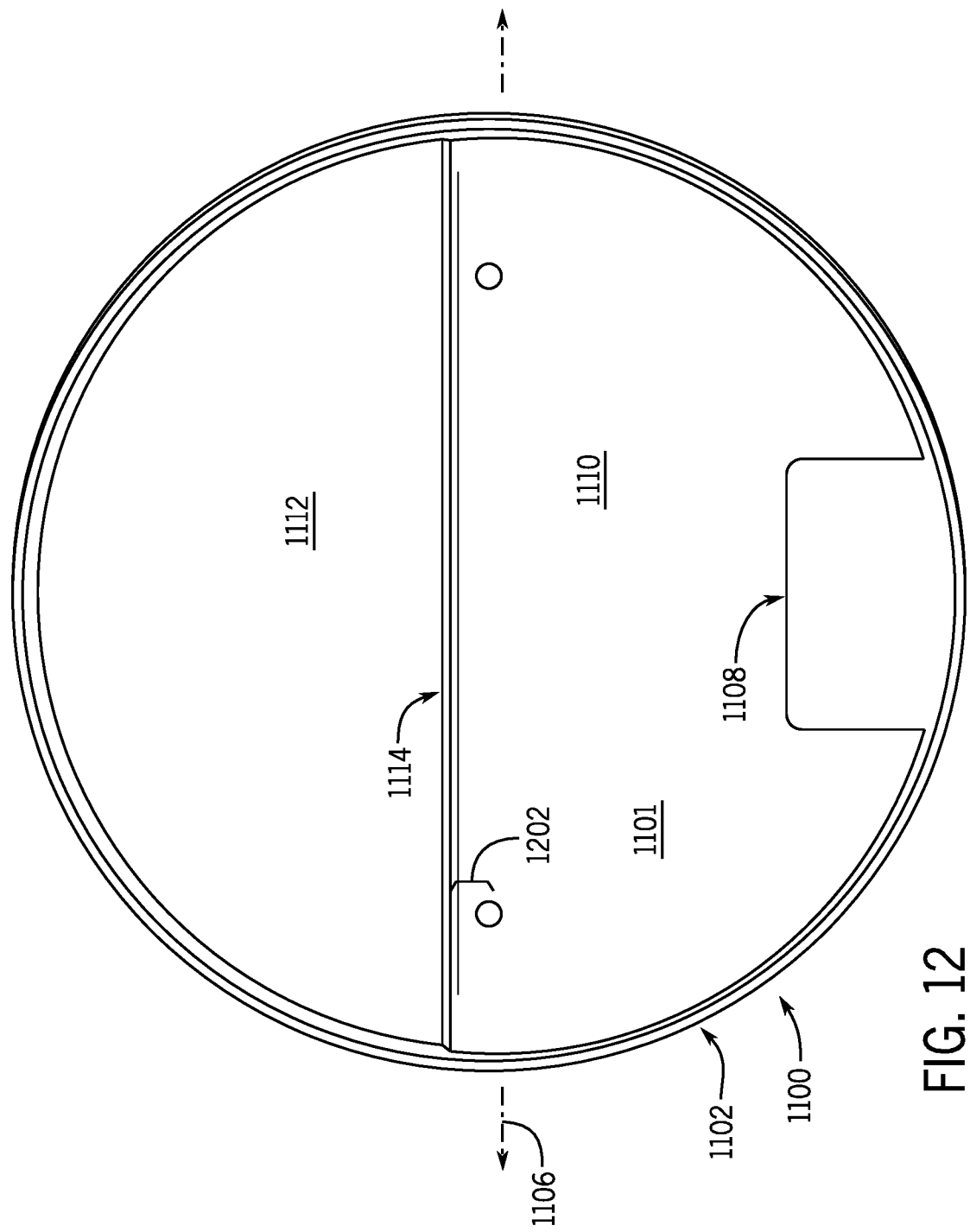
FIG. 12 shows a front elevation view of the Z-shaped damper plate of within the air flow tube of FIG. 11.

Additionally, in a further embodiment encompassed herein, an improved high turnaround combustion system is identical to the combustion system 100 except insofar as the combustion system employs a Z-shaped damper plate arrangement 1100 having a Z-shaped damper plate 1101 as shown in FIGS. 11 and 12 in place of the damper plate 128 of FIGS. 1, 2, 3, and 4. More particularly in this regard, FIG. 11 shows a front perspective view of the Z-shaped damper plate 1101 mounted within an air flow tube 1102 taking the place of the air flow tube 120, and FIG. 12 shows a front elevation view of the damper plate 1101 within the air flow tube 1102. As discussed in regard to the air flow tube 120 and mixing plenum 114, the air flow tube 1102 can also be considered part of, or is integrally formed with, a mixing plenum (or tube).

More particularly, the Z-shaped damper plate 1101 is similar to the damper plate 128 in that the Z-shaped damper plate includes a cutout 1108 that is identical to the cutout 208 of the damper plate 128, and is mounted for rotation within the air flow tube 1102 along a rotational axis 1106. However, although the damper plate 128 is a flat circular disk (expect for the cutout 208), the Z-shaped damper plate 1101 instead is a more complicated structure. In this regard, the Z-shaped damper plate 1101 includes a lower surface 1110, an upper surface 1112, and a connecting surface 1114 that links the lower surface 1110 with the upper surface 1112. Although each of the lower surface 1110 and upper surface 1112 is substantially half of the size of the Z-shaped damper plate 1101 (and substantially half of the size of the cross-section of the air flow tube 1102, in the present embodiment the lower surface 1110 is slightly larger than the upper surface 1112 and the connecting surface 1114 is positioned at a location that is above the rotational axis 1106 by an amount 1202 when the Z-shaped damper plate is in its fully closed position as shown in FIGS. 11 and 12. The cutout 1108 particularly is formed within the lower surface 1110.

When the Z-shaped damper plate 1101 is in a fully-closed position, each of the lower surface 1110 and upper surface 1112 is arranged to be normal to a central axis of the air flow tube 1102, and the connecting surface 1114 is arranged to extend in a manner parallel to that central axis. Thus, when the damper plate 1101 is in this fully-closed position, then the lower surface 1110 is upstream of the upper surface 1112, and particularly the upper surface 1112 is downstream of the rotational axis 1106, which is aligned with the lower surface. Given this configuration, the damper plate 1101 can appear to have a Z shape when looking from the side. This design also achieves the same goal as discussed above (e.g., with respect to the two-piece and four-piece damper plate arrangements 500 and 900) insofar as the Z-shape of the Z-shaped damper plate 1101 serves to create a bigger opening on top when damper is slightly open. Indeed, because the upper surface 1112 is downstream of the rotational axis 1106, rotation of the Z-shaped damper plate 1101 away from the fully closed position shown in FIGS. 10 and 11 in a direction indicated by an arrow 1120 about the rotational axis 1106 (again shown in FIG. 12) will result in an upper edge 1122 of the Z-shaped damper plate moving away from an inner surface 1124 of the air flow tube 1102 in a significant manner. Accordingly, such rotation of the Z-shaped damper plate 1101 quickly results in the establishment of a significant air flow passageway past that damper plate.

Additionally, when the Z-shaped damper plate 1101 is fully open, the damper plate may be in a completely horizontal position which places each of the lower surface 1110 and upper surface 1112 in parallel with the central axis of the air flow tube 120, and thus in parallel with the air flow going into the blower 102. This is so that at maximum modulation signal, when the Z-shaped damper plate 1101 is fully open, there is very little to no obstruction in the path of air flow to allow the blower 102 to draw more air in as it ramps up. However, in alternate embodiments, the Z-shaped damper plate 1101 can be considered to be fully open when it has rotated from the fully closed position, in the direction of the arrow 1120, toward but not all of the way to the position at which the lower surface 1110 and upper surface 1112 are parallel to the axis of the air flow tube 120.

In view of the above discussion concerning FIGS. 1 through 12, it should be recognized that at least some embodiments encompassed herein entail operation in which nonlinear variation of air flow through the air flow tube 120 (e.g., from the air input section 110 to the first intermediate junction 124) is determined or influenced at least in part by the physical shape(s) or characteristic(s) of an air damper plate or air damper plate portion(s) (e.g., the damper plate 128, the Z-shaped damper plate 1101, or one or more of the component damper plate portion(s), such as the primary plate 504 of FIG. 5).

It should be recognized that, in some such embodiments, nonlinear variation of air flow through the air tube 120 in response to variation (or modulation) of the signal output by the boiler controller 116 is achieved by the physical shape(s) or characteristic(s) of an air damper plate or air damper plate portion(s). That is, when actuation of the air inlet damper 126 (e.g., in terms of control over the damper motor 130 and corresponding actuation of any air damper plate or plate portions such as the air damper plate 128) occurs in response to a control signal (or additional modulation signal) provided by the additional control circuitry 118 that varies in a linear manner relative to the signal output by the boiler controller 116, the movements of the air damper plate or air damper plate portion(s) are controlled to occur in a linear or substantially linear manner relative to the signal output by the boiler controller. Yet, even with this being the case, air flow through the air tube 120 will still vary nonlinearly with changes in the control signal from the additional control circuitry 118 (and relative to changes in the modulation signal output by the boiler controller 116) if the air damper plate or air damper plate portion(s) is or are configured to have particular physical shape(s) or characteristic(s).

For example, in some such embodiments, the boiler controller 116 can output an electronic modulation signal (e.g., within the range of 4-20 mA or the range of 0-10 VDC) and the additional control circuitry 118 can output an electronic modulation signal for receipt by the damper motor 130 (e.g., via the third communication link 174) that is the same as, or proportional to, that electronic modulation signal output by the boiler controller 116. (Indeed, in some such embodiments, the additional control circuitry 118 need not be present, and the electronic modulation signal output by the boiler controller can be directly provided to the air inlet damper 126 or damper motor 130 thereof.) Further for example, supposing that the electronic modulation signal output by the additional control circuitry 118 has a current range of 4-20 mA or a voltage range of 0-10 VDC, variation of the electronic modulation signal within that current or voltage range can cause corresponding (e.g., proportional) movements of the air damper plate or plate portions that achieve 0 to 100% opening of the air inlet damper. In such case, if the electronic modulation signal takes on a value of 4 mA or a value of 0 VDC, then in that circumstance the air damper plate or plate portions would be closed, and if the electronic modulation signal takes on a value of 20 mA or 10 VDC, then in that circumstance the air damper plate or plate portions would be fully opened. Additionally, if the electronic modulation signal takes on any value between 4 mA and 20 mA, or between 0 VDC and 10 VDC, then in that circumstance the air damper plate or plate portions would be partly-opened or partly-closed to an extent that is proportional to the signal value relative to the minimal and maximum values of the signal range. Therefore, in this example, the relationship between changes in the position of the air damper plate (or plate portions) and changes in the electronic modulation signal coming from the additional control circuitry 118 is linear.

In such embodiments, even when control over movements of the air damper plate or air damper plate portion(s) in response to control signals occurs in a linear or substantially linear manner, nonlinear variation in air flow past the air inlet damper can still be achieved due to the physical shape(s) or characteristic(s) of the air damper plate or air damper plate portion(s) (e.g., the damper plate 128, the Z-shaped damper plate 1101, or one or more of the component damper plate portion(s), such as the primary plate 504 of FIG. 5). That is, the air inlet damper 126 with the air damper plate or air damper plate portion(s) can be operated to serve as a modulating damper that achieves nonlinear variation in air flow past the air inlet damper, in response to the electronic modulation signal provided by the additional control circuitry 118, even when the movements of the air damper plate or plate portion(s) are controlled to occur in a manner that linearly corresponds to the electronic modulation signal. Stated in another manner, an air flow path past the air inlet damper 126 (e.g., as understood to be a cross-sectional area within passage through which air flow occurs, where the cross-sectional area is perpendicular or substantially perpendicular to the direction of flow) varies nonlinearly in cross-sectional area in response to variation of the electronic modulation signal provided by the additional control circuitry 118 (which, in the present embodiment, is linearly based upon the electronic modulation signal provided by the boiler controller 116 to the additional control circuitry). Also, it should be appreciated that such nonlinear variation in the air flow past the air inlet damper 126 (occurring in response to the electronic modulation signal provided by the additional control circuitry 118) can be achieved not only due to the physical shape(s) or characteristic(s) of the air damper plate or air damper plate portion(s) of the air inlet damper itself, but also due to the complexity added to the air flow as a result of the air inlet damper acting in combination (or parallel) with a variable speed blower such as the blower 102, which is also changing the flow of air.

However, it should also be appreciated that, in further embodiments encompassed herein, nonlinear variation of air flow through the air flow tube 120, in response to variation in the electronic modulation signal provided by the boiler controller 116, is determined or influenced additionally or instead by controlling the positions or movements of the air damper plate 128 (or, depending upon the embodiment, other air damper plates or plate portions such as the primary plate 504 or Z-shaped damper plate 1101) of the air inlet damper 126. Such positions or movements can be governed or influenced by the control signals provided to the damper motor 130 of the air inlet damper 126 based upon the particular structure, configuration, programming, or other characteristics or features of the electrical control device(s) of the combustion system 100, such as the additional control circuitry 118 (and/or possibly operation of the boiler controller 116).

The particular manners in which positions or movements of the air damper plate 128 (or other air damper plates or plate portions) of the air inlet damper 126 are controlled to occur can vary depending upon the embodiment or operational circumstance. In some embodiments, a method of controlling the air inlet damper 126 involves modifying an electronic modulation signal output by the boiler controller 116, by the additional control circuitry 118, so as to generate electronic signal(s) that is or are provided to, and control(s), the air inlet damper 126 (and particularly the damper motor 130 thereof), such that the position of the air damper plate (or plate portions) changes nonlinearly in response to the changes in the electronic modulation signal. For example, in some such embodiments, the additional control circuitry 118 operates to generate additional electronic signal(s) based upon the electronic modulation signal from the boiler controller 116 by varying that electronic modulation signal from the boiler controller in predetermined segments within the signal range coming from the boiler controller (e.g., so as to take on different values at respective predetermined segments), such that the air inlet damper 126 changes position in a nonlinear manner in response to changes in the electronic modulation signal from the boiler controller. Also, in some such embodiments, the air inlet damper 126 can modulate and then suddenly open or close completely in a predetermined spot in response to the analog modulation signal (electronic modulation signal) coming from the boiler controller 116, such as when the analog modulation signal reaches or passes certain predetermined setpoints.

Such manners of operation can be achieved through the use of a variety of different circuits or devices (or components) depending upon the embodiment. For example, in some embodiments, relays or limit alarms (and/or other device(s)) are implemented as the additional control circuitry 118. Such relays or limit alarms (or other device(s)) can input and monitor an analog signal such as the electronic modulation signal coming from the boiler controller 116 (which again for example can be an industry standard signal such as a signal within the ranges of 4-20 mA or 0-10 VDC, or a pulse input) and provide modified electronic signal(s) in response to that analog signal that is or are adjusted in discrete manners. Effectively, through the implementation of such relays or limit alarms (or other device(s)), the additional control circuitry 118 can operate to output discrete events, that is, operate to make discrete events happen to the air inlet damper 126. Additionally for example, in some embodiments, the additional control circuitry 118 can include or take the form of a programmable logic controller (PLC), microcontroller, or other controller or control device. In some such embodiments, the PLC (or other controller or control device) can be programmed to input and monitor the incoming analog (e.g., electronic modulation) signal from the boiler controller 116 and to alter it over segments within the total modulation signal range that are predetermined to increase or decrease volume of air flowing past the air damper 126 as appropriate, and in some embodiments in a nonlinear manner (in response to changes in the incoming electronic modulation signal from the boiler controller 116), without having to use feedback sensors such as any type of flue sensors.

In some embodiments, the additional control circuitry 118 can operate to cause nonlinear operation of the air inlet damper 126 (in response to changes in the incoming analog or electronic modulation signal provided by the boiler controller 116) by starting or ceasing the delivery of power to the air inlet damper. Further for example, in some embodiments, the limit alarms, relays, other device(s), PLCs, or other controllers or control devices operate to cut power from the air inlet damper 126 with the damper being in fail-open mode. It should be appreciated that, when the air inlet damper 126 is controlled or governed to operate or be adjusted in a nonlinear manner (in response to changes in the incoming analog or electronic modulation signal provided by the boiler controller 116), this also tends to result in nonlinear adjustments of air flow past that air inlet damper as a result (again in response to changes in the incoming analog or electronic modulation signal provided by the boiler controller). Stated in another manner, such operation tends to result in nonlinear adjustments to the cross-sectional area of the flow passage past the air inlet damper, in response to changes in the incoming analog or electronic modulation signal provided by the boiler controller 116.

Also, in some embodiments, the additional control circuitry 118 can operate to cause nonlinear operation (including nonlinear positional adjustments or movements) of the air inlet damper 126, in response to changes in the incoming analog or electronic modulation provided by the boiler controller 116, in other manners. For example, in one additional embodiment, the additional control circuitry 118 can cause the air inlet damper 126 to modulate from a closed status toward an open status on a continuous basis (e.g., across a continuous spectrum) but then suddenly switch to a fully open position halfway through the modulation range (e.g., in terms of the modulation range of the electronic modulation signal output by the boiler controller 116) and remain in the fully open position throughout the rest of the range. Also for example, in another embodiment, the additional control circuitry 118 employs a PLC that receives the electronic modulation signal from the boiler controller 116 and alters that signal to be nonlinear (in response to changes in the incoming analog or electronic modulation signal provided by the boiler controller 116) before sending that altered signal to the damper motor 130 to actuate the air inlet damper 126 only over predetermined segments of the entire modulation range that would be otherwise linear (in response to changes in the analog or electronic modulation signal from the boiler controller).

Figure 13:
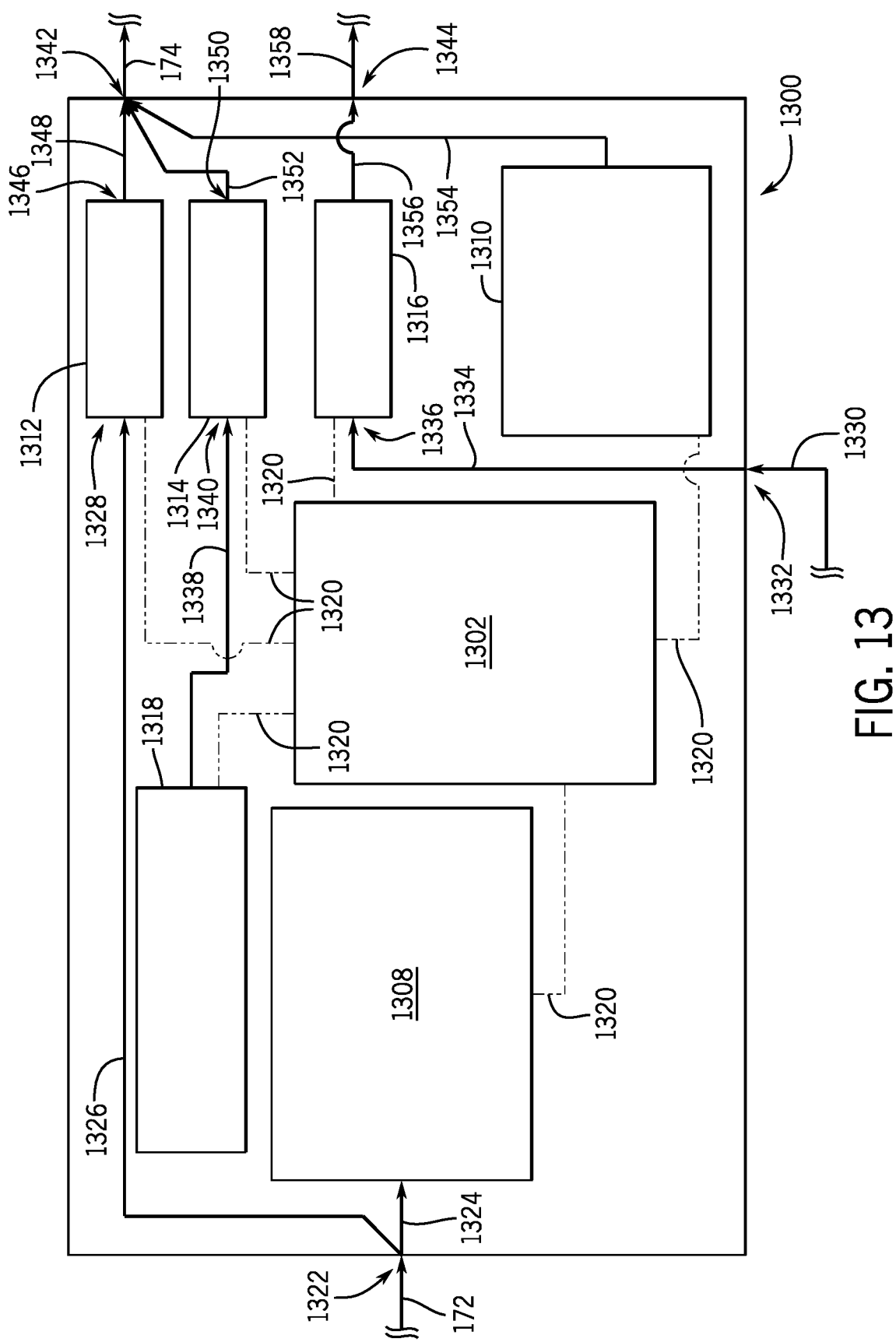
FIG. 13 shows a block diagram illustrating additional control circuitry that can be implemented as part of an improved high turndown combustion system in at least some embodiments encompassed herein.

Further in this regard, FIG. 13 provides a block diagram illustrating additional control circuitry 1300 that, in at least some embodiments encompassed herein, can serve as (or in place of) the additional control circuitry 118 described above. As shown, the additional control circuitry 1300 in the present embodiment includes a processing device 1302. The processing device 1302 can be, for example, a microcontroller, a PLC, a microprocessor, or any other type of processor or controller or control device In the present embodiment, the processing device 1302 operates in accordance with a computer program (or code, algorithm, or sequence), which can be stored in a memory device (not shown) associated with the processing device, and which determines or defines the operation of the additional control circuitry 1302. In the present embodiment, the computer program in accordance with which the processing device 1302 operates particularly determines how the additional control circuitry 1300 operates to generate or provide output signals based upon or in response to input signals, and thus governs, controls, determines, or defines the relationship(s) between the physical inputs and outputs of the additional control circuitry 1300.

In addition to the processing device 1302, the additional control circuitry 1300 further includes input circuitry 1308, output circuitry 1310, first, second, and third output relays 1312, 1314, and 1316, respectively, and a signal source 1318. The processing device 1302 is coupled to each of the input circuitry 1308, output circuitry 1310, signal source 1318, and the first, second, and third output relays 1312, 1314, and 1316 by communication links 1320 (illustrated as dashed lines). By virtue of the communication links 1320, the processing device 1302 can receive monitoring signals or information from, and/or can send control signals to, one or more of the input circuitry 1308, output circuitry 1310, signal source 1318, and the first, second, and third output relays 1312, 1314, and 1316. By virtue of receiving such monitoring signals or information, and/or sending such control signals, the processing device 1302 can operate in response to the input signals and can govern the operation of, each of the input circuitry 1308, output circuitry 1310, signal source 1318, and first, second, and third output relays 1312, 1314, and 1316. With respect to the signal source 1318, it should also be appreciated that the signal source can output any of a variety of signals depending upon the embodiment or operational circumstance, such as a fixed voltage signal (e.g., VDC) or current (e.g., milliAmp) signal. Additionally with respect to the first, second, and third output relays 1312, 1314, and 1316, although the present embodiment of FIG. 13 shows these relays as being three independent circuit components, in other embodiments encompassed herein the relays can take other forms. For example, in an alternate embodiment, the first and second output relays 1312 and 1314 can be combined into a single relay device such as a SPDT (single pole double throw) relay.

More particularly, in the present embodiment, the additional control circuitry 1300 includes a first input port 1322 by which the additional control circuitry can receive an input signal that can be a control or modulation signal. In the present embodiment, the first input port 1322 particularly can be coupled to the second communication link 172 (see also FIG. 1), and the input signal received at the first input port can be a control signal output by the boiler controller 116, which can be an electronic modulation signal. As further illustrated by first and second internal communication links 1324 and 1326, respectively, the first input port 1322 is coupled to the input circuitry 1308 and to an input port 1328 of the first output relay 1312, respectively, so that the input signal received at the first input port is provided each of the input circuitry and the first output relay, respectively. In the present embodiment, the input circuitry 1308 can take the form of analog input circuitry (or any other circuitry) that is configured to receive and monitor an industry standard analog signal such as a 4-20 mA or 0-10 VDC signal (which can be the electronic signal output by the boiler controller 116). By virtue of the communication links 1320, the processing device 1302 can receive monitoring signals from the input circuitry 1308 that are indicative of, or based upon, the input signal received at the input circuitry from the first input port 1322 (via the first internal communication link 1324).

In addition to the first input port 1322, the additional control circuitry 1300 receives power by a power link 1330 (as provided from a power source, which is not shown) at a second input port 1332. A third internal communication link 1334 links the second input port 1332 within an input port 1336 of the third output relay 1316. Further, the signal source 1318 is coupled by a fourth internal communication link 1338 to an input port 1340 of the second output relay 1314. Further, the additional control circuitry 1300 includes a first output port 1342 and a second output port 1344. In the present embodiment, the first output port 1342 can be coupled to the air inlet damper 126 or damper motor 130 thereof (see FIG. 1) by the third communication link 174 (see also FIG. 1). Additionally, the first output port 1342 is coupled to each of an output port 1346 of the first output relay 1312 by a fifth internal communication link 1348, an output port 1350 of the second output relay 1314 by a sixth internal communication link 1352, and the output circuitry 1310 by way of a seventh internal communication link 1354. Further, an output port 1356 of the third output relay 1316 is coupled to the second output port 1344, which in turn can also be coupled to the air inlet damper 126 or damper motor thereof 130 (see FIG. 1) by a further power link 1358.

As noted above, by way of the communication links 1320, the processing device 1302 can send control signals to the output circuitry 1310, and the first, second, and third output relays 1312, 1314, and 1316 (as well as the input circuitry 1308 and signal source 1318). Depending upon the control signals that are sent, the processing device 1302 particularly can cause any of the first, second, and third output relays 1312, 1314, and 1316 to take on, respectively, an open-circuited (open) status or a short-circuited (closed) status, and also can determine whether any output signal is sent by the output circuitry 1310. It should be appreciated from FIG. 13 that, given that the second output port 1344 is coupled to output port 1356 of the third output relay 1316 (and assuming that power is received at the second input port 1332), power is provided to the further power link 1358 at the second output port 1344 when the third output relay 1316 has the short-circuited status but not provided to the further power link when the third output relay has the open-circuited status. Also, it should be appreciated that the first output port 1342 is coupled to each of the first output relay 1312, the second output relay 1314, and the output circuitry 1310, and so the particular signal that is present at an output by the output port 1342 will depend upon the actuation of those output relays and output circuitry as determined by the processing device 1302.

More particularly, if the processing device 1302 controls the first output relay 1312 to have a short-circuited status, controls the second output relay 1314 to have an open-circuited status, and controls the output circuitry 1310 to not provide any output signal, then the control signal received at the input port 1322 (e.g., the electronic modulation signal from the boiler controller 116, which can be an analog input signal) will be directly provided via the first output relay 1312 to the output port 1342, and in turn directed to the air inlet damper 126 via the third communication link 174. Alternatively, if the processing device 1302 controls the second output relay 1314 to have a short-circuited status, controls the first output relay 1312 to have an open-circuited status, and controls the output circuitry 1310 to not provide any output signal, then the signal output by the signal source 1318 will be directly provided via the second output relay 1314 to the output port 1342, and in turn directed to the air inlet damper 126 via the third communication link 174. Also, if the processing device 1302 controls both of the first and second output relays 1312 and 1314 to have an open-circuited status and controls the output circuitry 1310 to provide an output signal, then the output signal provided by the output circuitry 1310 will be directed to the output port 1342 and in turn directed to the air inlet damper 126 via the third communication link 174.

Figure 14:
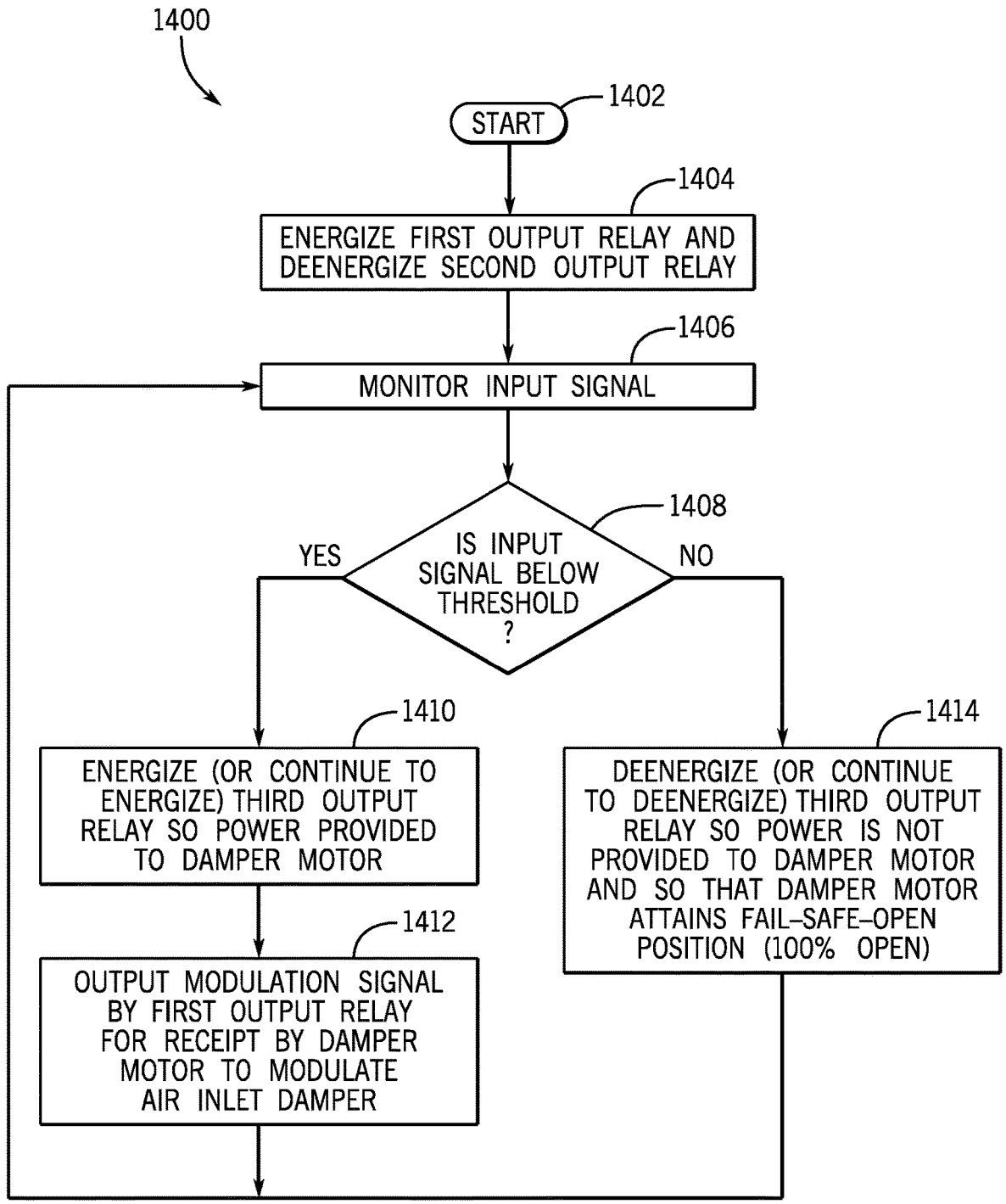
FIGS. 14, 15, 16, 17, and 18 show respective flow charts that respectively illustrate first, second, third, fourth, and fifth example methods or processes of operation, respectively, of the additional control circuitry of FIG. 13 (or of an improved high turndown combustion system in which such additional control circuitry is implemented)

The additional control circuitry 1300 can be operated to cause actuation of the air inlet damper 126 in any of a variety of manners, depending upon the embodiment or implementation. Further in this regard, FIGS. 14, 15, 16, 17, and 18 show respective flow charts 1400, 1500, 1600, 1700, and 1800 that respectively illustrate first, second, third, fourth, and fifth example methods or processes of operation, respectively, of the additional control circuitry 1300. Referring particularly to FIG. 14, the first example method of operation of the flow chart 1400, upon commencing at a start step 1402, begins at a step 1404 at which the processing device 1302 causes the first output relay 1312 to be energized and cause the second output relay 1314 to be deenergized. Then at a step 1406, the processing device 1302 monitors or senses the input signal received by the input circuitry 1308, as input to the input port 1322 by the second communication link 172. In the present embodiment, the input signal can be the control signal output by the boiler controller 116, which as noted above can be an electronic modulation (and analog input) signal. Further, at a step 1408, the processing device 1302 determines whether the received, monitored input signal is below a threshold. The threshold can be any of a variety of levels or values including, for example, a threshold of 8.8 mA or 3 VDC, which may be values corresponding to a setting of the air inlet damper 126 that is 30% (or substantially 30%) open.

Additionally as shown, if it is determined at the step 1408 that the received, monitored input signal is below the threshold, then the method proceeds to a step 1410. At the step 1410, the processing device 1302 causes the third output relay 1316 to become energized if not previously in an energized state, or to remain energized if already in an energized state. When the third output relay 1316 is energized, power is provided to the damper motor 130, and thus the damper motor 130 is able to respond to control signals provided to the damper motor by the first output port 1342. Further, at a step 1412, because (as per the step 1404) the processing device 1302 has caused the first output relay 1312 to be energized, the control signal received at the first input port 1322 is communicated to and output by the first output relay, and consequently is communicated via the first output port 1342 and the third communication link 174 for receipt by the damper motor 130. Thus, the control signal provided by the boiler controller 116 to the second communication link 172, which is an electronic modulation signal, is communicated for receipt by the damper motor 130 so as to control modulation of the air inlet damper 126.

Alternatively, if it is determined at the step 1408 that the received monitored input signal is not below the threshold (e.g., is equal to or above the threshold), then the method instead proceeds to a step 1414. At the step 1414, the processing device 1302 causes the third output relay 1316 to become deenergized if previously in an energized state, or to remain deenergized if already in a deenergized state. When the third output relay 1316 is deenergized, power is not provided to the damper motor 130. Further, assuming that the damper motor 130 is configured to have a fail-safe position when not under power that is a fail-safe-open position (100% open position), then the deenergizing of the third output relay 1316 results in the air inlet damper 126 taking on a fully-open position.

Upon completion of either of the step 1412 or the step 1414, the method returns to the step 1406 at which the control signal input at the first input port 1322 is again monitored. Thus, the method represented by the flow chart 1400 repeats on an ongoing basis (or continuously) the monitoring of the control signal received at the first input port 1322 and, based upon the whether the control signal is below or not below the threshold, the additional control circuitry 1300 operates to cause the air inlet damper 126 to either operate in a modulated manner based upon that control signal or to take on a fully-open position.

More particularly, in the present embodiment at which the threshold is at 8.8 mA or 3 VDC (which may be equivalent to 30% open), the additional control circuitry 1300 will cease the power to the damper motor 130 by deenergizing the third output relay output relay 1316 and, with the damper motor being set to fail-safe-open, the air inlet damper stops modulating and skips to 100% open. Such operation continues until the control signal received at the first input port 1322 drops below 8.8 mA or 3 VDC again, in which case the additional control circuitry 1300 will resume power to the damper motor 130 by energizing the third output relay 1316 and causing modulate to occur again. Such operation can be achieved by programming the processing device 1302 to monitor the incoming control (electronic modulation, or analog input) signal from the boiler controller 116 and to deenergize/energize the third output relay 1316 to disconnect/connect power to the damper motor 130. The threshold (or value or point) in the signal range of the control signal input to the first input port 1322 at which this happens can be set based on experiments done to analyze the boiler performance and to see where in the modulation range the combustion may need relatively more air for example (therefore opening the air inlet damper 126 100%).

Figure 15:
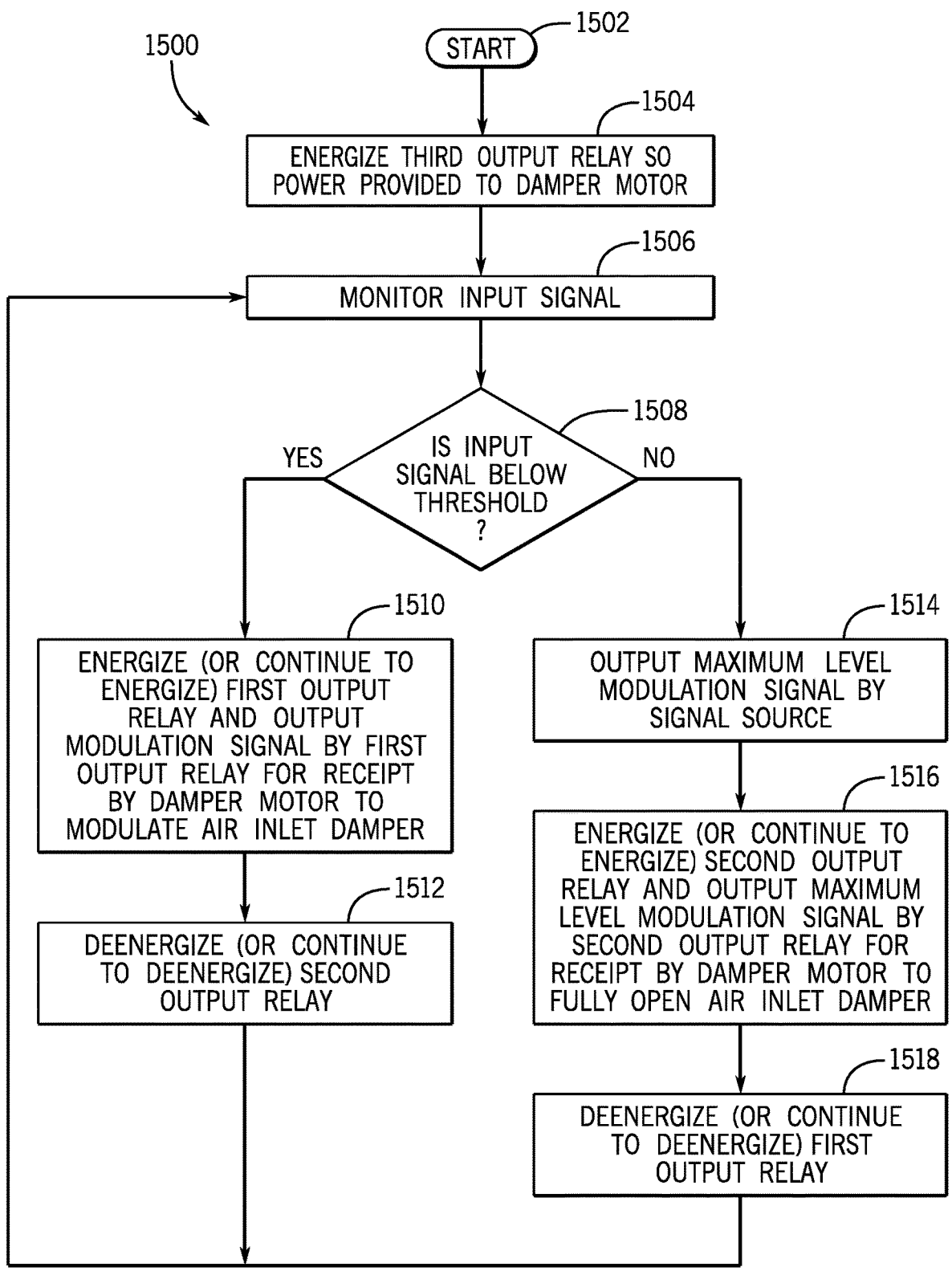

Referring next to FIG. 15, the second example method of operation of the flow chart 1500 is a modified version of the first example method of operation of the flow chart 1400. As shown in the flow chart 1500, upon commencing at a start step 1502, the second example method of operation begins at a step 1504 at which the processing device 1302 causes the third output relay 1316 to be energized so that power is provided to the damper motor 130. Then at a step 1506, the processing device 1302 monitors or senses the input signal received by the input circuitry 1308, as input to the input port 1322 by the second communication link 172. Again, the input signal can be the control signal output by the boiler controller 116, which as noted above can be an electronic modulation (and analog input) signal. Further, at a step 1508, the processing device 1302 determines whether the received, monitored input signal is below a threshold. The threshold can be any of a variety of levels or values including, for example, a threshold of 8.8 mA or 3 VDC, which may be values corresponding to a setting of the air inlet damper 126 that is 30% (or substantially 30%) open.

Additionally as shown, if it is determined at the step 1508 that the received, monitored input signal is below the threshold, then the method proceeds to a step 1510. At the step 1510, the processing device 1302 causes the first output relay 1312 to become energized if not previously in an energized state, or to remain energized if already in an energized state. When the first output relay 1312 is energized, the control signal received at the first input port 1322 is communicated to and output by the first output relay, and consequently is communicated via the first output port 1342 and the third communication link 174 for receipt by the damper motor 130. Thus, the control signal provided by the boiler controller 116 to the second communication link 172, which is an electronic modulation signal, is communicated for receipt by the damper motor 130 so as to control modulation of the air inlet damper 126. Further, at a step 1512, the processing device 1302 also causes the second output relay 1314 to become deenergized if not previously in a deenergized state, or to remain deenergized if already in the deenergized state. Also, at this time, it should be appreciated that the output circuitry 1310 is controlled by the processing device 1302 to refrain from outputting any signal, and consequently the signal that is output via the first output port 1342 is specifically the control signal provided to the additional control circuitry 1300 by the boiler controller 116.

Alternatively, if it is determined at the step 1508 that the received monitored input signal is not below the threshold (e.g., is equal to or above the threshold), then the method instead proceeds to a step 1514. At the step 1514, the processing device 1302 causes the signal source 1318 to output a maximum level modulation signal (which, for example, can be a 20 mA or 10 VDC signal). Also, at a step 1516 the processing device 1302 causes the second output relay 1314 to become energized if not previously in an energized state, or to remain energized if already in an energized state. With the second output relay 1314 so energized, the maximum level modulation signal output by the signal source 1318 is in turn provided to and output at the first output port 1342 for receipt by the damper motor 130 via the third communication link 174, which in turn causes the air inlet damper 126 to attain a fully-open position. Further, at a step 1518, the processing device 1302 also causes the first output relay 1312 to become deenergized if not previously in a deenergized state, or to remain deenergized if already in the deenergized state. Also, at this time, it should be appreciated that the output circuitry 1310 is controlled by the processing device 1302 to refrain from outputting any signal, and consequently the signal that is output via the first output port 1342 is specifically the maximum level modulation signal provided from the signal source 1318.

Upon completion of either of the step 1512 or the step 1518, the method returns to the step 1506 at which the control signal input at the first input port 1322 is again monitored. Thus, the method represented by the flow chart 1500 repeats on an ongoing basis (or continuously) the monitoring of the control signal received at the first input port 1322 and, based upon the whether the control signal is below or not below the threshold, the additional control circuitry 1300 operates to cause the air inlet damper 126 to either operate in a modulated manner based upon that control signal or to take on a fully-open position.

It should be appreciated therefore that the resulting operation of the air inlet damper 126 achieved by the method of the flow chart 1500 of FIG. 15 is the same or substantially the same as that achieved by the method of the flow chart 1400 of FIG. 14. Indeed, as with the method of FIG. 14. the method of FIG. 15 causes the damper plate 130 to attain the fully-open position unless (or until) the control signal received from the boiler controller decreases to below the threshold (for example, drops below 8.8 mA or 3 VDC) as determined at the step 1508, in which circumstance that control signal is provided to the damper motor so that the air inlet damper is modulated. At the same time, it should also be appreciated that the method of the flow chart 1400 of FIG. 14 envisions causing the air inlet damper 126 to operate to achieve nonlinear variation of the flow path past the air inlet damper 126 in response to the electronic modulation signal from the boiler controller 116 not only by communicating that modulation signal to the damper motor 130 but also by varying whether power is provided to the damper motor. In this sense, this method of FIG. 14 can be viewed as involving control by the additional control circuitry 1300 over two control signals, where the provision of power is also viewed as a control signal.

Figure 16:
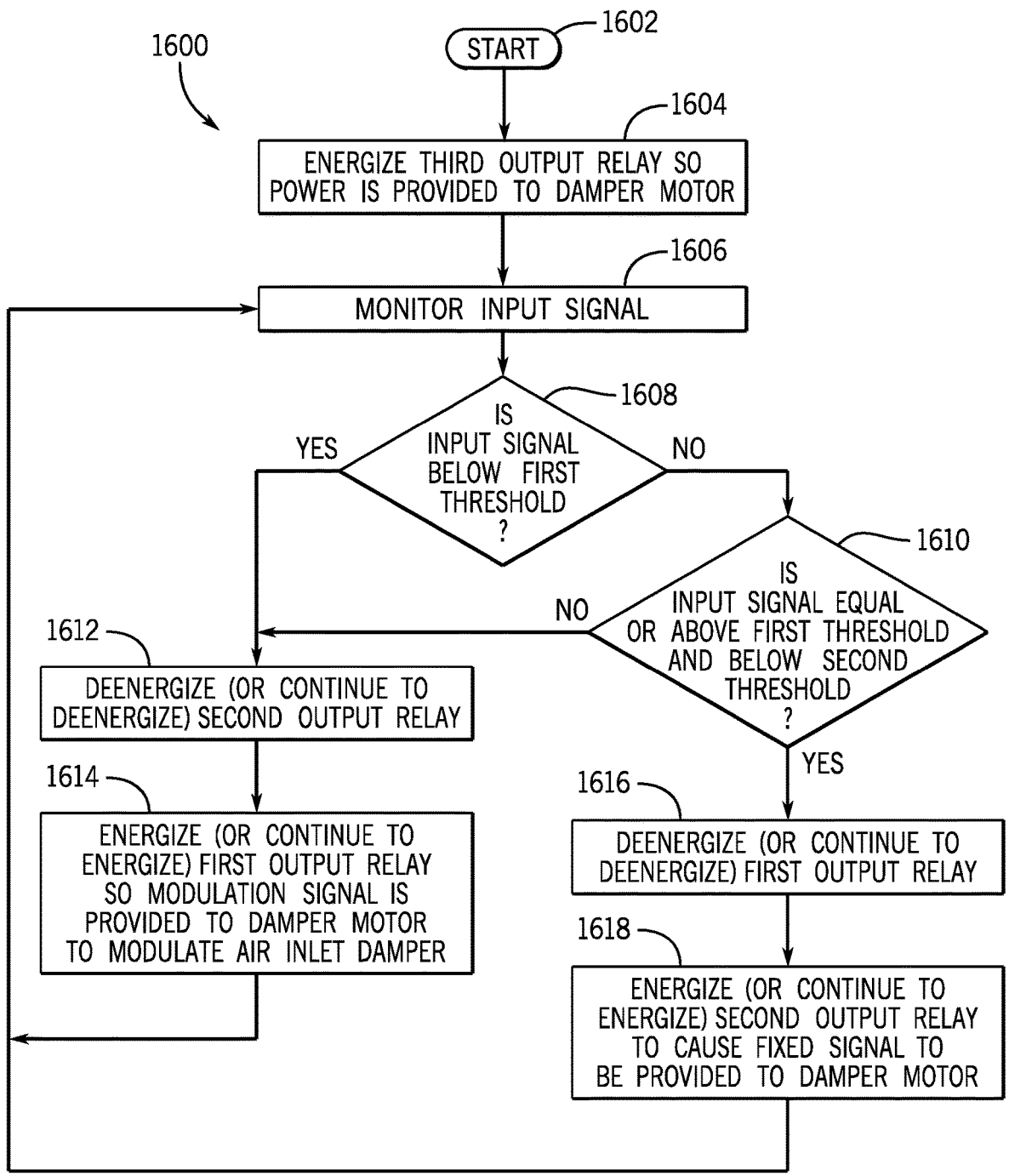

Turning to FIG. 16, the third example method of operation of the flow chart 1600, upon commencing at a start step 1602, begins at a step 1604 at which the processing device 1302 causes the third output relay 1316 to be energized so that power is provided to the damper motor 130. Then at a step 1606, the processing device 1302 monitors or senses the input signal received by the input circuitry 1308, as input to the input port 1322 by the second communication link 172. Again, in the present embodiment, the input signal can be the control signal output by the boiler controller 116, which as noted above can be an electronic modulation (and analog input) signal. Further, at a step 1608, the processing device 1302 determines whether the received, monitored input signal is below a first threshold. If it is determined at the step 1608 that the received, monitored input signal is not below (or is equal or above) the first threshold, then the method advances to a step 1610, at which the processing device 1302 further determines whether the received, monitored input signal is not only equal or above the first threshold but also below a second threshold (which is above the first threshold).

Additionally as shown, if either it is determined at the step 1608 that the input signal is below the first threshold, or it is determined at the step 1610 that the input signal is not below the second threshold (and also is equal or above the first threshold), then the method proceeds to a step 1612. At the step 1612, the processing device 1302 causes the second output relay 1314 to become deenergized if not previously in a deenergized state, or to remain deenergized if already in the deenergized state. Next, at a step 1614, the processing device 1302 also causes the first output relay 1312 to become energized if not previously in an energized state, or to remain energized if already in the energized state. When the first output relay 1312 is energized, the control signal received at the first input port 1322 is communicated to and output by the first output relay, and consequently is communicated via the first output port 1342 and the third communication link 174 for receipt by the damper motor 130. Thus, the control signal provided by the boiler controller 116 to the second communication link 172, which is an electronic modulation signal, is communicated for receipt by the damper motor 130 so as to control modulation of the air inlet damper 126.

Alternatively, if it is determined at the step 1608 that the input signal is not below the first threshold, and further determined at the step 1610 that the input signal is below the second threshold (and also is equal or above the first threshold), then the method instead proceeds to a step 1616. At the step 1616 the processing device 1302 causes the first output relay 1312 to become deenergized if not previously in a deenergized state, or to remain deenergized if already in the deenergized state. Next, at a step 1618, the processing device 1302 also causes the second output relay 1314 to become energized if not previously in an energized state, or to remain energized if already in the energized state. When the second output relay 1314 is energized, a fixed signal provided by the signal source 1318 is communicated to and output by the second output relay, and consequently is communicated via the first output port 1342 and the third communication link 174 for receipt by the damper motor 130. Accordingly, when the input signal received from the boiler controller 116 is equal or above the first threshold but below the second threshold, the air inlet damper 126 is controlled to take on an open/closed status corresponding to the level of the fixed signal provided by the signal source 1318.

Upon completion of either of the step 1614 or the step 1618, the method returns to the step 1606 at which the control signal input at the first input port 1322 is again monitored. Thus, the method represented by the flow chart 1600 repeats on an ongoing basis (or continuously) the monitoring of the control signal received at the first input port 1322 and, based upon the whether the control signal is below or not below the first threshold, and below or not below the second threshold, the additional control circuitry 1300 operates to cause the air inlet damper 126 to either operate in a modulated manner based upon that control signal or to take on a position corresponding to the level of the fixed signal provided by the signal source 1318.

The first threshold of the step 1608 and the second threshold of 1610 can be set at any of a variety of levels depending upon the embodiment. Also, although not expressly shown in FIG. 16, it should be appreciated that the fixed signal provided by the signal source 1318 can be set to any of a variety of levels depending upon the embodiment or circumstance, and can be determined based upon a control signal provided from the processing device 1302 to the signal source 1318. For example, in the case of an embodiment in which the control signal (electronic modulation signal) output by the boiler controller 116 can take on values of 4 to 20 mA or 0 to 10 VDC, respectively, the first threshold can be set at 8.8 mA or 3 VDC, respectively, and the second threshold can be set at 15.2 mA or 7 VDC, respectively. Such values for the first threshold may be values corresponding to a setting of the air inlet damper 126 that is 30% (or substantially 30%) open, and such values for the second threshold may be values corresponding to a setting of the air inlet damper 126 that is 70% (or substantially 70%) open. Also, in such an embodiment in which the control signal (electronic modulation signal) output by the boiler controller 116 can take on values of 0 to 20 mA or 0 to 10 VDC, respectively, the processing device 1302 can cause the signal source 1318 to generate a fixed (or predetermined) signal having a value of 12 mA or 5 VDC, which is intended to cause the air inlet damper 126 to attain a 50% open level.

It will further be appreciated from the above discussion that, in such embodiment, there will be step changes in the controlled positioning of the damper plate 128 (or other damper plate or plate portion(s)) of the air inlet damper 126 as the control signal from boiler 116 proceeds from being below the first threshold to a higher value, or vice-versa, or from being below the second threshold to a higher value, or vice-versa. For example, as the control signal from the boiler controller 116 nears the first threshold from a level below that first threshold, the damper motor 130 will be provided with a modulation signal tending to cause that air inlet damper to move toward a 30% open status but, as soon as the control signal attains the first threshold, the damper motor will be provided with the fixed signal driving the air inlet damper to attain a 50% open status. Inversely, as the control signal drops from the level of the first threshold to a level below that first threshold, the air inlet damper will tend to skip from the 50% open status back toward the 30% open status. Also, as the control signal from the boiler controller 116 attains the second threshold from a level below that second threshold, the damper motor 130 will no longer be provided with the fixed signal driving the air inlet damper to attain the 50% open status, but instead will be provided with a modulation signal tending to cause the air inlet damper to move toward and above a 70% open status. Inversely, as the control signal drops from the level of the second threshold to a level below that second threshold, the air inlet damper will tend to skip from substantially the 70% open status back to the 50% open status.

Figure 17:
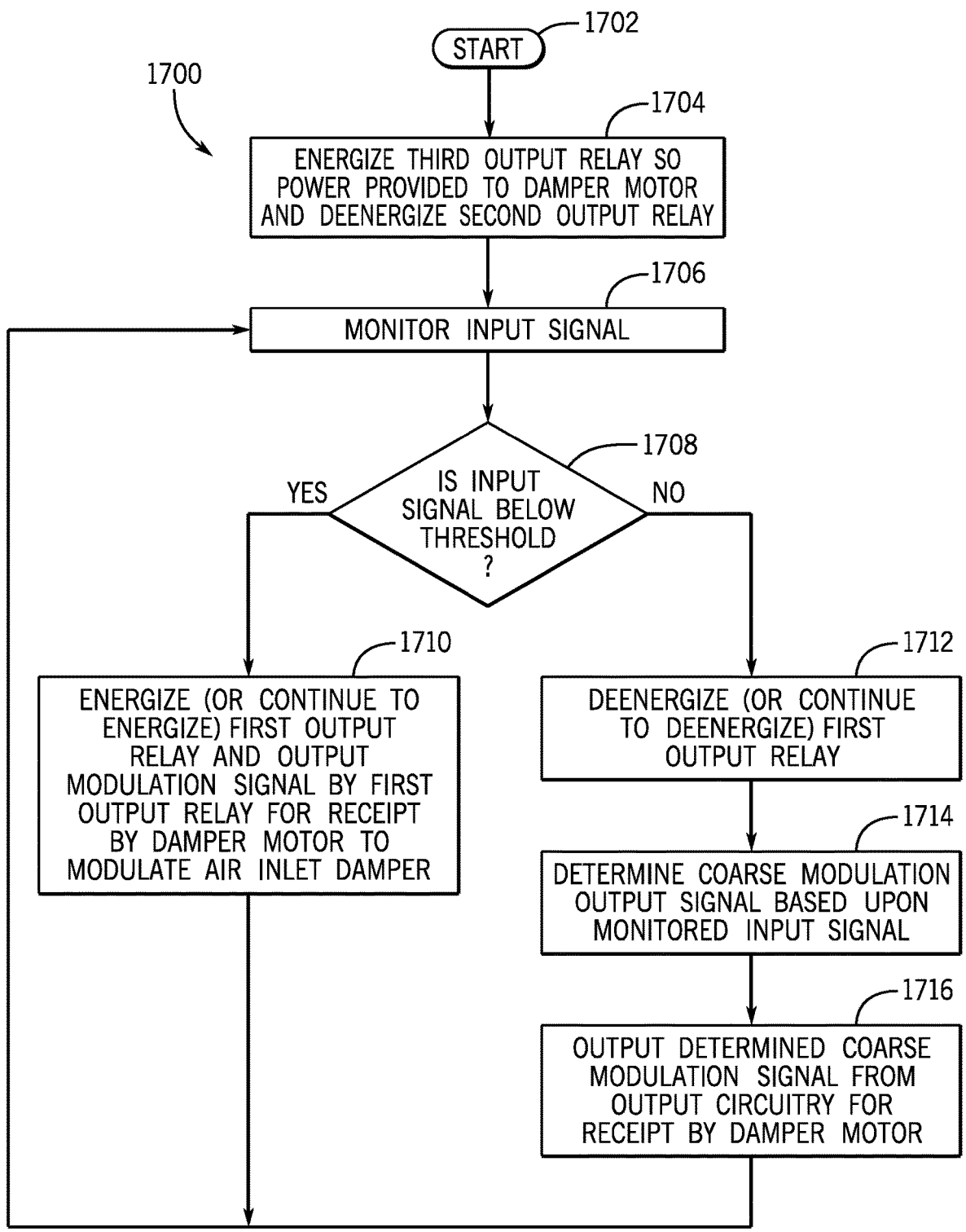

Referring next to FIG. 17, the flow chart 1700 shows the fourth example method of operation. As shown, upon commencing at a start step 1702, the fourth example method of operation begins at a step 1704 at which the processing device 1302 causes the third output relay 1316 to be energized so that power is provided to the damper motor 130, and also causes the second output relay 1314 to be deenergized. Then at a step 1706, the processing device 1302 monitors or senses the input signal received by the input circuitry 1308, as input to the input port 1322 by the second communication link 172. Again, the input signal can be the control signal output by the boiler controller 116, which as noted above can be an electronic modulation (and analog input) signal. Further, at a step 1708, the processing device 1302 determines whether the received, monitored input signal is below a threshold. The threshold can be any of a variety of levels or values including, for example, a threshold of 8.8 mA or 3 VDC, which may be values corresponding to a setting of the air inlet damper 126 that is 30% (or substantially 30%) open.

Additionally as shown, if it is determined at the step 1708 that the received, monitored input signal is below the threshold, then the method proceeds to a step 1710. At the step 1710, the processing device 1302 causes the first output relay 1312 to become energized if not previously in an energized state, or to remain energized if already in an energized state. When the first output relay 1312 is energized, the control signal received at the first input port 1322 is communicated to and output by the first output relay, and consequently is communicated via the first output port 1342 and the third communication link 174 for receipt by the damper motor 130. Thus, the control signal provided by the boiler controller 116 to the second communication link 172, which is an electronic modulation signal, is communicated for receipt by the damper motor 130 so as to control modulation of the air inlet damper 126. Also, at this time, it should be appreciated that the output circuitry 1310 is controlled by the processing device 1302 to refrain from outputting any signal, and consequently the signal that is output via the first output port 1342 is specifically the control signal provided to the additional control circuitry 1300 by the boiler controller 116.

Alternatively, if it is determined at the step 1708 that the received monitored input signal is not below the threshold (e.g., is equal to or above the threshold), then the method instead proceeds to a step 1712. At the step 1712, the processing device 1302 causes the first output relay 1312 to become deenergized if not previously in a deenergized state, or to remain deenergized if already in the deenergized state. Next at a step 1714 the processing device 1302 determines a coarse modulation output signal based upon the monitored input signal, in accordance with code (or computer programming) embedded in or utilized by the processing device. Further, at a step 1716, the processing device then causes the output circuitry (e.g., analog output circuitry) 1310 to output the coarse modulation output signal. Consequently, the coarse modulation output signal in turn is provided to and output at the first output port 1342 for receipt by the damper motor 130 via the third communication link 174, which in turn causes the air inlet damper 126 to attain a position corresponding to the value of the coarse modulation output signal.

The coarse modulation output signal can be determined in any of a variety of manners depending upon the embodiment or implementation. In some embodiments, the processing device 1302 particularly determines the coarse modulation output signal by assigning discrete step values of the coarse modulation output signal to ranges of possible values of the monitored input signal, which is the control signal (e.g., electronic modulation signal) from the boiler controller 116. For example, supposing an embodiment in which (as described above) the monitored input signal can take on values from 4 to 20 mA and in which the threshold of interest in the step 1718 is 8.8 mA, the processing device 1302 can determine the coarse modulation output signal as having respective values that are respective upper end values of each 0.5 mA incremental range of values of the monitored input signal between 9 mA and 20 mA. That is, in such embodiment, the coarse modulation output signal would be set to have a value of 9.5 mA whenever the monitored input signal is between 9 mA and 9.5 mA, a value of 10 mA whenever the monitored input signal is between 9.5 mA and 10 mA, and so on, up to a value of 20 mA whenever the monitored input signal is between 19.5 mA and 20 mA.

Upon completion of either of the step 1710 or the step 1716, the method returns to the step 1706 at which the control signal input at the first input port 1322 is again monitored. Thus, the method represented by the flow chart 1700 repeats on an ongoing basis (or continuously) the monitoring of the control signal received at the first input port 1322. Based upon the whether the control signal is below or not below the threshold, the additional control circuitry 1300 operates to cause the air inlet damper 126 to operate in a modulated manner, either in fine increments when the control signal is below the threshold (e.g., up to 8.8 or 9 mA) or in coarser increments when the control signal is no longer below the threshold.

Figure 18:
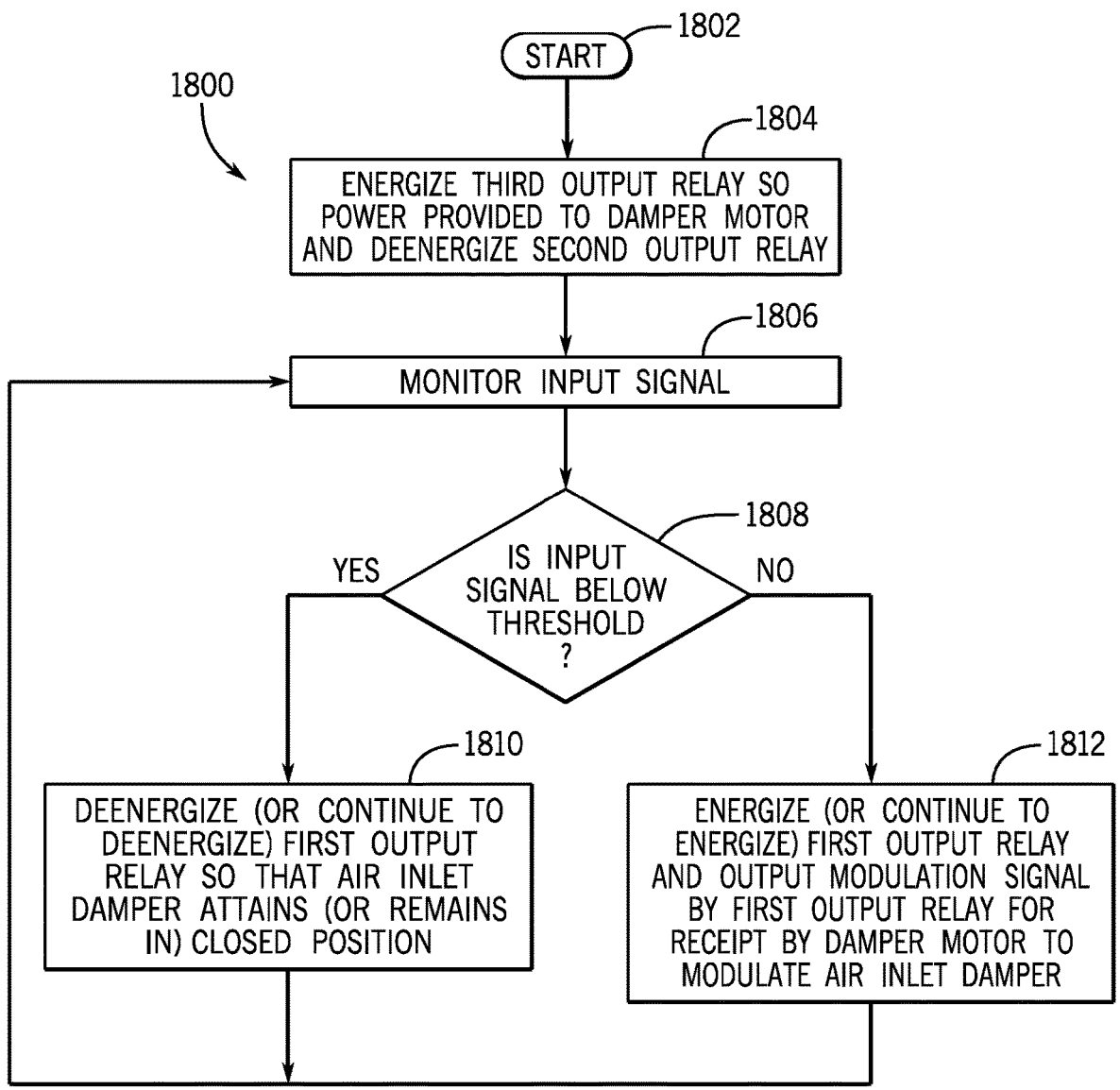

Referring next to FIG. 18, the flow chart 1800 shows the fifth example method of operation. As shown, upon commencing at a start step 1802, the fifth example method of operation begins at a step 1804 at which the processing device 1302 causes the third output relay 1316 to be energized so that power is provided to the damper motor 130, and also causes the second output relay 1314 to be deenergized. Then at a step 1806, the processing device 1302 monitors or senses the input signal received by the input circuitry 1308, as input to the input port 1322 by the second communication link 172. Again, the input signal can be the control signal output by the boiler controller 116, which as noted above can be an electronic modulation (and analog input) signal. Further, at a step 1808, the processing device 1302 determines whether the received, monitored input signal is below a threshold. The threshold can be any of a variety of levels or values including, for example, a threshold of 8.8 mA or 3 VDC, which may be values corresponding to a setting of the air inlet damper 126 that is 30% (or substantially 30%) open.

Additionally as shown, if it is determined at the step 1808 that the received monitored input signal is below the threshold, then the method proceeds to a step 1810. At the step 1810, the processing device 1302 causes the first output relay 1312 to become deenergized if not previously in a deenergized state, or to remain deenergized if already in the deenergized state. In this embodiment, the air inlet damper 126 can be configured such that the damper plate 128 (or other damper plate or plate portion(s)) attain or remain in a closed position when the damper motor 130 is not provided with any modulation signal. Accordingly, when the step 1810 is reached and the first output relay 1312 is deenergized, such that the control signal (electronic modulation signal) from the boiler controller 116 is no longer provided to the first output port 1342 or (via the third communication link 174) to the damper motor 130, then the air inlet damper 126 takes on the closed status.

Alternatively, if it is determined at the step 1808 that the received, monitored input signal is not below (e.g., equal or above) the threshold, then the method proceeds to a step 1812. At the step 1812, the processing device 1302 causes the first output relay 1312 to become energized if not previously in an energized state, or to remain energized if already in an energized state. When the first output relay 1312 is energized, the control signal received at the first input port 1322 is communicated to and output by the first output relay, and consequently is communicated via the first output port 1342 and the third communication link 174 for receipt by the damper motor 130. Thus, the control signal provided by the boiler controller 116 to the second communication link 172, which is an electronic modulation signal, is communicated for receipt by the damper motor 130 so as to control modulation of the air inlet damper 126. Also, at this time, it should be appreciated that the output circuitry 1310 is controlled by the processing device 1302 to refrain from outputting any signal, and consequently the signal that is output via the first output port 1342 is specifically the control signal provided to the additional control circuitry 1300 by the boiler controller 116.

Upon completion of either of the step 1810 or the step 1812, the method returns to the step 1806 at which the control signal input at the first input port 1322 is again monitored. Thus, the method represented by the flow chart 1800 repeats on an ongoing basis (or continuously) the monitoring of the control signal received at the first input port 1322. Thus, in the present embodiment, the additional control circuitry 1300 operates to stop the damper motor 130 from receiving the modulation signal coming from the boiler controller 116 when that modulation signal has values within a range from a minimum level of the modulation signal (e.g., 4 mA or 0 VDC) up to a specific point in the signal range (again, e.g., 8.8 mA or 3 VDC). Again, the damper motor 130 will not receive any modulation signal, which leads to the air inlet damper 126 remaining closed, due to the deenergizing of the first output relay 1312 (even though the damper motor 130 is energized because the third output relay 1316 is still energized). Further, upon the modulation signal ramping up to and attaining or exceeding the threshold (8.8 mA or 3 VDC in this example), the additional control circuitry 1300 then resumes communication of the modulation signal to the damper motor 130 due to energizing of the first output relay 1312. So long as the modulation signal remains within a range from the threshold to a maximum level of the modulation signal, the air inlet damper 126 is modulated in accordance with that modulation signal. In particular, upon the modulation signal reaching the threshold from a value less than the threshold, the damper motor 130 is then actuated so that the air inlet damper 126 switches from being closed to being opened by an amount corresponding to the modulation signal level corresponding to the threshold (e.g., 30% open). As the modulation signal then continues to rise or take on values above the threshold, modulation of the damper motor 130 continues all the way up to 100% open depending upon the modulation signal.

In addition to the above examples, it should be recognized that the present disclosure encompasses numerous different embodiments and manners of operation according to which additional control circuitry such as the additional control circuitry 1300 (or any of a variety of other types of controllers, control systems or devices) operates to generate and output control signal(s) that achieve any of a variety of types of nonlinear operation. For example, the present disclosure encompasses a variety of embodiments in which the control signal(s) output by the additional control circuitry experience variations that are nonlinear by comparison with variations of the electronic modulation signal(s) provided to the additional control circuitry (e.g., by way of the boiler controller) or by comparison with input signal(s) upon which those electronic modulation signal(s) are at least partly based. Additionally for example, the present disclosure encompasses a variety of embodiments in which the rotational positions (or other positions or movements) of one or more components or portions of an air inlet damper (such as the damper face plate 128), or the flow path opening within an air inlet damper or flow path through an air inlet damper, experience variations that are nonlinear by comparison with variations of the electronic modulation signal(s) provided to the additional control circuitry (e.g., by way of the boiler controller) or by comparison with input signal(s) upon which those electronic modulation signal(s) are at least partly based.

Further in this regard, FIGS. 19, 20, 21, 22, and 23 respectively provide respective graphs 1900, 2000, 2100, 2200, and 2300 that further illustrate respective examples of manners of operation of improved high turndown combustion systems in which a rotational position (or angle of opening) of a damper face plate such as the damper face plate 128 (or other component of an air inlet damper) varies in a nonlinear manner relative to variations in an electronic modulation signal output by a boiler controller of the system. Such manners of operation can be achieved for example in high turndown combustion systems additional control circuitry such as the additional control circuitry 1300 encompassed herein. It should be appreciated that, although these example graphs particularly illustrate variation of the rotational position of the damper face plate (in degrees) relative to variation in an electronic modulation signal that is a current signal ranging between 4 and 20 mA, the present disclosure is intended to encompass embodiments in which the electronic modulation signal varies within other ranges or takes other forms (such as a voltage signal). Also, the present disclosure is intended to encompass embodiments in which the nonlinear operation that is achieved is operation in which changes in the flow path opening past that damper face plate or the flow path through the air inlet damper (e.g., the cross-sectional area through which air can flow through the air inlet damper, taken perpendicular to the direction of flow, at or proximate to the damper face plate) vary nonlinearly relative to changes in the electronic modulation signal(s) from a boiler controller (or other signal(s)).

Figure 19:
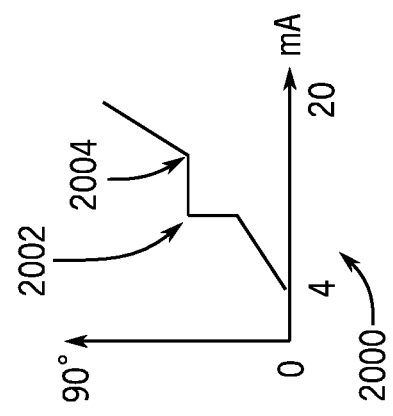
FIGS. 19, 20, 21, 22, and 23 are respective graphs that respectively illustrate respective example nonlinear relationships between a rotational position of a damper face plate (or other component of an air inlet damper) and an electronic modulation signal output by a boiler controller of an improved high turndown combustion system in at least some embodiments encompassed herein.

With respect to FIG. 19, the graph 1900 provided therein shows a manner of operation in which the overall relationship between rotation of the damper face plate and the electronic modulation signal is nonlinear even though, with respect to some values of the electronic modulation signal, the relationship is linear. More particularly as shown, there is a linear relationship between variation in the damper face plate rotational position in response to variation in the electronic modulation signal from the minimum level of that signal (at 0 mA) up to a level 1902. Upon the electronic modulation signal attaining the level 1902, the rotational position of the damper face plate suddenly changes to the fully-open (90 degree) position, at which it remains even as the electronic modulation signal continues to increase from the level 1902 to its maximum level (20 mA). Correspondingly it should also be appreciated that, as the electronic modulation signal decreases from its maximum level to its minimum level, the damper face plate rotational position also varies in response in accordance with the graph 1900. It will be recognized that the manner of operation illustrated by FIG. 19 can achieve identical or substantially similar operational results (e.g. in terms of the manner of movement of the damper face plate) as the methods of FIGS. 14 and 15.

Figure 20:
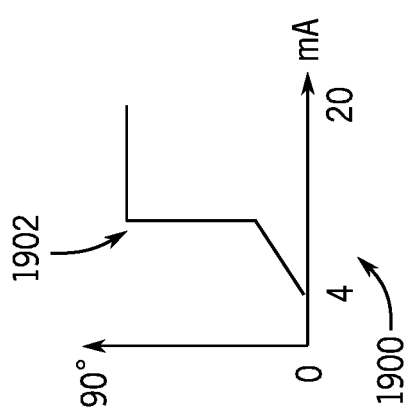

With respect to FIG. 20, the graph 2000 provided therein shows another manner of operation in which the overall relationship between rotation of the damper face plate and the electronic modulation signal is nonlinear even though, with respect to some values of the electronic modulation signal, the relationship is linear. In this example, there is a first linear relationship between variation in the damper face plate rotational position in response to variation in the electronic modulation signal from the minimum level of that signal (at 0 mA) up to a first level 2002. Upon the electronic modulation signal attaining the level 2002, the rotational position of the damper face plate suddenly changes to the partly-open (e.g., 45 degree) position, at which it remains even as the electronic modulation signal continues to increase from the first level 2002 to a second level 2004. However, upon the electronic modulation signal attaining and increasing beyond the second level 2002 up to the maximum level of that signal (at 20 mA), there is a second linear relationship between variation in the damper face plate rotational position in response to variation in the electronic modulation signal. Correspondingly it should also be appreciated that, as the electronic modulation signal decreases from its maximum level to its minimum level, the damper face plate rotational position also varies in response, in accordance with the graph 2000. Further, as illustrated by FIG. 20, the second nonlinear relationship can be different from (e.g., can have a different slope than) the first nonlinear relationship, although the two nonlinear relationships can also be the same (share the same slope). It will be appreciated that, in least some embodiments in which the two nonlinear relationships (slopes) are the same, the manner of operation illustrated by FIG. 20 can provide operational results (e.g., in terms of movement of the damper face plate) that are identical or substantially similar to those provided by the method described in regard to FIG. 16.

Figure 21:
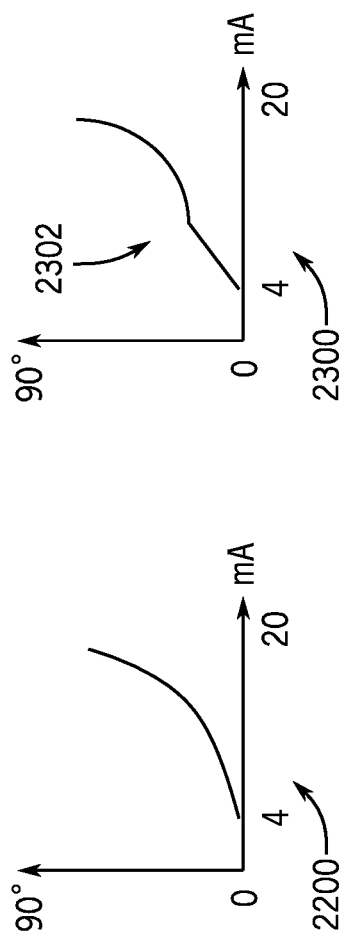

Turning to FIG. 21, the graph 2100 provided therein shows an additional manner of operation in which the overall relationship between rotation of the damper face plate and the electronic modulation signal is nonlinear even though, with respect to some values of the electronic modulation signal, the relationship is linear. The manner of operation shown in the graph 2100 is similar to that illustrated by the graph 2000 in that there is a first linear relationship (exhibiting a first slope) between variation in the damper face plate rotational position in response to variation in the electronic modulation signal from the minimum level of that signal (at 0 mA) up to a first level 2102, and also a second linear relationship (exhibiting a second slope different from the first slope) between variation in the damper face plate rotational position in response to variation in the electronic modulation signal at a region above that first level. However, in contrast to the manner of operation illustrated by the graph 2000, the damper face plate rotational position begins to vary in accordance with the second linear relationship immediately upon the electronic modulation signal attaining the first level 2102, and there is no second level or range of values of the electronic modulation signal for which the damper face plate rotational position attains a fixed position as in FIG. 20. Correspondingly it should also be appreciated with respect to the manner of operation shown by FIG. 21 that, as the electronic modulation signal decreases from its maximum level to its minimum level, the damper face plate rotational position also varies in response, in accordance with the graph 2100.

Figure 22:
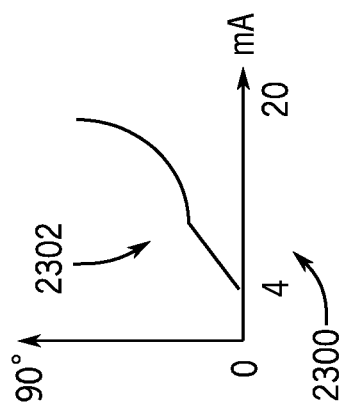

Referring next to FIG. 22, the graph 2200 provided therein shows an additional manner of operation in which the overall relationship between rotation of the damper face plate and the electronic modulation signal is nonlinear throughout the entire range of variation of the electronic modulation signal. More particularly, the graph 2200 illustrates a manner of operation in which variation in the damper face plate rotational position in response to variation in the electronic modulation signal occurs in an exponential manner and thus the graph follows a curved path. It should be appreciated that the particular exponential relationship between variation in the damper face plate rotational position and variation in the electronic modulation signal shown in FIG. 22 is merely one example, and many other exponential or other nonlinear relationships (or curves) can be achieved in other embodiments encompassed herein.

Figure 23:
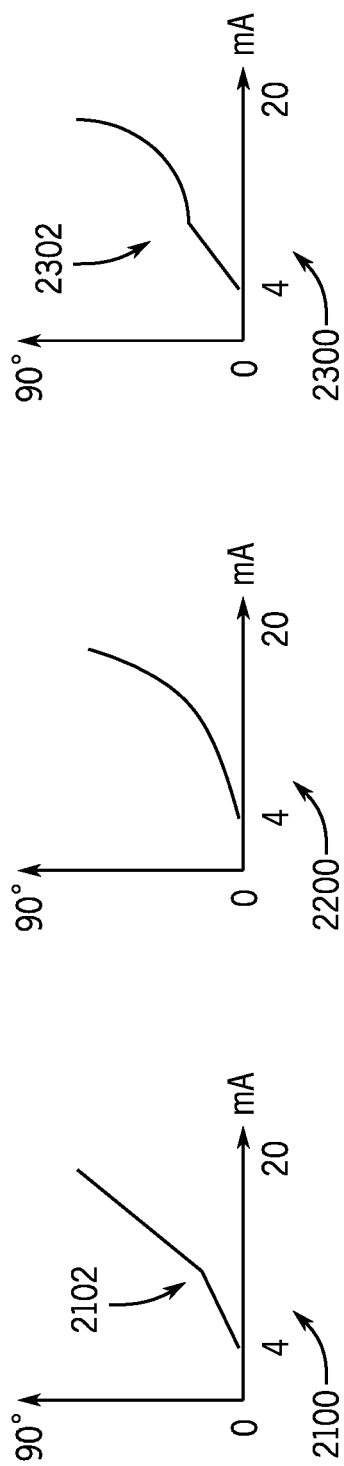

Further with respect to FIG. 23, the graph 2300 provided therein shows an additional manner of operation in which the overall relationship between rotation of the damper face plate and the electronic modulation signal is nonlinear even though, with respect to some values of the electronic modulation signal, the relationship is linear. The manner of operation illustrated by FIG. 23 can be conceptually viewed as a combination of the manners of operation illustrated by FIG. 21 and FIG. 22. In this example, there is a first linear relationship between variation in the damper face plate rotational position in response to variation in the electronic modulation signal from the minimum level of that signal (at 0 mA) up to a first level 2302. However, upon the electronic modulation signal attaining and increasing beyond the first level 2302, variation in the damper face plate rotational position in response to variation in the electronic modulation signal occurs in an exponential manner and thus the graph follows a curved path as the electronic modulation signal increases above the first level 2302. Correspondingly it should also be appreciated with respect to the manner of operation shown by FIG. 23 that, as the electronic modulation signal decreases from its maximum level to its minimum level, the damper face plate rotational position also varies in response, in accordance with the graph 2300. It should be appreciated that the particular linear and exponential relationships that are shown in FIG. 23 are examples and that, in other embodiments, those relationships can take other forms.

Again, FIGS. 19, 20, 21, 22, and 23 are merely examples of manners of operation of systems encompassed herein in which characteristics (such as a rotational position) of a damper face plate (or other structure(s) or portion(s)) of an air inlet damper, or of a flow path opening or flow path through an air inlet damper—or of control signal(s) that influence or control such characteristics—vary in nonlinear manners in response to variation in an electronic modulation signal (or other signal(s)). The present disclosure encompasses numerous other embodiments and manners of operation in addition to those described above. For example, although the manners of operation illustrated in FIGS. 19, 20, 21, and 23 are ones in which the particular nonlinear relationships between the electronic modulation system and the damper face plate rotational position change at one or two thresholds, the present disclosure also encompasses embodiments in which the nonlinear relationships change at more than two thresholds.

Although the embodiments of combustions systems described above envision the inclusion of a gas input section (or gas train section) such as the gas input section 112 that is a dual gas valve system having two gas train segments, the present disclosure also encompasses embodiments of combustion systems in which the gas input section has only a single gas train section, such that gas enters the combustion system by only a single pathway or channel as governed by one or more valves along that pathway/channel (as may be positioned between tube segments). More particularly, the present disclosure encompasses air inlet damper arrangements and mixing tube designs (along with the electromechanical parts) such as any of those described above, not only when employing a dual gas valve system such as the gas input section 112, but also when employing a single gas valve system.

It should be appreciated that, regardless of whether a dual gas valve system or a single gas valve system is employed in the combustion systems employing any of the air inlet damper arrangements and mixing tube designs described above, the overall combustion systems are advantageous by comparison with at least some conventional systems in terms of achieving improved high turndown performance. Typical conventional combustion systems can be limited in their turndown performance because, regardless of the nature of the gas train (regardless of whether a dual gas valve system or single gas valve system is employed), the tracking mechanisms used on conventional gas valves to track and respond to changes in flow of gas are limited. More particularly, most gas valves in conventional systems employ a mechanism/sensor to track changes in static pressure that relate to changes in flow, but do not use a gas flowmeter to directly track the changes in flow (typically because use of a flowmeter would make the gas valve more expensive). Yet, the changes in pressure that cause changes in flow are a considerably more minute and difficult to detect (as opposed to changes in flow), such that conventional gas valves are often unable to achieve good tracking, especially on the lower portion of their range. Consequently, in conventional systems, there are portions (or spots) of the combustion curve that are either too rich or too lean as previously mentioned.

By comparison, the embodiments encompassed herein having inlet damper plate(s) or damper plate arrangements such as those described above in regard to FIGS. 1-12, as well as embodiments in which a single gas valve system is employed instead of a dual gas valve system, are not limited in performance by the tracking mechanisms that may be employed on the gas valves. To the contrary, when these inlet damper plate(s) or damper plates are opened, due to the configuration of the damper plate(s) or component face plate portion(s), a small amount of movement of the damper plate(s) or component face plate portion(s) away from their respective fully closed position results in a significant change in the cross-sectional size of the flow path such that a significant increase in air flow past the damper plate(s) or component face plate portion(s) rapidly becomes possible. In at least some embodiments, this change in the cross-sectional size of the flow path past the damper plate(s) or component face plate portion(s) can increase in a nonlinear manner relative to the rotation of the damper plate(s) or component face plate portion(s). Due to this manner of operation, these designs can achieve corrections in the combustion curve, and can achieve improved high turndown performance, regardless of whether the gas train entails a dual gas valve system or a single gas valve system (or even only a single gas valve).

In view of the above discussion, it should be further understood that one or more combustion systems encompassed herein have particular operational characteristics. In general it should be appreciated that, for a boiler designed for a specific rate (maximum input that is), the lower it is possible to operate the boiler input without impeding the quality of combustion, then the higher the turndown performance for the boiler (and associated combustion system). Logically, the lowest input occurs when the main boiler controller sends the lowest modulation signal (minimum signal) to the blower and therefore the blower is operating at its lowest speed. This in turn leads to the lowest gas flow for a specific gas train design. It should be recognized that various aspects of gas train design can have an effect in this regard. For example, gas flow can be reduced further by adjusting manual valves to reduce gas flow even further to achieve higher turndown. Also for example, the gas train design can be modified, for example by reducing the size of the flow tube/pipe or introducing an orifice to reduce the gas flow.

However, regardless of the characteristics of the gas train design, if the amount of air flowing through the system at the minimum signal is not further reduced, the resulting byproducts of combustion will be too lean because in such circumstance, there is too low of a gas flow compared to air flow. Although the blower may be operating at its lowest speed, without damper reducing the air flow further, combustion will be too lean.

In view of these considerations, in at least some embodiments of combustion systems encompassed herein, at the minimum signal/modulation rate, electromechanical devices can be used to position the damper (e.g., the damper plate or component damper plate portion(s)) into a fully closed position when at this minimum signal. In view of the above description, it should be noted that "fully closed" in this context is used to describe the rotational position of the damper plate or one or more component damper plate portion(s), as governed at least in part by a damper motor, rather than the amount of air being allowed to flow into/through the combustion system. That is, in at least some embodiments encompassed herein, even when the damper plate or component damper plate portion(s) is or are the "fully closed" position, some air flow past those structure(s) can still be possible. For example, in at least some embodiments encompassed herein, the damper plate has an air opening (e.g., cutout) to allow very little air to flow past the damper plate even when the damper plate is rotated to its fully closed position. Such air flow through the air opening (or otherwise past the damper) when the damper is in the fully closed position matches the little gas flow entering the combustion system via the gas train, thus avoiding lean combustion. Several embodiments of this damper plate exist with various sizes of air opening cutouts which can be used for various gas trains and combustion systems.

Depending upon the embodiment, various electromechanical devices can be used to rotate the damper to be fully closed or fully open, or anywhere between fully closed and fully open. In at least some embodiments encompassed herein, the entire modulation signal comes from the main boiler controller (e.g., the boiler controller 116). Also, in at least some embodiments encompassed herein, additional control circuitry (e.g., the additional control circuitry 118) is employed. For example, in some embodiments additional control circuitry taking the form of limit alarms and/or staging relays can be used. These devices can monitor an analog and continuous signal, such as the boiler's controller output signal, and turn on/off relays based on an input signal setpoint. In general, such devices can therefore take a continuous input signal and output discrete outputs/events.

Additionally, in at least some embodiments, such devices and their relays can be incorporated to either channel the output signal from the boiler controller (typically a 4-20 mA DC/0-10 VDC signal) to the damper motor or to turn off the power to the damper motor completely, whenever required. Depending upon the embodiment, the damper motor can be configured to shut off in a fully closed position or a fully open position of the damper (e.g., in terms of the position of the damper plate or one or more component damper plate portion(s)). This allows for fine-tuning of the movement of the damper in such a manner that, when a small incremental change is required, it is done so by channeling in the 4-20 mA signal (as shown in FIG. 1), and when a large change in damper position is required, it is accomplished by giving a full signal or totally cutting off the signal or power to the damper with the use of relays. This allows nonlinearity in controlling the damper position at various points of modulation to give an accurate air-gas ratio for a desirable quality of combustion.

Also, in some embodiments, the additional control circuitry can include an analog signal monitor (and/or relays), in combination with a fixed and predetermined signal reference, to monitor the signal from the boiler controller. At a predetermined point in the modulation signal range, the additional control circuitry can switch what the damper motor is receiving to the signal reference (e.g., switch from the linear signal output by the boiler controller to the fixed and predetermined signal reference), so as to cause the air inlet damper (or a damper plate or plate portion(s) thereof) to abruptly change its location to a location that corresponds to that fixed and predetermined signal reference.

Further, in some embodiments, the additional control circuitry can include one or more PLCs, microcontrollers, or any type of controllers or control devices (or analog-to-digital/discrete signal converters), and operate to take an analog signal (e.g., 4-20 mA or 0-10 VDC) from the boiler controller and monitor it and adjust it before it is sent to the damper motor, such that at any desired and predetermined point the rate of change of this analog signal is increased or decreased for a particular and limited and predetermined range in modulation signal. Such an arrangement operating in this manner can lead to the air inlet damper (e.g., a damper plate or plate portion(s) thereof) opening or closing in bigger or smaller increments compared to the rest of the modulation signal range. In some such embodiments, the entire modulation range as a whole is nonlinear with respect to changes in the electronic modulation signal output by the boiler controller 116. Further, each of the various forms of controllers, control devices or circuitry (e.g., including the various forms of additional control circuitry 118 and/or the boiler controller 116 described above), and each of the various types and manners of controlling, governing, or influencing the positioning, adjustment, or movements of the air inlet damper (or damper plate or plate portion(s) thereof) described above, can be implemented in combination with any of a variety of air inlet dampers or damper arrangements. Among other things, any of these various of controllers, control devices or circuitry, and each of the various types and manners of controlling, governing, or influencing the positioning, adjustment, or movements of the air inlet damper (or damper plate or plate portion(s) thereof) described above can be implemented in combination with any of the various air inlet dampers, damper plates and plate portions having any of the various shapes, structural features, and/or characteristics described above or discussed herein.

The ability to use the aforementioned electromechanical devices to turn the damper motor on or off or to stop/start communicating the modulation signal can also be used with gas valves. In fact, in at least some of the embodiments encompassed herein that employ both the first gas train segment (e.g., the first gas train segment 132) and the second gas train segment (e.g., the second gas train segment 138), this is how gas flow is stopped in the smaller gas valve/train, and started in the bigger gas valve/train, and vice-versa, as the boiler modulates up and down. The gas valves are shut on and off accordingly when it is time to switch between the two gas trains as shown in FIG. 1.

It should also be appreciated that the construction of the air damper plate (e.g., the damper plate 128, the Z-shaped damper plate 1101, or one or more of the component damper plate portion(s), such as the primary plate 504 of FIG. 5), along with the air/gas inlet plenum or mixing tube, will have a large bearing on the amount of turndown the system is able to achieve. The diameter of the mixing tube can be significant in this regard as it not only dictates the flow of air, but it also dictates the pressure drop induced on the gas train, which in turn dictates flow of gas. Indeed, at any given modulation signal, the bigger the mixing tube, the easier it is for blower to draw more air than gas. This is because the inlet to the blower is shared between gas and air plenums/channels.

Additionally, in at least some additional embodiments encompassed herein, there can be a ring (or annular structure) or an orifice placed inside the mixing tube upstream of the gas inlet. Such as structure can be used to further correct the ratio of gas flow to air flow since the mixing tube or plenum is shared between to gases entering the blower. In embodiments including a ring, the ring can be placed at different locations. For example, in some embodiments, the ring can be placed upstream of a damper plate, and in other embodiments the ring can be placed downstream of a damper plate. Further, in some embodiments, the ring can be split into two halves (e.g., two semicircular annular portions) that are positioned on opposite sides of the rotational axis of the damper plate, where a first of the halves is positioned immediately upstream of the damper plate and a second of the halves is positioned immediately downstream of the damper plate, so that rotation of the damper plate is not restricted on either of its sides by either of the halves of the ring (in such an embodiment, the damper plate can still include a cutout such as the cutout 508).

In other variations, instead of such mixing tube, a venturi (e.g., a tube that has a decreasing diameter) can be used to house the damper components. In such an embodiment, the larger side will be facing the blower and the smaller side will be where the damper is placed. In either variation, the upstream side of the venturi or mixing tube can be attached to an air inlet box where the source of air supply is attached. Thus, the present disclosure is intended to encompass numerous different embodiments having any of a variety of different types of mixing chambers, structures, regions, or plenums (e.g., mixing tubes or plenums or venturi) in which air and gas are mixed. Further, in at least some embodiments, a feedback sensor such as an oxygen ($O_2$) sensor can be connected to the aforementioned electromechanical devices such that the air damper position is corrected based on a direct feedback from the values of combustion byproducts (e.g., the percentage of $O_2$).

It should further be appreciated that a significant feature of at least some embodiments encompassed herein relates to the manner in which the output signal of the controller is utilized at various points of the combustion modulation rate in conjunction with aforementioned electromechanical devices. Such operation of the boiler controller allows for nonlinear control over traditional off-the-shelf control equipment (such as motors) that often modulate linearly, which in turn allows for more precise orientation of the air damper to obtain the needed combustion quality and achieve higher turndowns. Also, it should be recognized that the physical construct of the air damper plate, the mixing tube, and the idea of a multi-piece damper as described, which in some embodiments can have a fixed top piece and in some embodiments the top part(s) can be gravity driven and hinged, are also distinguishing features by comparison with conventional combustion systems. Further, it should be appreciated that at least some embodiments of combustion systems encompassed herein can achieve higher turndown operation without utilizing multiple heat exchangers (or multiple sets of associated components) in a single jacket.

Additionally, it should be recognized that the methods of operation described above, including those of FIGS. 14, 15, 16, 17, and 18, are merely examples and that the present disclosure is intended to encompass numerous other methods and manners of operation. Among other things, the present disclosure encompasses numerous additional methods of operation in which control devices such as the boiler controller 116 and/or additional control circuitry 118 (or 1300) provide one or more control (or power) signal(s) to one or more air inlet damper(s) or associated device(s) (such as one or more damper motor(s)) to achieve nonlinear variation in the air flow, or air flow path(s), past the air inlet damper(s), in response to changes in the electronic modulation signal output by the boiler controller. For example, although several of the methods of operation described above envision that a particular control signal is provided if a received electronic modulation signal is below a threshold and that a different particular control signal is provided if the received electronic modulation signal is equal to or above the threshold. However, the present disclosure also encompasses embodiments in which the particular control signal is provided if the received electronic modulation signal is equal to or below the threshold, and/or that the different particular control signal is provided if the received electronic modulation signal is above (rather than equal to or above) the threshold.

Also, even though some of the embodiments described herein envision modifying one or more control signal(s) based upon consideration of how a received electronic modulation signal compares to one threshold or two thresholds, the present disclosure is additionally intended to encompass embodiments in which control signal(s) are modified based upon how the received electronic modulation signal compares to more than two thresholds, and/or based upon other factors or considerations.

Notwithstanding the above description, the present disclosure is intended to encompass numerous embodiments including those disclosed herein as well as a variety of alternate embodiments. Among other things, the present disclosure encompasses some embodiments involving a system that operates, or a method of operating, in a manner so that a flow path past an air inlet damper varies nonlinearly in response to a variation of a modulation signal (e.g., as provided by a boiler controller) for any one or more of a variety of reasons. In some such embodiments, for example, the flow path past the air inlet damper varies nonlinearly in response to a variation of a modulation signal because of one, or both, of: (a) the physical shape(s) or characteristic(s) of one or more damper plate or plate portions associated with the air inlet damper, and/or the physical shape(s) or characteristic(s) of one or more portions of an air flow tube within which such one or more damper plate or plate portions are positioned; and/or (b) operation by at least one control device to provide at least one control signal for receipt by a damper motor of the air inlet damper in which the at least one control signal is configured to vary nonlinearly in response to the variation of the modulation signal.

The present disclosure also encompasses additional embodiments, extensions, and modifications that have or are adapted to have any of a variety of (or a varying range of) sizes, and/or include or take the form of any of a variety of types of combustion systems, including boiler and hot water appliances. In particular, the present disclosure is not limited to boiler systems but rather is also intended to encompass combustion systems beyond boilers. Indeed, any application with controlled combustion or forced draft combustion can potentially benefit from one or more of the embodiments encompassed herein, to achieve higher turndown. Also, the present disclosure encompasses embodiments having portion(s) of one or more of the components or features described herein, or that encompass multiple ones of one or more of the components or features described herein. For example, the present disclosure encompasses embodiments having multiple air inlet dampers arranged in series along an air flow tube or arranged in parallel with one another (e.g., within parallel-coupled air flow tube portions). Further, the present disclosure encompasses embodiments that perform methods of operation that include subportions, or only one or more of the steps of operation, of the methods described herein, that perform methods of operation which include supplemental steps in addition to the steps described herein, or that perform methods of operation including different combinations of steps or methods having steps that are ordered in different manners relative to the methods or orderings of steps described herein.

In at least some additional embodiments, for example, the present disclosure relates to a combustion system configured to achieve enhanced turndown operation. The combustion system includes an air flow tube, an air inlet damper positioned along the air flow tube, a gas train, and a first gas valve positioned along the gas train. The combustion system also includes a mixing chamber coupled to the air flow tube and to the gas train, a burner, and a blower coupled between the mixing chamber and the burner. A first flow of air via the air flow tube into the mixing chamber is governed at least in part by a first status of the air inlet damper and also at least in part by a speed of the blower, and a second flow of a gas via the gas train into the mixing chamber is governed at least in part by a second status of the first gas valve and also at least in part by the speed of the blower, where at least a first amount of the air and at least a second amount of the gas are mixed within the mixing chamber to form an air/gas mixture. Additionally, a third flow of the air/gas mixture from the mixing chamber to the burner is governed at least in part by the speed of the blower. Further, the air inlet damper includes a first damper plate having an outer perimeter with a first edge portion that is complementary to an inner surface of the air flow tube and one or more additional edge portions that define a first inwardly-extending cutout through which at least some of the air can pass even when the first status of the air inlet damper is a closed status in which the first damper plate is rotated so that the first edge portion is substantially adjacent to or in contact with the inner surface.

Further, in at least some such embodiments, the one or more additional edge portions that define the inwardly-extending cutout include second, third, and fourth edge portions, where each of the second and third edge portions extends inwardly from the first edge portion to the fourth edge portion, which extends between the second and third edge portions. Also, in at least some such embodiments, the inner surface of the air flow tube is substantially cylindrical and the first edge portion is substantially circular, where each of the second and third edge portions extends inwardly substantially parallel to a radius extending outward from a center of the first damper plate, and where the fourth edge portion extends substantially perpendicularly to the radius. Additionally, in at least some such embodiments, the air inlet damper is configured so that the first damper plate can be rotated about an axis extending substantially diametrically through the damper plate, and the one or more additional edge portions are configured so that inwardly-extending cutout is positioned at a region along the first damper plate that is along the outer perimeter away from the axis.

Also, in at least some such embodiments, the first damper plate further includes one or more further edge portions that define a second inwardly-extending cutout. Additionally, in at least some such embodiments, the first inwardly-extending cutout is positioned substantially along a first side of the first damper plate, and the second inwardly-extending cutout is positioned substantially along a second side of the first damper plate, the second side being substantially opposed to the first side, and the second inwardly-extending cutout is a substantially-semicircular perimeter cutout. Further, in least some such embodiments, the air inlet damper is configured so that the first damper plate can be rotated about an axis extending substantially diametrically through the damper plate, and the first inwardly-extending cutout is positioned at a first region along the first damper plate that is along the outer perimeter away from the axis on a first side of the axis and the second inwardly-extending cutout is positioned at a second region along the first damper plate that is along the outer perimeter away from the axis on a second side of the axis that is opposed to the first side. Also, in at least some such embodiments, the air inlet damper includes a second damper plate that is rotatably or fixedly coupled to the inner surface of the air flow tube and that is substantially complementary to the second inwardly-extending cutout so that, when the first status of the air inlet damper is the closed status in which the first damper plate is rotated so that the first edge portion is substantially adjacent to or in contact with the inner surface, the second damper plate extends radially inwardly within the air flow tube so as to substantially cover the second inwardly-extending cutout. Additionally, in at least some such embodiments, the air inlet damper includes a plurality of second damper plates that are rotatably coupled to the inner surface of the air flow tube and that in combination form a combination damper plate that is substantially complementary to the second inwardly-extending cutout so that, when the first status of the air inlet damper is the closed status in which the first damper plate is rotated so that the first edge portion is substantially adjacent to or in contact with the inner surface, the combination damper plate extends radially inwardly within the air flow tube so as to substantially cover the second inwardly-extending cutout.

Further, in at least some such embodiments, the first damper plate includes a first plate portion, a second plate portion, and a third plate portion that extends in a manner that is substantially perpendicular to each of the first plate portion and second plate portion and that connects the first plate portion with the second plate portion, where first inwardly-extending cutout is formed within the first plate portion. Also, in at least some such embodiments, the air inlet damper is configured so that the first damper plate can be rotated about an axis extending substantially diametrically through the damper plate, through the first plate portion in a manner that is substantially parallel to the third plate portion, where the first inwardly-extending cutout is positioned within the first plate portion along the first damper plate that is along the outer perimeter away from the axis on a first side of the axis, and where the second plate portion is positioned downstream of the first plate portion, and closer to the mixing chamber than the first plate portion. Additionally, in least some such embodiments, the gas train includes a second gas valve. Also, in at least some such embodiments, the gas train include a first gas train segment and a second gas train segment, where the first gas train segment includes the first gas valve and the second gas train segment includes the second gas valve, where the first gas train segment is a larger flow passage than the second gas train segment, and where each of the first gas train segment and the second gas train segment is coupled at least indirectly between at least one gas source and the mixing chamber. Further, in least some such embodiments, the first gas train segment includes a third gas valve, where the second gas train segment includes a fourth gas valve, where each of the first and second gas valves is configured to be actuated between respective on and off statuses, and where each of the third and fourth gas valves can be varied substantially continuously between respective maximally-opened and maximally-closed statuses.

Additionally, in least some such embodiments, the combustion system further comprises at least one control device, wherein the at least one control device provides one or more control signals that at least indirectly control or affect each of the first status of the air inlet damper and a speed status of the blower. Also, in least some such embodiments, the combustion system further comprises a second gas valve, where the one or more control signals also at least indirectly control or affect the second status of the first gas valve, and where a further status of the second gas valve is controlled or affected at least indirectly by the speed status of the blower.

In at least some further embodiments, for example, the present disclosure relates to a method of operating a combustion system to attain enhanced turndown operation. The combustion system includes a blower, a mixing chamber, a burner, an air flow tube, a gas train, and an air inlet damper, where the blower is coupled between the mixing chamber and the burner, where the mixing chamber is coupled between the blower and each of the air flow tube and the gas train, where a first damper plate of the air inlet damper is positioned along the air flow tube, and where the first damper plate has an outer perimeter with a first edge portion that is complementary to an inner surface of the air flow tube and one or more additional edge portions that define a first inwardly-extending cutout. The method includes, at a first time, providing one or more first control signals at least indirectly from at least one control device so as to cause a blower to operate at a high speed, and to actuate the air inlet damper so that the first damper plate of the air inlet damper is rotated to an open position. The method also includes, at a second time, providing one or more second control signals at least indirectly from the at least one control device so as to cause the blower to operate at a low speed, and to actuate the air inlet damper so that the first damper plate of the air inlet damper is rotated to a closed position, where, at the second time, at least some air continues to pass through the air flow tube past the first damper plate by way of the first inwardly-extending cutout so as to reach the mixing chamber.

Additionally, in least some such embodiments, the gas train includes each of a first gas train segment having a first gas valve and a second gas train segment having a second gas valve, where the first gas train segment is configured to have a first internal flow passageway with a first cross-section that is larger than a second cross-section of a second internal flow passageway of the second gas train segment. At the first time, first gas enters the mixing chamber from a first one of the first and second gas train segments of the gas train, and, at the second time, second gas enters the mixing chamber from a second one of the first and second gas train segments of the gas train. Further, in at least some such embodiments, either: (a) the air inlet damper includes, in addition to the first damper plate, one or more additional damper plate portions that is or are respectively rotatably supported along the inner surface of the air flow tube, and which is or are open at the first time but closed at the second time; or (b) the first damper plate includes a first plate portion, a second plate portion, and a third plate portion that extends in a manner that is substantially perpendicular to each of the first plate portion and second plate portion and that connects the first plate portion with the second plate portion, wherein first inwardly-extending cutout is formed within the first plate portion.

In at least some additional embodiments, for example, the present disclosure relates to a combustion system configured to achieve enhanced turndown operation. The combustion system includes an air flow tube, a gas train, and a mixing chamber coupled to the air flow tube and to the gas train. The combustion system also includes a burner, a blower coupled between the mixing chamber and the burner, means for governing air flow through the air flow tube and into the mixing chamber, and means for controlling the means for governing. The means for controlling provides at least one signal at least indirectly for receipt by the means for governing, and the at least one signal causes the means for governing to be adjusted between a closed status and an open status. The means for governing is configured to operate in a nonlinear manner, when being adjusted away from the closed status toward the open status, so that a flow path past the means for governing is adjusted nonlinearly.

In at least some further embodiments, for example, the present disclosure relates to a combustion system configured to achieve enhanced turndown operation. The combustion system includes an air flow tube, an air inlet damper positioned along the air flow tube and including a damper motor and a first damper plate, a gas train having a first gas valve positioned along the gas train, and a mixing chamber coupled to the air flow tube and to the gas train. The combustion system also includes a burner, a blower coupled between the mixing chamber and the burner, and at least one control device coupled at least indirectly to the damper motor of the air inlet damper. A first flow of air via the air flow tube into the mixing chamber is governed at least in part by a first status of the air inlet damper and also at least in part by a speed of the blower, and a second flow of a gas via the gas train into the mixing chamber is governed at least in part by a second status of the first gas valve and also at least in part by the speed of the blower, where at least a first amount of the air and at least a second amount of the gas are mixed within the mixing chamber to form an air/gas mixture. Also, a third flow of the air/gas mixture from the mixing chamber to the burner is governed at least in part by the speed of the blower, and a position of the first damper plate is controlled at least in part by the damper motor. Further, the at least one control device is configured to provide at least one control signal for receipt by the damper motor that governs an actuation of the damper motor, and the at least one control signal includes or is based at least partly upon a modulation signal. Additionally, a flow path past the air inlet damper varies nonlinearly in response to a variation of the modulation signal because either: (a) the at least one control device is configured to cause the at least one control signal to vary nonlinearly in response to the variation of the modulation signal; or (b) the first damper plate has an outer perimeter with a first edge portion that is complementary to an inner surface of the air flow tube and also a first inwardly-extending cutout.

Additionally, in at least some such embodiments, the flow path past the air inlet damper varies nonlinearly in response to the variation of the modulation signal because the first damper plate has the outer perimeter with the first edge portion that is complementary to the inner surface of the air flow tube and also the first inwardly-extending cutout, and the at least one control signal is the modulation signal. Also, in at least some such embodiments, the combustion system further comprises a boiler controller that provides the modulation signal, where the flow path past the air inlet damper varies nonlinearly in response to the variation of the modulation signal because the at least one control device is configured to cause the at least one control signal to vary nonlinearly in response to the variation of the modulation signal. Further, in at least some such embodiments, the at least one control device includes one or more programmable logic controllers (PLCs), microcontrollers, microprocessors, or other controllers or processors, or one or more relays, limit alarms, or other switching devices, and the at least one control device either is configured to cause the at least one control signal to vary nonlinearly so that discrete movements or events are experienced by the air inlet damper, or is configured to receive and monitor the modulation signal from the boiler controller and to produce changes in the at least one control signal that occur in response to the modulation signal achieving or passing one or more predetermined setpoints. Also, in at least some such embodiments, the combustion system further comprises a boiler controller, where the at least one control device includes a first input port coupled at least indirectly to the boiler controller to receive the modulation signal therefrom, a first output port coupled at least indirectly to the damper motor, a first switching device coupled between the first input port and the first output port, and a processing device coupled at least indirectly to the first switching device, and where a first actuation status of the first switching device is controlled at least indirectly by the processing device and determines whether the modulation signal received at the first input port is communicated via the first switching device to the first output port, for further communication to the damper motor.

Also, in at least some such embodiments, the at least one control device includes a second output port and an additional switching device that is coupled at least indirectly between a second output port and a power source, where the processing device is additionally coupled at least indirectly to the additional switching device, and where an additional actuation status of the additional switching device is controlled at least indirectly by the processing device and determines whether the power received from the power source is communicated via the additional switching device to the second output port, for further communication to the damper motor. Also, in at least some such embodiments, the at least one control device is configured to cause the at least one control signal to vary nonlinearly in response to the variation of the modulation signal by energizing the additional switching device when the modulation signal is below a threshold and deenergizing the additional switching device when the modulation signal is above the threshold, the air inlet damper takes on a fail-safe-open position when the additional switching device is deenergized, and the air inlet damper is modulated in response to the modulation signal as communicated to the damper motor from the first output port when the additional switching device is energized.

Further, in at least some such embodiments, the at least one control device includes a fixed signal source and a second switching device that is coupled at least indirectly between the fixed signal source and the first output port, where the processing device is additionally coupled at least indirectly to the second switching device, and where a second actuation status of the second switching device is controlled at least indirectly by the processing device and determines whether a fixed signal provided by the first signal source to the second switching device is communicated via the second switching device to the first output port, for further communication to the damper motor. Also, in at least some such embodiments, the at least one control device is configured to cause the at least one control signal to vary nonlinearly in response to the variation of the modulation signal by energizing the first switching device and deenergizing the second switching device when the modulation signal is below a threshold and deenergizing the first switching device and energizing the second switching device when the modulation signal is above the threshold, so that the at least one control signal is the modulation signal when the modulation signal is below the threshold and is the fixed signal when the modulation signal is above the threshold. Additionally, in least some such embodiments, the at least one control device is configured to cause the at least one control signal to vary nonlinearly in response to the variation of the modulation signal by energizing the first switching device and deenergizing the second switching device when the modulation signal is either below a first threshold or above a second threshold, and deenergizing the first switching device and energizing the second switching device when the modulation signal is between the first threshold and second threshold, so that the at least one control signal is the modulation signal when the modulation signal is below the first threshold or above the second threshold, and is the fixed signal when the modulation signal is between the first threshold and the second threshold.

Also, in at least some such embodiments, the at least one control device includes an additional output circuit that is coupled at least indirectly to the first output port, where the processing device is additionally coupled at least indirectly to the additional output circuit, and where the processing device is configured to cause the additional output circuit to generate a coarsely-modulated output signal having a plurality of discrete values respectively corresponding to respective ranges of the modulation signal. Additionally, in at least some such embodiments, the at least one control device is configured to cause the at least one control signal to vary nonlinearly in response to the variation of the modulation signal by energizing the first switching device when the modulation signal is below a threshold and, when the modulation is above the threshold, both deenergizing the first switching device and causing the coarsely-modulated output signal to be generated by the additional output circuit, so that the at least one control signal is the modulation signal when the modulation signal is below the threshold and is the coarsely-modulated output signal when the modulation signal is above the threshold. Also, in least some such embodiments, the at least one control device is configured to cause the at least one control signal to vary nonlinearly in response to the variation of the modulation signal by energizing the first switching device when the modulation signal is above a threshold and deenergizing the first switching device when the modulation is below the threshold, and the air inlet damper is configured to take on a closed position at a time when the at least one control signal is not provided to the damper motor, so that the at least one control signal is the modulation signal when the modulation signal is above the threshold, and the air inlet damper takes on the closed position when the modulation signal is below the threshold.

In at least some additional embodiments, for example, the present disclosure relates to a method of operating a combustion system to attain enhanced turndown operation. The combustion system includes a blower, a mixing chamber, a burner, an air flow tube, a gas train, an air inlet damper, and at least one control device, where the blower is coupled between the mixing chamber and the burner, where the mixing chamber is coupled between the blower and each of the air flow tube and the gas train, where a first damper plate of the air inlet damper is positioned along the air flow tube, and where the at least one control device is coupled at least indirectly to a damper motor of the air inlet damper. The method includes receiving a modulation signal at the at least one control device, and monitoring the modulation signal. Also, the method includes making a first determination, at a first time by the at least one control device, that the modulation signal has a first status in comparison with a first threshold and, upon the first determination being made, causing a first control signal to be output from the at least one control device for receipt by the damper motor of the air inlet damper, where the air inlet damper takes on a first position in response to the first control signal. Additionally, the method includes making a second determination, at a second time by the at least one control device, that the modulation signal has experienced a variation from having the first status to having a second status in comparison with the first threshold and, upon the second determination being made, causing a second control signal to be output from the at least one control device for receipt by the damper motor of the air inlet damper, where the air inlet damper changes from having the first position to having a second position in response to the second control signal. Further, when the air inlet damper changes from having the first position to having the second position, an air flow path past the air inlet damper varies in a nonlinear manner relative to the variation in the modulation signal from the first status to the second status.

Also, in at least some such embodiments, the modulation signal is provided from a boiler controller, and the at least one control device includes a first input port coupled at least indirectly to the boiler controller to receive the modulation signal therefrom, a first output port coupled at least indirectly to the damper motor, a first switching device coupled between the first input port and the first output port, and a processing device coupled at least indirectly to the first switching device. Further, in at least some such embodiments, the first control signal that is caused to be output from the at least one control device upon the first determination being made is the modulation signal, and the first determination either is that the modulation signal is below the first threshold or is that the modulation signal is above the first threshold. Also, in at least some such embodiments, the second control signal that is caused to be output from the at least one control device upon the second determination being made includes one of: (a) a discontinuation of a power signal from the at least one control device to the damper motor, which occurs in response to the processing device causing an additional switching device of the at least one control device to be opened; (b) a maximum level modulation signal generated by a signal source within the at least one control device, which is provided from the at least one control device to the damper motor in response to the processing device causing the first switching device to be opened and a further switching device to become closed; or (c) a coarse modulation signal generated by an output circuit within the at least one control device. Additionally, in least some such embodiments, the method further comprises making a third determination, at the second time or substantially the second time by the at least one control device, that the modulation signal has an additional status in comparison with a second threshold, and the second control signal that is caused to be output from the at least one control device upon the second and third determinations being made includes a fixed modulation signal generated by a signal source within the at least one control device, which is provided from the at least one control device to the damper motor.

In at least some further embodiments, for example, the present disclosure relates to a combustion system configured to achieve enhanced turndown operation. The combustion system includes an air flow tube, an air inlet damper positioned along the air flow tube and including a damper motor and a first damper plate, a gas train, and a mixing chamber coupled to the air flow tube and to the gas train. The combustion system also includes a burner, a blower coupled between the mixing chamber and the burner, a blower control device configured to generate a modulation signal, and an additional control device coupled to the blower control device. Further, the modulation signal is provided to the additional control device, and the additional control device is configured to output at least one additional signal in response to receiving the modulation signal, the at least one additional signal varying nonlinearly in response to a variation of the modulation signal so that a flow path past the air inlet damper varies nonlinearly in response to the variation of the modulation signal. Also, in at least some such embodiments, the additional control device includes a processing device coupled to one or more relays or limit alarms, where the processing device monitors the modulation signal and causes a switching status of at least one of the one or more relays or limit alarms to change when the modulation signal achieves or passes a threshold value, so that the at least one additional signal varies nonlinearly in response to the variation of the modulation signal.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:
1. A combustion system configured to achieve enhanced turndown operation, the combustion system comprising:
    an air flow tube;
    an air inlet damper positioned along the air flow tube and including a damper motor and a first damper plate,
    a gas train having a first gas valve positioned along the gas train;
    a mixing chamber coupled to the air flow tube and to the gas train;
    a burner;
    a blower coupled between the mixing chamber and the burner; and
    at least one control device coupled at least indirectly to the damper motor of the air inlet damper;
    wherein a first flow of air via the air flow tube into the mixing chamber is governed at least in part by a first status of the air inlet damper and also at least in part by a speed of the blower,
    wherein a second flow of a gas via the gas train into the mixing chamber is governed at least in part by a second status of the first gas valve and also at least in part by the speed of the blower, wherein at least a first amount of the air and at least a second amount of the gas are mixed within the mixing chamber to form an air/gas mixture,
    wherein a third flow of the air/gas mixture from the mixing chamber to the burner is governed at least in part by the speed of the blower,
    wherein a position of the first damper plate is controlled at least in part by the damper motor, wherein the at least one control device is configured to provide at least one control signal for receipt by the damper motor that governs an actuation of the damper motor, wherein the at least one control signal includes or is based at least partly upon a modulation signal, and
    wherein a flow path past the air inlet damper varies nonlinearly in response to a variation of the modulation signal because either:
    (a) the at least one control device is configured to cause the at least one control signal to vary nonlinearly in response to the variation of the modulation signal; or

(b) the first damper plate has an outer perimeter with a first edge portion that is complementary to an inner surface of the air flow tube and also a first inwardly-extending cutout.

2. The combustion system of claim 1,
wherein the flow path past the air inlet damper varies nonlinearly in response to the variation of the modulation signal because the first damper plate has the outer perimeter with the first edge portion that is complementary to the inner surface of the air flow tube and also the first inwardly-extending cutout, and
wherein the at least one control signal is the modulation signal.

3. The combustion system of claim 1, further comprising a boiler controller that provides the modulation signal, wherein the flow path past the air inlet damper varies nonlinearly in response to the variation of the modulation signal because the at least one control device is configured to cause the at least one control signal to vary nonlinearly in response to the variation of the modulation signal.

4. The combustion system of claim 3,
wherein the at least one control device includes one or more programmable logic controllers (PLCs), microcontrollers, microprocessors, or other controllers or processors, or one or more relays, limit alarms, or other switching devices, and
wherein the at least one control device either is configured to cause the at least one control signal to vary nonlinearly so that discrete movements or events are experienced by the air inlet damper, or is configured to receive and monitor the modulation signal from the boiler controller and to produce changes in the at least one control signal that occur in response to the modulation signal achieving or passing one or more predetermined setpoints.

5. The combustion system of claim 1, further comprising a boiler controller,
wherein the at least one control device includes a first input port coupled at least indirectly to the boiler controller to receive the modulation signal therefrom, a first output port coupled at least indirectly to the damper motor, a first switching device coupled between the first input port and the first output port, and a processing device coupled at least indirectly to the first switching device, and
wherein a first actuation status of the first switching device is controlled at least indirectly by the processing device and determines whether the modulation signal received at the first input port is communicated via the first switching device to the first output port, for further communication to the damper motor.

6. The combustion system of claim 5, wherein the at least one control device includes a second output port and an additional switching device that is coupled at least indirectly between a second output port and a power source, wherein the processing device is additionally coupled at least indirectly to the additional switching device,
wherein an additional actuation status of the additional switching device is controlled at least indirectly by the processing device and determines whether the power received from the power source is communicated via the additional switching device to the second output port, for further communication to the damper motor.

7. The combustion system of claim 6,
wherein the at least one control device is configured to cause the at least one control signal to vary nonlinearly in response to the variation of the modulation signal by energizing the additional switching device when the modulation signal is below a threshold and deenergizing the additional switching device when the modulation signal is above the threshold,
wherein the air inlet damper takes on a fail-safe-open position when the additional switching device is deenergized, and the air inlet damper is modulated in response to the modulation signal as communicated to the damper motor from the first output port when the additional switching device is energized.

8. The combustion system of claim 5,
wherein the at least one control device includes a fixed signal source and a second switching device that is coupled at least indirectly between the fixed signal source and the first output port, wherein the processing device is additionally coupled at least indirectly to the second switching device,
wherein a second actuation status of the second switching device is controlled at least indirectly by the processing device and determines whether a fixed signal provided by the first signal source to the second switching device is communicated via the second switching device to the first output port, for further communication to the damper motor.

9. The combustion system of claim 8,
wherein the at least one control device is configured to cause the at least one control signal to vary nonlinearly in response to the variation of the modulation signal by energizing the first switching device and deenergizing the second switching device when the modulation signal is below a threshold and deenergizing the first switching device and energizing the second switching device when the modulation signal is above the threshold,
so that the at least one control signal is the modulation signal when the modulation signal is below the threshold and is the fixed signal when the modulation signal is above the threshold.

10. The combustion system of claim 8,
wherein the at least one control device is configured to cause the at least one control signal to vary nonlinearly in response to the variation of the modulation signal by energizing the first switching device and deenergizing the second switching device when the modulation signal is either below a first threshold or above a second threshold, and deenergizing the first switching device and energizing the second switching device when the modulation signal is between the first threshold and second threshold,
so that the at least one control signal is the modulation signal when the modulation signal is below the first threshold or above the second threshold, and is the fixed signal when the modulation signal is between the first threshold and the second threshold.

11. The combustion system of claim 5,
wherein the at least one control device includes an additional output circuit that is coupled at least indirectly to the first output port, wherein the processing device is additionally coupled at least indirectly to the additional output circuit,
wherein the processing device is configured to cause the additional output circuit to generate a coarsely-modulated output signal having a plurality of discrete values respectively corresponding to respective ranges of the modulation signal.

12. The combustion system of claim 11,
wherein the at least one control device is configured to cause the at least one control signal to vary nonlinearly in response to the variation of the modulation signal by energizing the first switching device when the modulation signal is below a threshold and, when the modulation is above the threshold, both deenergizing the first switching device and causing the coarsely-modulated output signal to be generated by the additional output circuit,
so that the at least one control signal is the modulation signal when the modulation signal is below the threshold and is the coarsely-modulated output signal when the modulation signal is above the threshold.

13. The combustion system of claim 5,
wherein the at least one control device is configured to cause the at least one control signal to vary nonlinearly in response to the variation of the modulation signal by energizing the first switching device when the modulation signal is above a threshold and deenergizing the first switching device when the modulation is below the threshold, and
wherein the air inlet damper is configured to take on a closed position at a time when the at least one control signal is not provided to the damper motor,
so that the at least one control signal is the modulation signal when the modulation signal is above the threshold, and the air inlet damper takes on the closed position when the modulation signal is below the threshold.

14. A method of operating a combustion system to attain enhanced turndown operation, wherein the combustion system includes a blower, a mixing chamber, a burner, an air flow tube, a gas train, an air inlet damper, and at least one control device, wherein the blower is coupled between the mixing chamber and the burner, wherein the mixing chamber is coupled between the blower and each of the air flow tube and the gas train, wherein a first damper plate of the air inlet damper is positioned along the air flow tube, and wherein the at least one control device is coupled at least indirectly to a damper motor of the air inlet damper, the method comprising:
receiving a modulation signal at the at least one control device;
monitoring the modulation signal;
making a first determination, at a first time by the at least one control device, that the modulation signal has a first status in comparison with a first threshold;
upon the first determination being made, causing a first control signal to be output from the at least one control device for receipt by the damper motor of the air inlet damper, wherein the air inlet damper takes on a first position in response to the first control signal;
making a second determination, at a second time by the at least one control device, that the modulation signal has experienced a variation from having the first status to having a second status in comparison with the first threshold;
upon the second determination being made, causing a second control signal to be output from the at least one control device for receipt by the damper motor of the air inlet damper, wherein the air inlet damper changes from having the first position to having a second position in response to the second control signal,
wherein, when the air inlet damper changes from having the first position to having the second position, an air flow path past the air inlet damper varies in a nonlinear manner relative to the variation in the modulation signal from the first status to the second status.

15. The method of claim 14, wherein the modulation signal is provided from a boiler controller, and wherein the at least one control device includes a first input port coupled at least indirectly to the boiler controller to receive the modulation signal therefrom, a first output port coupled at least indirectly to the damper motor, a first switching device coupled between the first input port and the first output port, and a processing device coupled at least indirectly to the first switching device.

16. The method of claim 15,
wherein the first control signal that is caused to be output from the at least one control device upon the first determination being made is the modulation signal, and
wherein the first determination either is that the modulation signal is below the first threshold or is that the modulation signal is above the first threshold.

17. The method of claim 16, wherein the second control signal that is caused to be output from the at least one control device upon the second determination being made includes one of:
a) a discontinuation of a power signal from the at least one control device to the damper motor, which occurs in response to the processing device causing an additional switching device of the at least one control device to be opened;
b) a maximum level modulation signal generated by a signal source within the at least one control device, which is provided from the at least one control device to the damper motor in response to the processing device causing the first switching device to be opened and a further switching device to become closed; or
c) a coarse modulation signal generated by an output circuit within the at least one control device.

18. The method of claim 16, further comprising:
making a third determination, at the second time or substantially the second time by the at least one control device, that the modulation signal has an additional status in comparison with a second threshold; and
wherein the second control signal that is caused to be output from the at least one control device upon the second and third determinations being made includes a fixed modulation signal generated by a signal source within the at least one control device, which is provided from the at least one control device to the damper motor.

19. A combustion system configured to achieve enhanced turndown operation, the combustion system comprising:
an air flow tube;
an air inlet damper positioned along the air flow tube and including a damper motor and a first damper plate,
a gas train;
a mixing chamber coupled to the air flow tube and to the gas train;
a burner;
a blower coupled between the mixing chamber and the burner;
a blower control device configured to generate a modulation signal; and
an additional control device coupled to the blower control device,
wherein the modulation signal is provided to the additional control device,
wherein the additional control device is configured to output at least one additional signal in response to receiving the modulation signal, the at least one additional signal varying nonlinearly in response to a variation of the modulation signal so that a flow path past the air inlet damper varies nonlinearly in response to the variation of the modulation signal.

20. The combustion system of claim 19, wherein the additional control device includes a processing device coupled to one or more relays or limit alarms, wherein the processing device monitors the modulation signal and causes a switching status of at least one of the one or more relays or limit alarms to change when the modulation signal achieves or passes a threshold value, so that the at least one additional signal varies nonlinearly in response to the variation of the modulation signal.

* * * * *